US012480361B1

(12) United States Patent
Flannery et al.

(10) Patent No.: US 12,480,361 B1
(45) **Date of Patent: *Nov. 25, 2025**

(54) GATED BARRIER WITH ONE HAND LATCH APPARATUS

(71) Applicant: Regalo International, LLC, Burnsville, MN (US)

(72) Inventors: Mark A. Flannery, Longboat Key, FL (US); Kasey L. Pipo, Elko New Market, MN (US); Matthew A. Willms, Woodbury, MN (US); Nicholas E. Beattie, Saint Paul, MN (US)

(73) Assignee: Regalo International, LLC, Longboat Key, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,838

(22) Filed: Nov. 11, 2023

Related U.S. Application Data

(63) Continuation of application No. 17/352,287, filed on Jun. 19, 2021, now Pat. No. 11,814,892, which is a continuation of application No. 16/297,552, filed on Mar. 8, 2019, now Pat. No. 11,041,340.

(60) Provisional application No. 62/642,495, filed on Mar. 13, 2018.

(51) Int. Cl.

| | |
|---|---|
| ***E06B 11/02*** | (2006.01) |
| ***E05B 13/00*** | (2006.01) |
| ***E05B 65/00*** | (2006.01) |
| ***E05C 1/12*** | (2006.01) |
| ***E06B 7/32*** | (2006.01) |

(Continued)

(52) U.S. Cl.

CPC ............ *E06B 11/02* (2013.01); *E05B 13/002* (2013.01); *E05B 65/0007* (2013.01); *E05B 65/0014* (2013.01); *E05C 1/12* (2013.01); *E06B 7/32* (2013.01); *E06B 9/02* (2013.01); *E06B 11/022* (2013.01); *E06B 2009/002* (2013.01)

(58) Field of Classification Search

CPC .. E06B 11/02; E06B 11/022; E06B 2009/002; E05B 65/0007; E05B 65/0014; E05C 1/12

See application file for complete search history.

(56) References Cited

U.S. PATENT DOCUMENTS

| | | | |
|---|---|---|---|
| 5,797,218 | A | 8/1998 | Holland |
| 5,809,694 | A | 9/1998 | Postans |
| 6,305,124 | B1 | 10/2001 | Pennington |

(Continued)

FOREIGN PATENT DOCUMENTS

| | | | |
|---|---|---|---|
| EP | 3868995 | A2 | 8/2021 |
| GB | 2192657 | A | 1/1988 |

(Continued)

*Primary Examiner* — Marcus Menezes

(57) ABSTRACT

The present gated barrier includes a two step latch apparatus having a pivoting latch release and a slideable latch puller to operate a latch. The latch apparatus housing is engaged over a junction between first and second frame portions to hide the junction from sight, where one frame portion is arched and the other frame portion is straight. The gated barrier further includes vertical tubular frame members with oblong shaped sections, wall cups with front retaining walls, a warning tag engaged between a gate and a nonparallel end frame portion, and a gate frame with interior vertical frame members in a repeating height pattern supporting an upper arch.

6 Claims, 27 Drawing Sheets

(51) Int. Cl.
*E06B 9/02* (2006.01)
*E06B 9/00* (2006.01)

(56) References Cited

U.S. PATENT DOCUMENTS

| | | | | |
|---|---|---|---|---|
| 8,615,928 | B2 | 12/2013 | Wang | |
| 9,279,284 | B1 | 3/2016 | Axelrod et al. | |
| 9,382,750 | B1 | 7/2016 | Flannery | |
| 9,388,603 | B2 | 7/2016 | Flannery et al. | |
| 9,464,467 | B1 | 10/2016 | Flannery et al. | |
| 9,587,426 | B1 * | 3/2017 | Flannery | E05C 1/12 |
| 9,874,055 | B1 | 1/2018 | Flannery et al. | |
| 10,113,335 | B1 | 10/2018 | Flannery et al. | |
| 10,550,634 | B1 | 2/2020 | Holland | |
| 10,745,941 | B2 | 8/2020 | Fang | |
| 10,774,587 | B2 | 9/2020 | Flannery et al. | |
| 11,041,340 | B1 * | 6/2021 | Flannery | E06B 9/02 |
| D933,451 | S | 10/2021 | Marsden | |
| 11,814,892 | B1 * | 11/2023 | Flannery | E05B 13/002 |
| 2002/0002795 | A1 * | 1/2002 | Rogers | E06B 9/04 49/463 |
| 2005/0028947 | A1 | 2/2005 | Waldman et al. | |
| 2008/0284180 | A1 | 11/2008 | Newcombe | |
| 2011/0225890 | A1 | 9/2011 | Greenwood et al. | |
| 2012/0255234 | A1 | 10/2012 | Wang | |
| 2013/0125470 | A1 * | 5/2013 | Dunn | E06B 9/04 49/504 |
| 2014/0007506 | A1 | 1/2014 | Huang | |
| 2015/0027060 | A1 * | 1/2015 | Sousa | E05B 17/2038 49/394 |
| 2015/0101250 | A1 | 4/2015 | Marsden | |
| 2017/0198448 | A1 * | 7/2017 | Han | E01F 13/042 |
| 2019/0078353 | A1 | 3/2019 | Gentil | |
| 2019/0145127 | A1 | 5/2019 | Flannery et al. | |
| 2019/0234139 | A1 | 8/2019 | Flannery et al. | |
| 2021/0238899 | A1 | 8/2021 | Marsden | |

FOREIGN PATENT DOCUMENTS

| | | | |
|---|---|---|---|
| GB | 2216939 | A | 10/1989 |
| GB | 2258691 | A | 2/1993 |
| GB | 2271603 | A | 4/1994 |

* cited by examiner

FIG. 8B
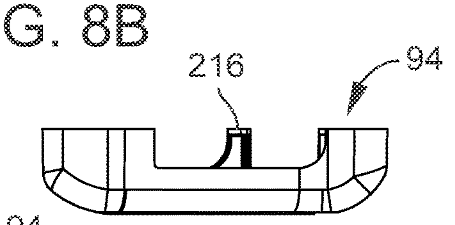
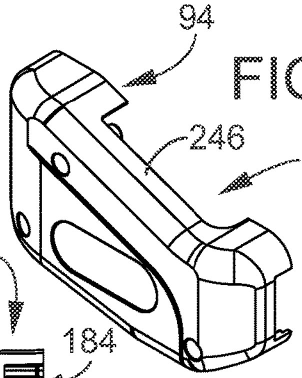
FIG. 8A
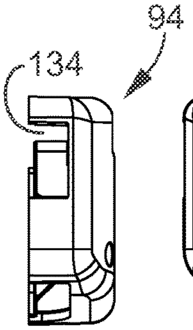
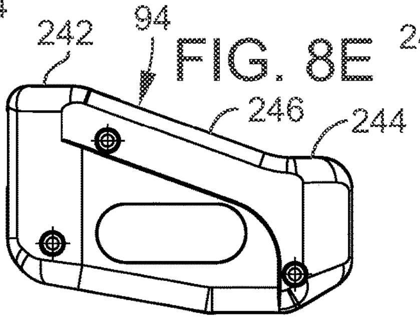
FIG. 8E
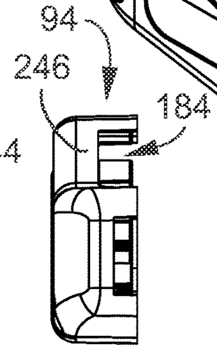
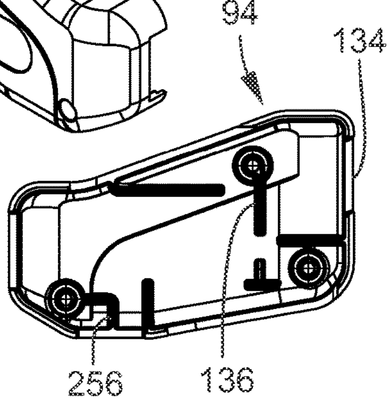
FIG. 8F
FIG. 8D
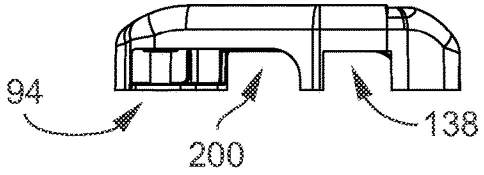
FIG. 8C
FIG. 8G
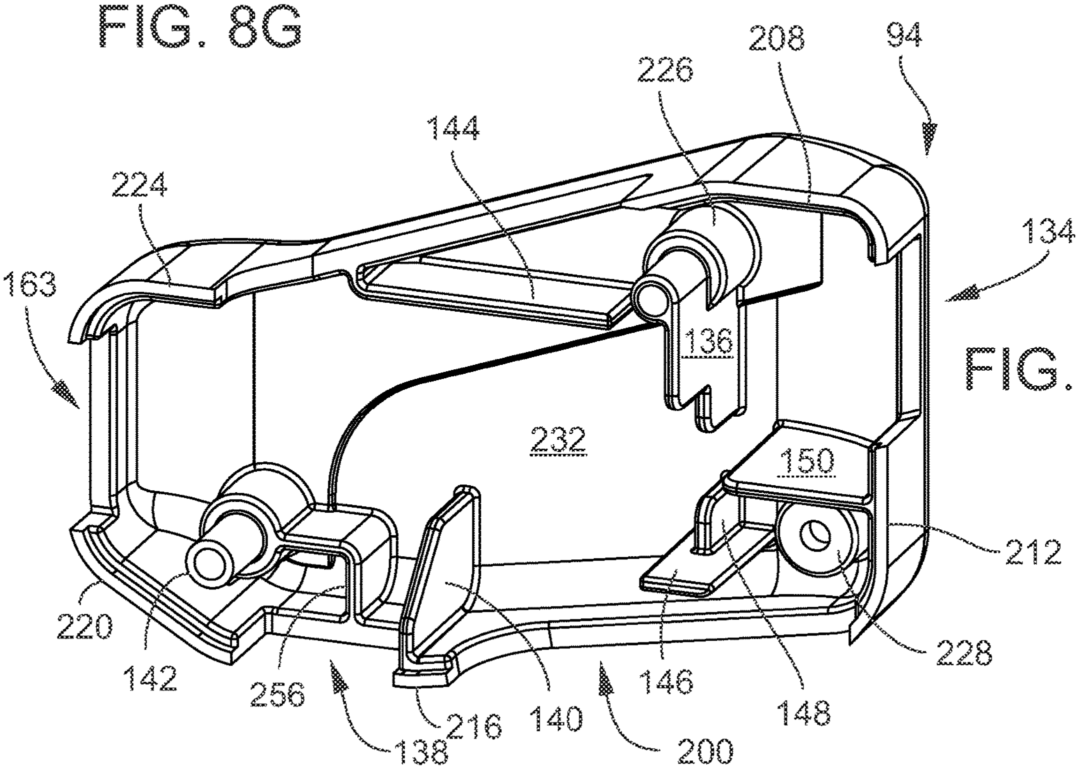
FIG. 8H FIG. 10B
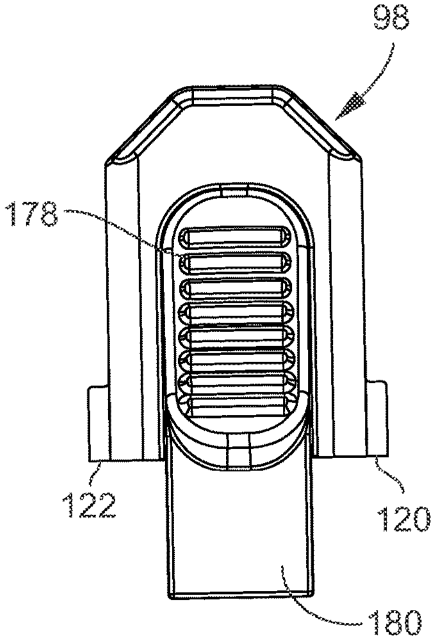
FIG. 10A
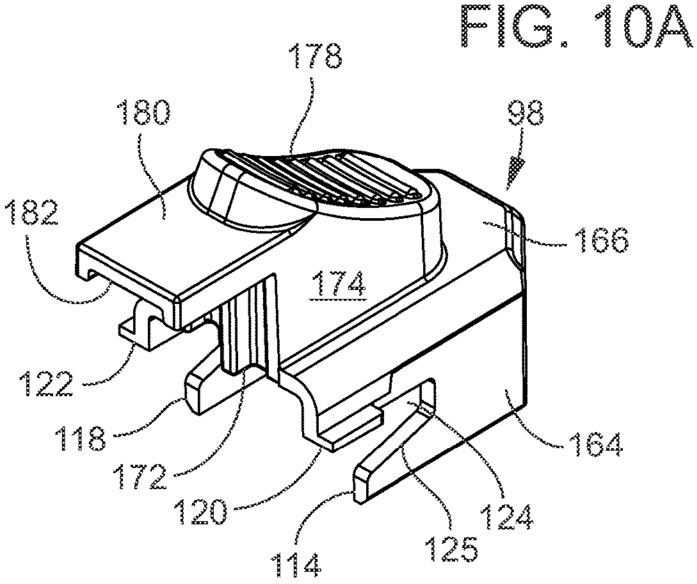
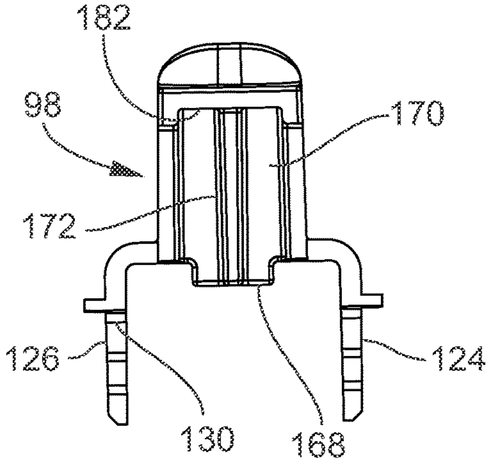
FIG. 10C
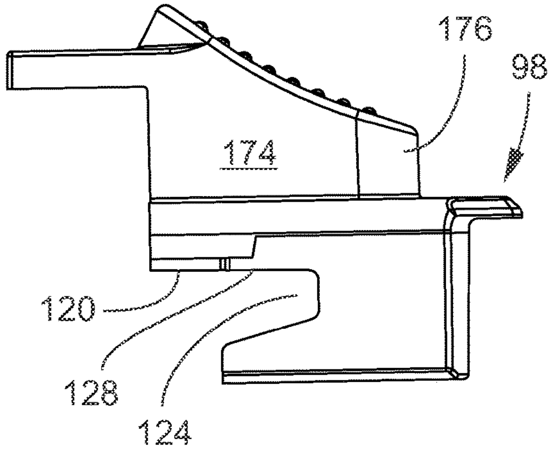
FIG. 10D FIG. 11B
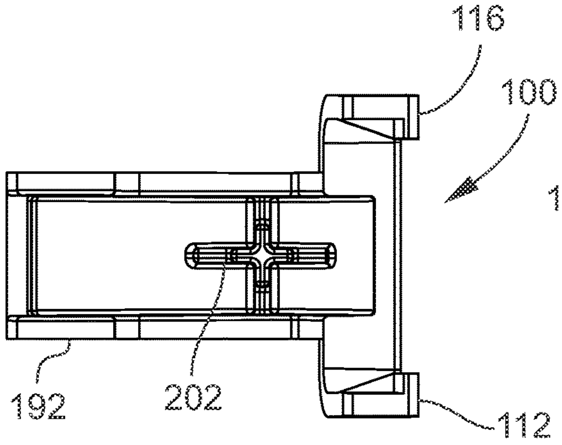
FIG. 11A
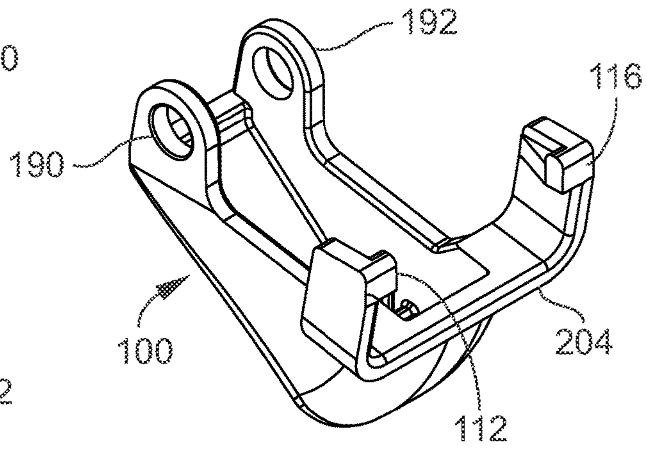
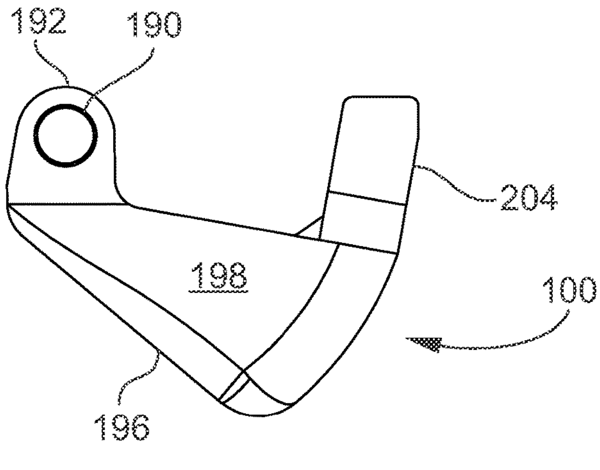
FIG. 11C
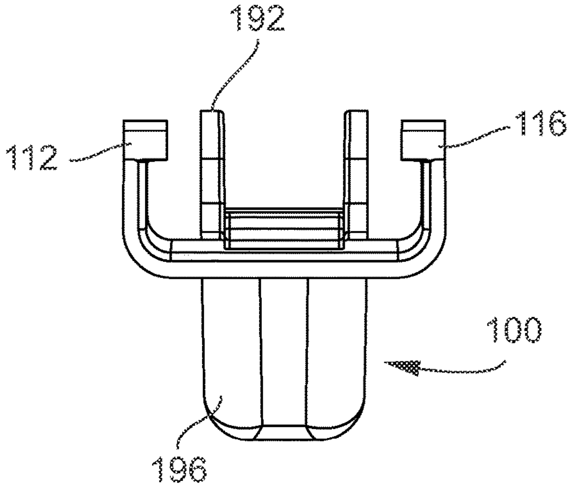
FIG. 11D

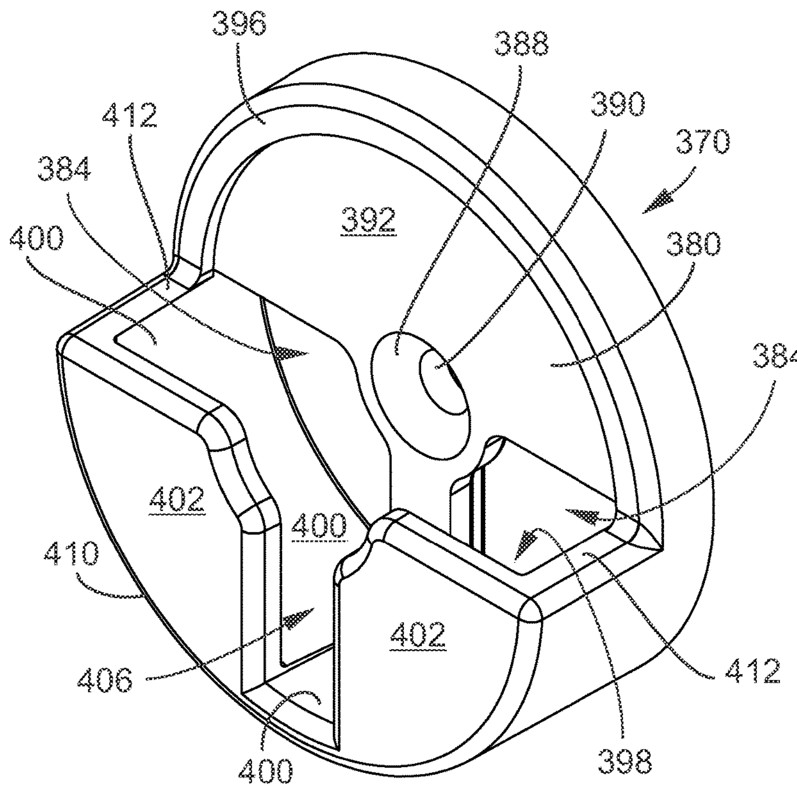
FIG. 23A
FIG. 23B
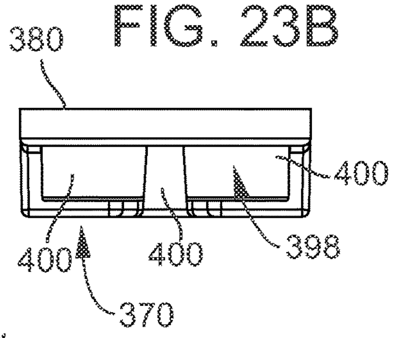
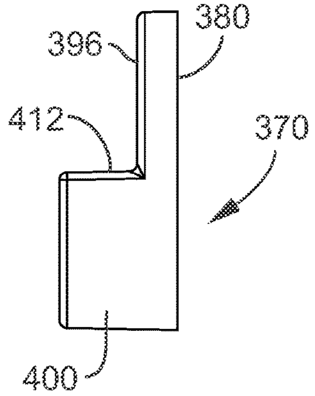
FIG. 23D
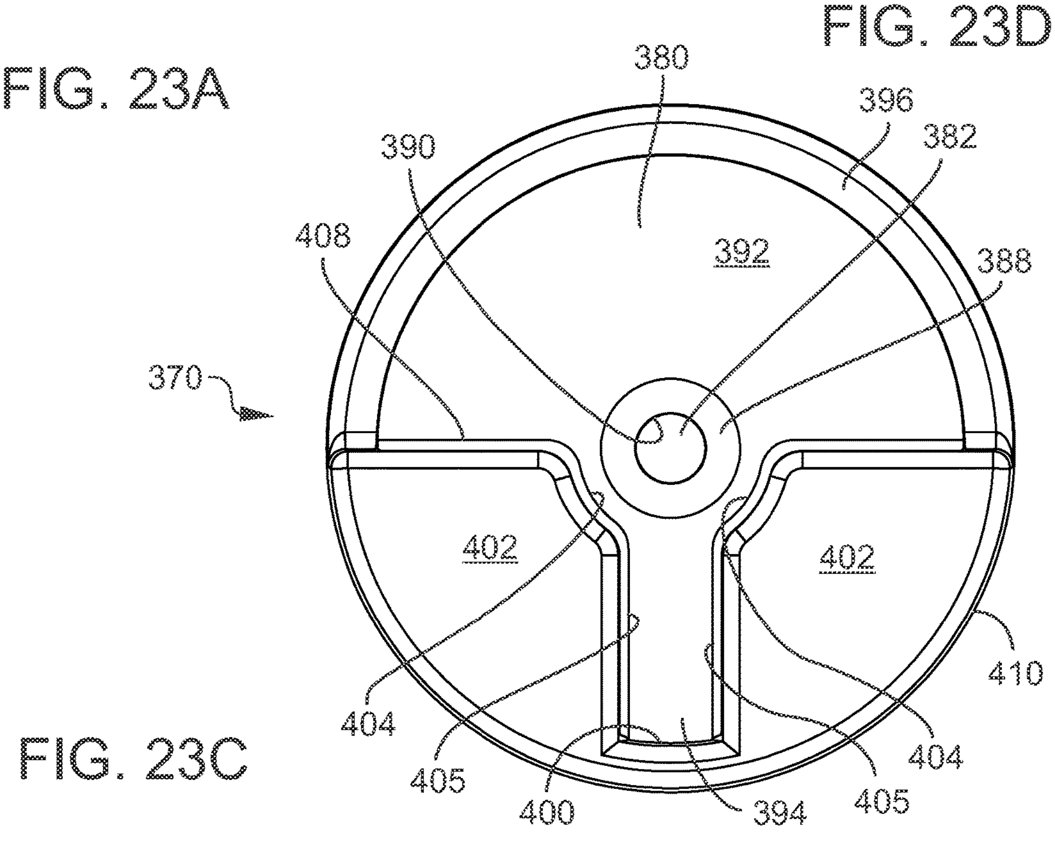
FIG. 23C

GATED BARRIER WITH ONE HAND LATCH APPARATUS

This application is a continuation of U.S. patent application Ser. No. 17/352,287 filed Jun. 19, 2021 (U.S. Pat. No. 11,814,892 issued Nov. 14, 2023) and claims the benefit thereof under 35 U.S.C. § 120, which application is a continuation of U.S. patent application Ser. No. 16/297,552 filed Mar. 8, 2019 (U.S. Pat. No. 11,041,340 issued Jun. 22, 2021) and claims the benefit thereof under 35 U.S.C. § 120, which application claims the benefit under 35 U.S.C. 119 (e) of U.S. Provisional Patent Application No. 62/642,495 filed Mar. 13, 2018, which nonprovisional and provisional applications are hereby incorporated by reference in their entireties into this application.

FIELD OF THE INVENTION

The present invention relates to gated barriers, and particularly to gated barriers for home residential use.

BACKGROUND OF THE INVENTION

A gated barrier for home use may have a latch apparatus that takes two hands to operate, a latch apparatus with a one step action to open a latch, a latch apparatus that employs two pivoting actions, a latch apparatus that employs two sliding actions, vertical support members that have a circular section, an arch separate from a latch apparatus, wall cups limiting lateral movement of the disk but not inwardly axial or inwardly longitudinal movement of the disk, interior vertical support members with no pattern supporting an arch on a gate, and no three dimensional information about the gate.

SUMMARY OF THE INVENTION

A feature of the present invention is the provision in a gated barrier, of an open top U-shaped frame having first and second end frame portions and a threshold frame portion between the first and second end frame portions.

Another feature of the present invention is the provision in a gated barrier, of a gate swingably engaged to the first end frame portion, where the gate includes first and second ends, where the first end is adjacent to an axis on which the gate swings, and where the second end is opposite of the first end.

Another feature of the present invention is the provision in a gated barrier, of a latch receiver engaged to the second end frame portion.

Another feature of the present invention is the provision in a gated barrier, of a latch apparatus engaged to the second end of the gate.

Another feature of the present invention is the provision in a gated barrier, of the latch apparatus having a latch apparatus housing.

Another feature of the present invention is the provision in a gated barrier, of the latch apparatus having a latch that slides at least partially into the latch receiver in a first direction, that slides at least partially out of the latch receiver in a second direction, that slides at least partially out of the latch apparatus housing in the first direction, and that slides at least partially into the latch apparatus housing in the second direction.

Another feature of the present invention is the provision in a gated barrier, of the latch apparatus having a latch puller slidingly engaged to the latch apparatus housing, where the latch puller is engaged to the latch such that the sliding the latch puller in the second direction slides the latch in the second direction.

Another feature of the present invention is the provision in a gated barrier, of the latch apparatus having a latch release that is pivotally engaged to the latch apparatus housing, where the latch release is pivotable between open and closed positions, where the latch release is biased to the closed position, where the latch release includes a stop that engages the latch puller when the latch release is in the closed position, where the latch release is pivotable away from the closed position such that the stop pivots away from an engagement with the latch puller to permit the latch puller to slide in the second direction.

Another feature of the present invention is the provision in a gated barrier, of a pivoting of the latch release permitting the latch puller to slide the latch in the second direction to disengage the latch from the latch receiver such that the gate may be swung open.

Another feature of the present invention is the provision in a gated barrier, of the gate including first and second frame portions, where the first and second frame portions are engaged to each other at a junction, where the first and second frame portions are offset from each other at the junction, and where the latch apparatus housing is engaged to the gate at the junction and hides from visible sight the junction.

Another feature of the present invention is the provision in a gated barrier, of the latch apparatus housing being engaged to each of the first and second frame portions and being further engaged over the first frame portion to hide from visible sight the first frame portion.

Another feature of the present invention is the provision in a gated barrier, of the gate including first and second frame portions, where the first and second frame portions are engaged to each other at a junction, where the first frame portion is straight, where the second frame portion is curved, and where the latch apparatus housing is engaged to the gate at the junction and hides from visible sight said junction.

Another feature of the present invention is the provision in a gated barrier, of the latch apparatus housing being engaged to each of the first and second frame portions and being further engaged over the first frame portion that is straight to hide from visible sight the first straight frame portion.

Another feature of the present invention is the provision in a gated barrier, of the latch being independent of the latch release such that the latch may be pushed in the second direction when the latch release is in the closed position and such that the latch may be pushed in the second direction when the latch release is in the open position.

Another feature of the present invention is the provision in a gated barrier, of the gate including a first frame portion, wherein the latch includes a latch body that is U-shaped and rides on the first frame portion in the first and second directions.

Another feature of the present invention is the provision in a gated barrier, of the latch puller being engaged to the latch in an interior of the latch body.

Another feature of the present invention is the provision in a gated barrier, of the latch puller including a latch puller body, where the latch puller body includes a U-shaped portion that slides on top of the latch.

Another feature of the present invention is the provision in a gated barrier, of the stop of the latch release being in an interior of the latch apparatus housing, where the stop of the latch release engages the latch puller in an interior of the latch apparatus housing.

Another feature of the present invention is the provision in a gated barrier, of the latch release pivoting at least partially into the latch apparatus housing and at least partially out of the latch apparatus housing.

Another feature of the present invention is the provision in a gated barrier, of the latch puller sliding at least partially into the latch apparatus housing and at least partially out of the latch apparatus housing.

Another feature of the present invention is the provision in a gated barrier, of, when the latch release is in the closed position, the latch puller being engaged by the latch release thereby preventing the latch puller from sliding and from pulling the latch in the second direction.

Another feature of the present invention is the provision in a gated barrier, of, when the latch release is in the closed position, the latch being slidable in the first and second directions.

Another feature of the present invention is the provision in a gated barrier, of the latch puller including a fully engaged position where the latch puller has engaged the latch and has fully pulled the latch in the second direction.

Another feature of the present invention is the provision in a gated barrier, of the latch including a fully latched position in the latch receiver and a fully unlatched position out of the latch receiver, and of the latch being in the fully unlatched position when the latch puller is in the fully engaged position, with the latch being restrained from sliding in the first direction toward the latch receiver when the latch puller is in the fully engaged position.

Another feature of the present invention is the provision in a gated barrier, of the latch release being held against pivoting from the open position to the closed position by the latch puller when the latch puller is in the fully engaged position.

Another feature of the present invention is the provision in a gated barrier, of the gate including first and second frame portions, where the first and second frame portions are engaged to each other at a junction, and where the latch apparatus housing is engaged to the gate at the junction and hides from visible sight the junction.

Another feature of the present invention is the provision in a gated barrier, of the first and second frame portions being offset from each other at the junction.

Another feature of the present invention is the provision in a gated barrier, of the first frame portion being straight and of the second frame portion being curved.

Another feature of the present invention is the provision in a gated barrier, of the latch apparatus housing being further engaged over the first frame portion and hiding from sight the first frame portion.

Another feature of the present invention is the provision in a gated barrier, of the second end of the gate including an end vertical support member, where the latch apparatus housing engages each of the first frame portion, the second frame portion, and the end vertical support member.

Another feature of the present invention is the provision in a gated barrier, of the latch apparatus housing including a rear end portion and a front end portion and an upper surface running from the rear end portion to the front end portion, of the upper surface having a rear horizontal section at the rear end portion, of the upper surface having a front horizontal section at the front end portion, and of the upper surface being oblique from the rear horizontal section to the front horizontal section to track a curve of the second frame portion.

Another feature of the present invention is the provision in a gated barrier, of the gate including an uppermost frame member that includes an arch frame portion, and of the arch frame portion extending from the first end of the gate and terminating short of the second end of the gate.

Another feature of the present invention is the provision in a gated barrier, of a straight frame portion extending from the second end of the gate to the arch frame portion.

Another feature of the present invention is the provision in a gated barrier, of the first gate including an uppermost frame member, a lowermost frame member, and a first vertical frame member extending from the uppermost frame member to the lowermost frame member, and of the first vertical frame member being tubular and having an oblong shape in section from the uppermost frame member to the lowermost frame member.

Another feature of the present invention is the provision in a gated barrier, of the oblong shape including two spaced apart and opposing parallel sides and two spaced apart and opposing curved sides.

Another feature of the present invention is the provision in a gated barrier, of the two spaced apart and opposing curved sides being circular.

Another feature of the present invention is the provision in a gated barrier, of a second gate within the first gate, where the second gate is swingable relative to the first gate, where the second gate is coplanar with the first gate when the second gate is closed, where the second gate includes a top and bottom and a second vertical frame member extending from the top to the bottom of the second gate, and where the second vertical frame member is tubular and includes an oblong shape in section from the top to the bottom of the second gate.

Another feature of the present invention is the provision in a gated barrier, of a frame extension, where the frame extension is engagable to one of the first and second end frame portions, where the frame extension includes a top and bottom and a third vertical frame member extending from the top to the bottom of the frame extension, and where the third vertical frame member is tubular and includes an oblong shape in section from the top to the bottom of the frame extension.

Another feature of the present invention is the provision in a gated barrier, of a set of first, second, third, and fourth hand wheel apparatus, the first hand wheel apparatus engaging the first end frame portion, the second hand wheel apparatus engaging the second end frame portion, the third hand wheel apparatus engaging one of the first end frame portion and threshold frame portion, the fourth hand wheel apparatus engaging one of the second end frame portion and threshold frame portion, of each of the first, second, third, and fourth hand wheel apparatus comprising a threaded shaft, a hand wheel turnable on and threadingly engaged to the threaded shaft, and a disk engaged to an end of the threaded shaft, of a set of first, second, third, and fourth wall cups for engaging said disks of the first, second, third, and fourth hand wheel apparatus, of the first and third wall cups engaging the first structure, the second and fourth wall cups engaging the second structure, and of each of the first, second, third, and fourth wall cups including a back wall portion, a front wall portion, and a sidewall portion between the back and front wall portions, where the sidewall portion and front wall portion define a socket for seating the disk, where the disk is between the back and front wall portions when seated in the socket to minimize chances that the disk is disengaged in an axial direction from the wall cup.

Another feature of the present invention is the provision in a gated barrier, of the front wall portion of the wall cup including an upper edge, where the upper edge defines a straight line that traverses a diameter of the wall cup and intersects a center of the wall cup such that substantially one-half of the disk is seated in the socket to maximize surface area of the disk that can be entrapped by the socket.

Another feature of the present invention is the provision in a gated barrier, of the front wall portion of the wall cup including a slot such that an end user can see the disk in the socket.

Another feature of the present invention is the provision in a gated barrier, of the sidewall portion of the wall cup being circular.

Another feature of the present invention is the provision in a gated barrier, of the gate including a foot opening defined in part by a horizontal frame portion, where the gate is vertically slideable downwardly when a foot is placed in the foot opening and the horizontal frame portion is pressed down by the foot, and where the latch receiver is bottomless such that the latch disengages from the latch receiver in a downward direction.

Another feature of the present invention is the provision in a gated barrier, of the gated barrier being a pressure gated barrier where the first and second end frame portions are brought into a parallel relationship by operation of one or more of first, second, third, and fourth hand wheel apparatus, of the pressure gated barrier having a state prior to set up where the first and second end frame portions are in a nonparallel relationship, of a tag extending from the second end frame portion, to the gate, through the gate, and back to the second end frame portion when the pressure gate barrier is in the state prior to set up where the first and second end frame portions are in a nonparallel relationship, and of the tag having a printed warning thereon.

Another feature of the present invention is the provision in a gated barrier, of the gate including an uppermost frame portion, where the uppermost frame portion includes an arch section, and where the gate includes a lowermost frame member, of the gate including a first end vertical member at the first end of the gate, where the gate includes a second end vertical member at the second end of the gate, and of the gate including a set of interior vertical support members, where the interior vertical support members extend from the lowermost frame portion to the arch section of the uppermost frame portion, and where two of the interior vertical support members have the same height.

An advantage of the present invention is that the latch apparatus may be operated by one hand.

Another advantage of the present invention is that the hand that operates the latch apparatus may at the same time swing open the gate.

Another advantage of the present invention is that the latch apparatus requires two steps to draw back the latch. First, the latch release must be squeezed to unlock the latch puller. Second, the latch puller must be drawn back to draw back the latch.

Another advantage of the present invention is that the two steps required to draw back the latch are overlapping. The latch release must not only be squeezed but also held in the squeezed position while the latch puller is being drawn back to draw back the latch.

Another advantage of the present invention is that the first step of operating the latch release is against tension. Hence, if the latch release is not held at its open position, the latch release automatically reverts to its closed position where the latch release locks the latch puller against sliding.

Another advantage of the present invention is that the second step of operating the latch puller is against tension. Thus, the latch puller must be held in an open position until the gate is being opened. Otherwise the gate automatically reverts to a locked position where the latch again resides in the latch receiver.

Another advantage of the present invention is that the two step mechanical process of operating the present latch apparatus and opening the present gate is a relatively easy process for an adult or older child and, at the same time, a relatively difficult process for a toddler.

Another advantage of the present invention is that the latch, if in its extended position out of the latch apparatus housing, is automatically retractable regardless of whether the latch release is in the open or closed position, such that the gate may be closed from an open position where the latch is in an extended position. Such feature, along with the oblique faces of the latch receiver, permits the gate to be closed without operating the latch apparatus.

Another advantage of the present invention is aesthetics. The present invention includes an uppermost frame member that runs from one end of the gate to the other end of the gate. It would appear that this uppermost frame member is an arch. However, only a first portion of the uppermost frame member is an arch. A second and final portion of the uppermost frame member is a straight portion. The first frame portion, the arched portion, and the second frame portion, the straight portion, are engaged at a junction. This junction and the second frame member, the straight portion, are tucked inside of the latch apparatus housing so as to make it appear that the arch travels from the top of one end of the gate to the top of the second end of the gate and to make it appear that the arch is a perfect arch.

Another advantage of the present invention is that the gated barrier is strong and light. This combination of features is provided by vertical support members that are oblong in section.

Another advantage of the present invention is that the gate barrier includes wall cups that trap the disk of the hand wheel apparatus in the longitudinal direction as well as the lateral direction. The entrapment is accomplished by employing a front half wall on the wall cup so as to counter an inner longitudinal force placed on the disk such as by gates that are opened by a foot pressing down upon a frame member to draw a latch downwardly out of a bottomless latch receiver.

Another advantage of the present invention is the unique placement of a warning tag on a gate. A pressurized gated barrier includes a pressure gate where, to set up the gate properly, end frame members of the gate are brought from a nonparallel relationship to a parallel relationship. In such a pressure gate, prior to set up, the latch and latch receiver are spaced apart from each other such that it appears that the gate is defective when in fact it is not. To draw the latch and latch receiver together, the nonparallel end frame portions are brought into a parallel relationship by setting up the gate and operating hand wheel apparatus to draw the end frame portions into a parallel relationship. To inform the end user of such, a tag extends from one end frame portion, to and through the gate, and back to the end frame portion. This is a three dimensional piece of information or three dimensional warning.

Another advantage of the present invention is the combination of an arched uppermost support member and interior vertical support members of the same height to support the arched uppermost support member. By employing one set of two interior vertical support members of a first height and a second set of two interior vertical support members of a second height, manufacturing costs are reduced. One pattern that may be employed is, in sequence, an interior support member of height A, and interior support member of height B, an interior support member of height C, and interior support member of height B, and an interior support member of height A, where height C is greater than height B, and where height B is greater than height C.

BRIEF DESCRIPTION OF THE DRAWINGS

FIG. 8A is a perspective view of the outside of the right hand housing portion of the housing for the latch apparatus of FIG. 2B.

FIG. 8B is a top view of the right hand housing portion of FIG. 8A.

FIG. 8C is an inside elevation view of the right hand housing portion of FIG. 8A.

FIG. 8D is a front end elevation view of the right hand housing portion of FIG. 8A.

FIG. 8E is an outside elevation view of the right hand housing portion of FIG. 8A.

FIG. 8F is a rear end elevation view of the right hand housing portion of FIG. 8A.

FIG. 8G is a bottom view of the right hand housing portion of FIG. 8A.

FIG. 8H is a perspective view of the inside of the right hand housing position of FIG. 8A.

FIG. 10A is a perspective view of the latch puller of the latch apparatus of FIG. 2B.

FIG. 10B is a top view of the latch puller of FIG. 10A.

FIG. 10C is a rear end elevation view of the latch puller of FIG. 10A.

FIG. 10D is a side elevation view of the latch puller of FIG. 10A.

FIG. 11A is a perspective view of the latch release of the latch apparatus of FIG. 2B.

FIG. 11B is a top view of the latch release of FIG. 11A.

FIG. 11C is a side elevation view of the latch release of FIG. 11A.

FIG. 11D is a front end elevation view of the latch release of FIG. 11A.

FIG. 23A is a perspective view of the wall cup of FIG. 21.

FIG. 23B is a top view of the wall cup of FIG. 23A.

FIG. 23C is a front elevation view of the wall cup of FIG. 23A.

FIG. 23D is a side elevation view of the wall cup of FIG. 23A.

DESCRIPTION

Figure 1:
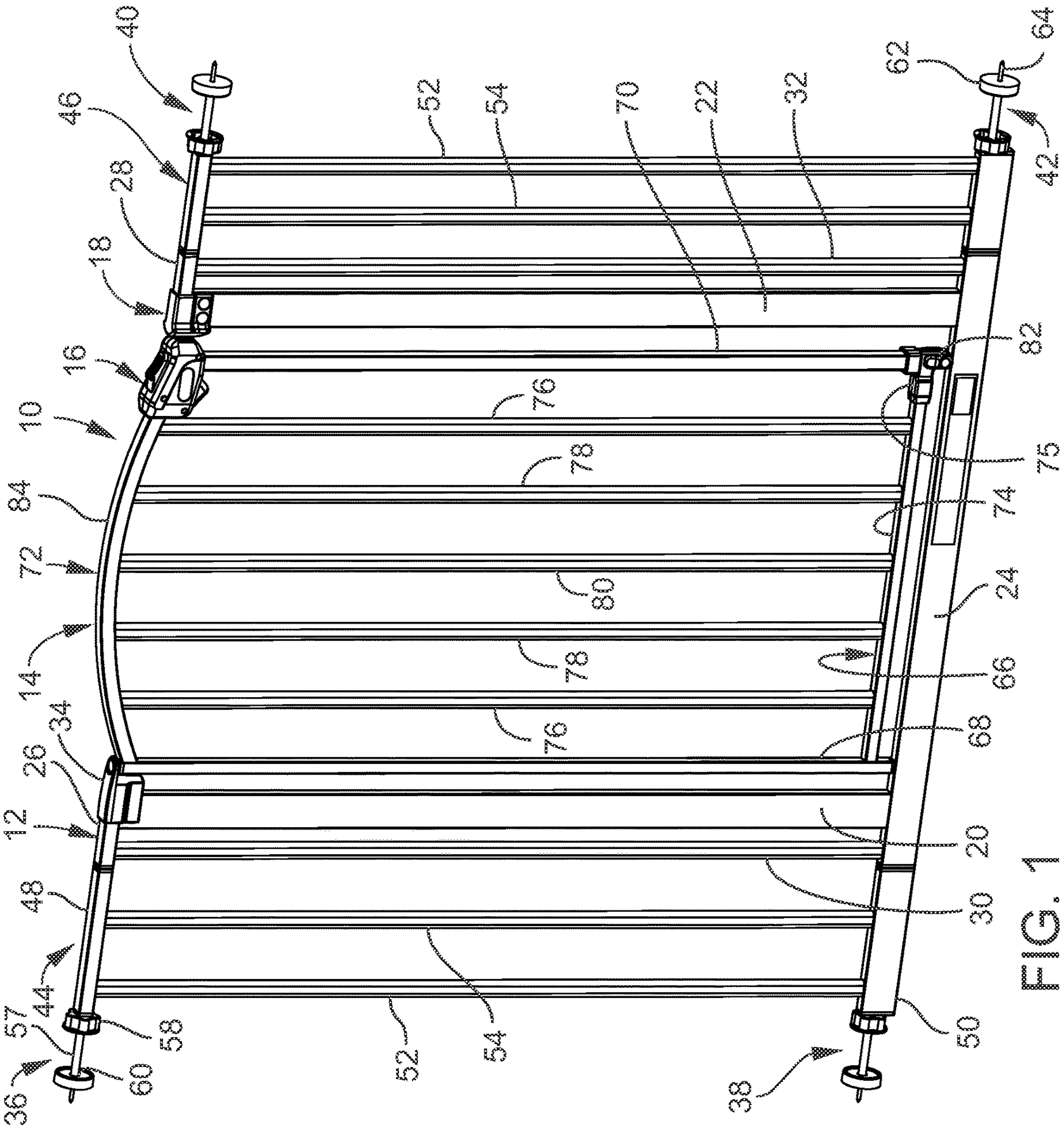
FIG. 1 is a perspective view of the gated barrier of the present invention.

As shown in FIG. 1, a gated barrier is indicated by the reference number 10. Gated barrier 10 includes a barrier frame 12, a gate 14, a latch apparatus 16, and a latch receiver 18.

The barrier frame 12 is one-piece and integral and includes a first upright standard 20, a second standard 22 and a horizontally extending lowermost threshold frame member 24. The standards 20, 22 and threshold 24 form an upright U-shape so as to include an open top. Standards 20, 22, and threshold 24 are tubular and formed of metal such as steel or aluminum. Standards 20, 22 and threshold 24 are rectangular in section. Standard 20 is offset from one end of threshold 24. Standard 22 is offset from the other end of threshold 24.

Barrier frame 12 includes an outwardly extending horizontal upper frame member 26 that extends in a one-piece and integral fashion outwardly from the top of standard 20. Barrier frame 12 includes an outwardly extending horizontal upper frame member 28 that extends in a one-piece and integral fashion outwardly from the top of standard 22. Upper frame members 26, 28 are square in section and tubular and formed of metal such as steel or aluminum.

Barrier frame 12 includes a vertically extending frame member 30 extending to and between the upper frame member 26 and the threshold 24. Vertical frame member 30 runs parallel to standard 20. Vertical frame member 30 is one-piece and integral with upper frame member 26 and threshold 24. Vertical frame member 30 is oblong shaped in section from the upper frame member 26 to the threshold 24. Vertical frame member 30 is tubular and formed of metal, such as steel or aluminum. Vertical frame member 30 is spaced inwardly from the outer end of upper frame member 26 and its respective outer end of the threshold 24. Vertical frame member 30 is adjacent to and spaced apart from standard 20. Vertical frame member 30 is set outwardly of standard 20.

Barrier frame 12 includes a vertically extending frame member 32 extending to and between the upper frame member 28 and the threshold 24. Vertical frame member 32 runs parallel to standard 22. Vertical frame member 32 is one-piece and integral with upper frame member 28 and threshold 24. Vertical frame member 32 is oblong shaped in section from the upper frame member 28 to the threshold 24. Vertical frame member 32 is tubular and formed of metal, such as steel or aluminum. Vertical frame member 32 is spaced inwardly from the outer end of upper frame member 28 and its respective outer end of the threshold 24. Vertical frame member 32 is adjacent to and spaced apart from standard 22. Vertical frame member 32 is set outwardly of standard 22.

Barrier frame 12 includes an upper inwardly extending piece 34 that is one-piece with the barrier frame 12 and is formed of plastic. Piece 34 includes a receiver formed therein for receiving an upper and inner corner of standard 20. The receiver extends upwardly from a bottom of the piece 34 and inwardly from an outer side of the piece 34. The receiver is internal of piece 34.

Barrier frame 12 includes the latch receiver 18. Latch receiver 18 is an upper inwardly extending piece that is one-piece with the barrier frame 12 and is formed of plastic. Latch receiver 18 includes a receiver formed therein for receiving an upper and inner corner of standard 22. The receiver extends upwardly from a bottom of the latch receiver 18 and inwardly from an outer side of the latch receiver 18. The receiver is internal of the latch receiver 18.

Gated barrier 10 is a pressure gate. That is, at the factory the barrier frame 12 is manufactured so as to naturally space the latch receiver 18 from the latch apparatus 16. One way to achieve such a result is to fabricate the inside angle between the threshold 24 and the standard 22 to be obtuse. Obtuse means greater than a ninety degree angle. Another way to achieve such a result is to fabricate the inside angle between the threshold 24 and standard 20 to be obtuse. Another way to achieve such a result is to fabricate the barrier frame 12 such that both such inside angles are obtuse. Such inside angles are the angles between the inner edges of the standards 20, 22 and the upper edge of the threshold 24. At the time up set up, the end user operates the hand wheel apparatus 36, 38, 40, 42 to fix the gated barrier 10 between two opposing vertical surfaces. Namely, the end user operates hand wheel apparatus 40 to push the latch receiver 18 into an operating relationship with the latch apparatus 16. A proper operating state of the gated barrier 10 is where, for example, the axis of standard 20 is drawn or pushed to become parallel with the axis of standard 22 or where, for example, the axis of standard 22 is drawn or pushed into a right angle with the axis of threshold 24 or where, for example, the axis of standard 20 is drawn or pushed into a right angle relationship with the axis of threshold 24 or where, for example, the axis of standard 20 and the axis of standard 22 is drawn or pushed into a right angle relationship with the axis of threshold 24. The pressure bias of the pressure gate or gated barrier 10 is maintained naturally over the life of the gated barrier 10 such that when the hand wheels 36, 38, 40, 42 are operated so as to take down the gated barrier 10, the latch receiver 18 will naturally draw apart from the latch apparatus 16. In other words, one or more of such inside angles will return to the obtuse state in which it was fabricated.

Figure 14:
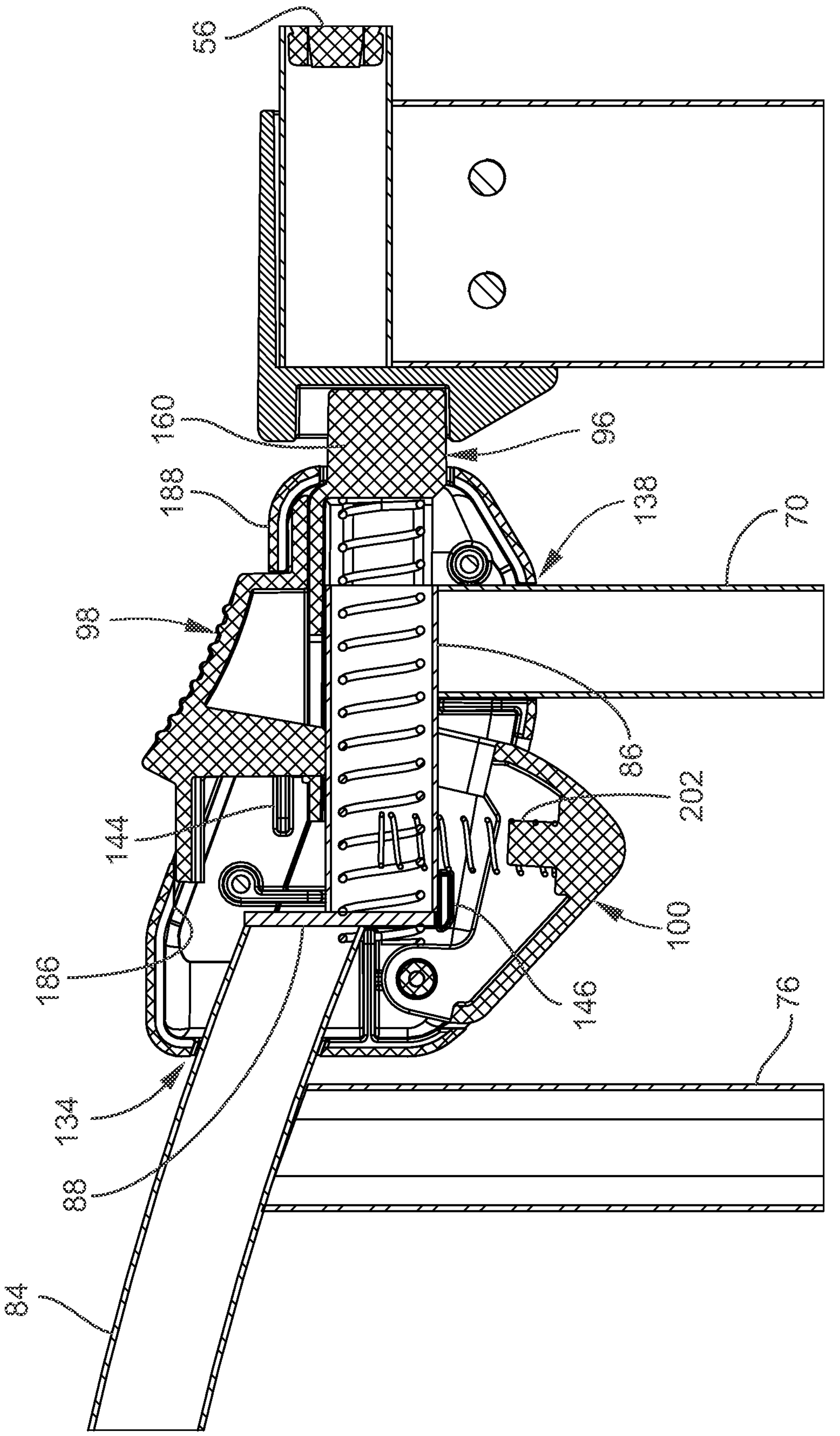
FIG. 14 is a side section view of the latch apparatus of FIG. 2B.

Frame 12 may include frame extensions 44 and 46. Each of the frame extensions 44, 46 includes upper and lower horizontally extending frame members 48, 50. Upper frame member 48 is square in section, tubular, formed of metal such as steel or aluminum, and includes the same depth and height as upper frame member 26. Lower frame member 50 is rectangular in section, tubular, formed of metal such as steel or aluminum, and includes the same depth and height as the threshold 24. Integral and one-piece with the upper and lower frame members 48, 50 are a pair of vertically extending frame members 52, 54. Each of the vertically extending frame members 52, 54 are oblong in section from the upper frame member 48 to the lower frame member 50, tubular, and formed of metal such as steel or aluminum. Vertical frame member 52 is an outer frame member. Vertical frame member 54 is an inner frame member. Vertical frame members 52, 54 are adjacent to and spaced apart from each other. Vertical frame member 52 is spaced inwardly from the outer ends of frame members 48, 50. Vertical frame member 54 is spaced outwardly from the inner ends of frame members 48, 50. Inner vertical frame member 54 is adjacent to and spaced apart from standard 20. Each of the inner ends of each of the upper and lower frame members 48, 50 includes a rod rigidly affixed thereto and extending inwardly. The rod is inserted into an opening in a piece or plug 56 that closes off the otherwise open outer end of the threshold 24 and upper frame member 26 or 28. Piece or plug 56 is shown in FIG. 14. The opening in this piece or plug 56 is the opening that receives a shaft of one of the hand wheel apparatus 36, 38, 40, 42. Such piece or plug 56 may be frictionally set in such open end or may be welded to such open end. This piece or plug 56 closes off the a) the otherwise open outer ends of the threshold 24, b) the otherwise open outer end of the upper horizontal frame member 26, c) the otherwise open outer end of upper horizontal frame member 28, d) the otherwise open inner ends of upper frame members 48, e) the otherwise open inner ends of the lower frame members 50, f) the otherwise open outer ends of the upper frame members 48, and g) the otherwise open outer ends of the lower frame members 50. All pieces or plugs 56 include a circular opening. In the pieces or plugs 56 found on the inner ends of upper and lower frame members 48, 50, the above mentioned rod that is rigidly affixed to such inner ends extends through the circular opening found in such pieces or plugs 56. Such rod then extends through the circular opening in the adjacent piece or plug 56 found 1) on the outer ends of the threshold 24, 2) the outer end of upper frame member 265, and 3) the outer end of upper frame member 28.

The gated barrier 10 includes the hand wheel apparatus 36, 38, 40, 42. Each of the hand wheel apparatus 36, 38, 40, 42 includes a threaded shaft 57, a hand wheel 58 turnable on and threadingly engaged to the threaded shaft 57, and a disk 60 fixedly engaged to the outer end of the threaded shaft 57. The threaded shaft 57 slidingly engages the circular opening in the piece or plug 56 without threadingly engaging such circular opening. The hand wheel 58 includes an inner face that brings pressure to bear on the piece or plug 56 or on any outer end of 1) upper frame member 26, 2) upper frame member 28, 3) any of the upper frame members 48, 4) the threshold 24, and 5) any of the lower frame members 50. The disk 60 may be received in a wall cup 62 that is anchored to a vertical surface by, for example, a pin connector 64. When the hand wheel 58 is turned so as to travel axially inwardly, the hand wheel 58 lengthens the effective distance of the threaded shaft 57 between the vertical surface and the gated barrier 10, thereby pressurizing the gated barrier 10 and pushing in the latch receiver 18 to the latch apparatus 16.

Gate 14 includes a gate frame 66. Gate frame 66 includes a vertically extending end frame member 68 that defines the swing or pivot axis of the gate 14. Vertical frame member 68 is pivotally engaged between piece 34 and the upper face of threshold 24. Vertical frame member 68 is tubular, square in section, and formed of a metal such as steel or aluminum. A pin engages the upper end of vertical frame member 68 to piece 34 and another pin engages the lower end of vertical frame member 68 to the threshold 24. Opposite of vertical end frame member 68, gate frame 66 includes a vertically extending end frame member 70 that is tubular, square in section, and formed of a metal such as steel or aluminum.

Vertical end frame members 68, 70 are engaged to each other by an uppermost frame member 72 and a lowermost frame member 74. Frame members 72, 74 are tubular, square in section, and formed of metal such as steel or aluminum. Uppermost frame member 72 extends from an upper portion of vertical frame member 68, through the latch apparatus 16, to an upper portion of vertical end frame member 70. Lowermost frame member 74 extends from a lower portion of vertical frame member 68 to an L-shaped piece 75 that is fixed to and between ends of lowermost frame member 74 and vertical frame member 70.

Gate frame 66 includes a pair of internal vertical support members 76 that are equal in height. Gate frame 66 includes a pair of internal vertical support members 78 that are equal in height and have a longer length than internal vertical support members 76. Gate frame 66 includes a single internal vertical support member 80 that is longer length than internal vertical support members 76 and 78. Each of the internal vertical support members 76, 78, 80 are oblong in section, tubular, and formed of a metal such as steel or aluminum. Each of the internal vertical support members 76, 78, 80 are engaged to and between the uppermost frame member 72 and the lowermost frame member 74. Vertical support members 68, 70, 76, 78, 80 are adjacent to and spaced apart from at least one other vertical support member

68, 70, 76, 78, 80. End vertical support members 68, 70 are adjacent to and spaced apart from standards 20, 22, respectively.

Gate 14 includes a pair of turn up and turn down arms 82 that are pivotally affixed to the L-shaped piece 75. The arms 82 may be independent of each other, such that arms 82 may be turned up and down independently of the other arm 82. The arms 82 may be fixed to each other such that turning one arm 82 necessarily turns the other arm 82. The arms 82 engage opposing faces of the threshold 24 to prevent swinging of the gate 14 both ways or one way.

Figure 2A:
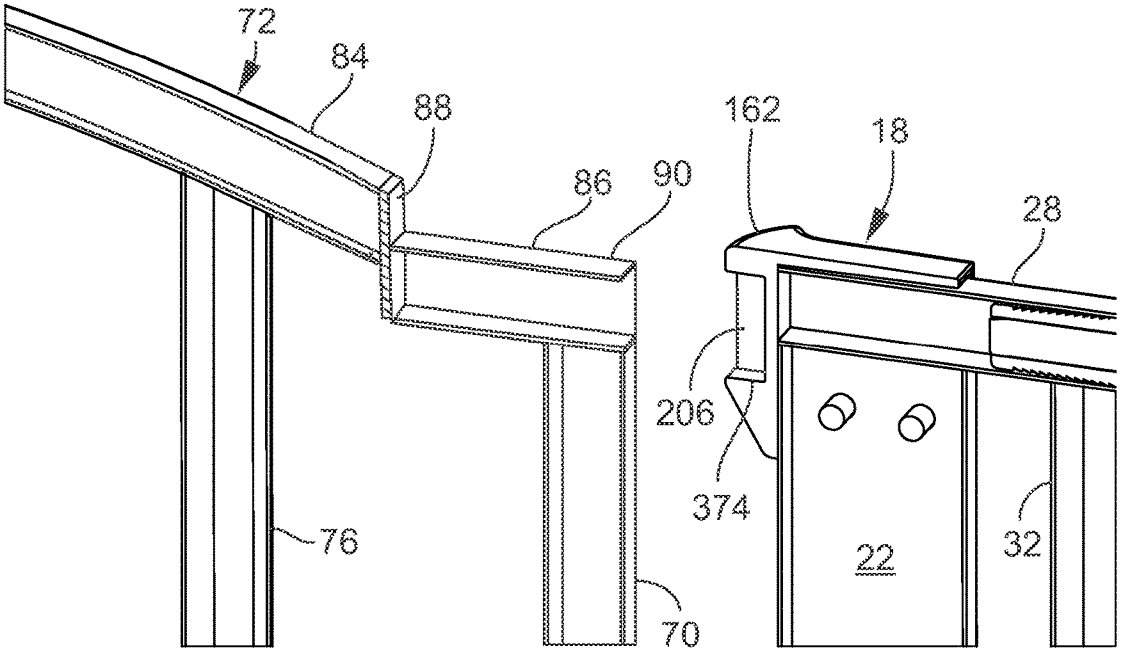
FIG. 2A is a perspective section view of a portion of gated barrier of FIG. 1, showing a portion of the frame of the gate without a latch apparatus.

FIG. 2A shows the uppermost frame member 72. Uppermost frame member 72 includes an arched portion 84 and a straight portion 86. Arched portion 84 and straight portion 86 are one-piece and integral with each other. Arched portion 84 is square in section, tubular, and formed of a metal such as steel or aluminum. Straight portion 86 is square in section, tubular, and formed of a metal such as steel or aluminum. A vertical plate 88 is welded to and between adjacent ends of the arched portion 84 and straight portion 86.

The axis of the arched portion 84 includes an apex where the arched portion 84 intersects with the vertical axis of central vertical frame member 80. The axis of the arched portion 84 then curves or depends symmetrically from such apex to the intersection with the axis of vertical frame members 78, then further curves or depends symmetrically to the intersection with the axis of vertical frame members 76, and then further curves or depends symmetrically to the intersection with the axis of end vertical frame member 68 with end vertical frame member 70, even though such axis, of course, does not include an associated physical component where the straight portion 86 extends from the end vertical support member 70 to the vertical plate 88. Straight portion 86 is set upon or welded upon the top of end vertical support member 70. Opposing outer and inner faces of end vertical support member 70 define opposing planes that, in turn, define a square section 90 of straight portion 86 when the opposing planes are imagined to extend upwardly.

The arched portion 84 includes an upper surface. This upper surface is adjacent to the upper surface of end vertical support member 68. This upper surface defines an arc such that this arc intersects end vertical support member 68 at a point adjacent to the upper surface or top of end vertical support member 68. This arc, on the other side of the gate 14, intersects the square section 90 of the straight portion 86 at a point adjacent to the upper surface or top of the square section 90. Since such arc intersects the end vertical support member 68 and the square section 90 at points adjacent to the upper surfaces or tops of the end vertical support member 68 and square section 90, the arc and its arched portion 84 are perched symmetrically on the gate 14. The center of such arc is on the axis of center vertical support member 80.

When gate 14 is closed, the gated barrier 10 defines a plane. Gate 14 defines a plane. Standards 20 and 22 define a plane. Vertical support members 68, 70, 76, 78 and 80 define a plane. Frame extension 44 defines a plane. Frame extension 46 defines a plane. Gated barrier 10 and frame extensions 44, 46, when engaged to the threshold 24 and upper horizontal support members 26, 28, define a plane. Threshold 24 and upper horizontal support members 26, 28 define a plane.

Figure 2B:
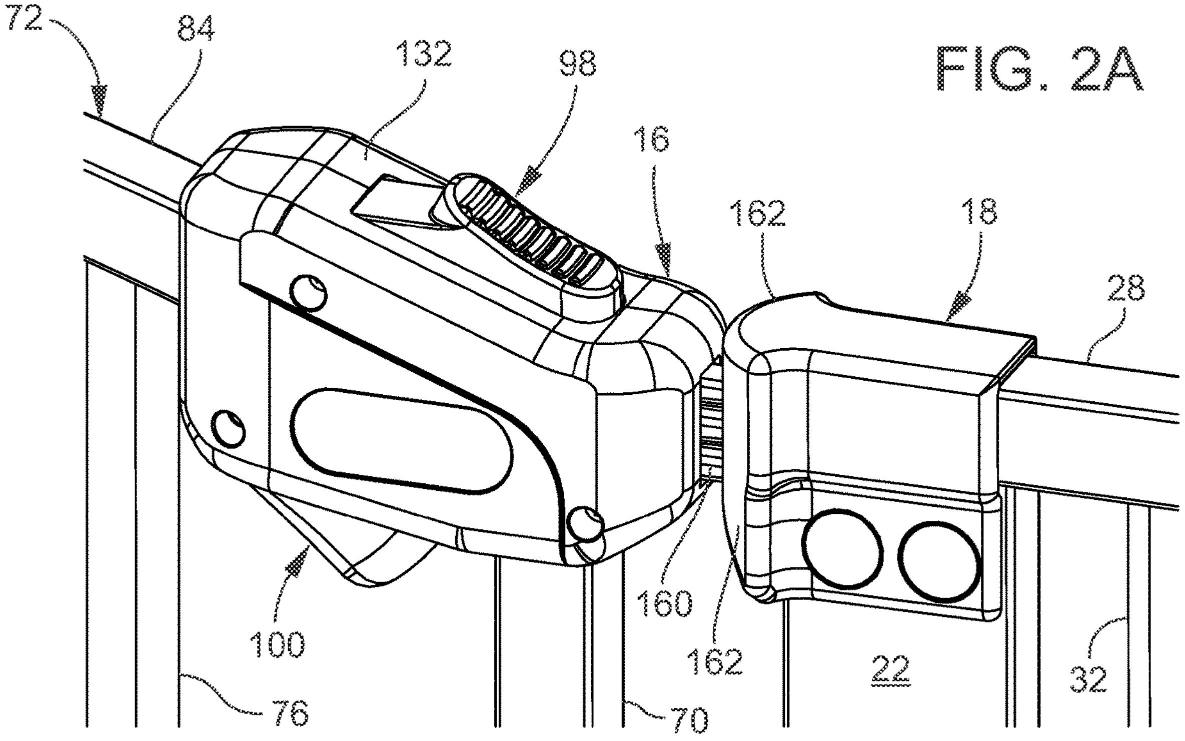
FIG. 2B is a perspective view of the latch apparatus of the gated barrier of FIG. 1.

Lowermost horizontal frame member 74 is straight, is set at a right angle to end vertical support members 68, and is further set at a right angle to end vertical support member 70. Uppermost frame member 72 completes the periphery that includes the lowermost horizontal frame member 74 and end vertical support members 68 and 70. Uppermost frame member 72 includes the arched portion 84 and the straight portion 86. The arched portion 84 and the straight portion 86 make up the uppermost frame member 72. This periphery includes the latch apparatus 16. As shown by a comparison of FIGS. 2A and 2B, the latch apparatus 16 hides the break in the arc or hides the hard transition from the arched portion 84 to the straight portion 86. The latch apparatus 16 wholly encapsulates the straight portion 86. The latch apparatus 16 encapsulates a section of the arched portion 84.

Figure 3:
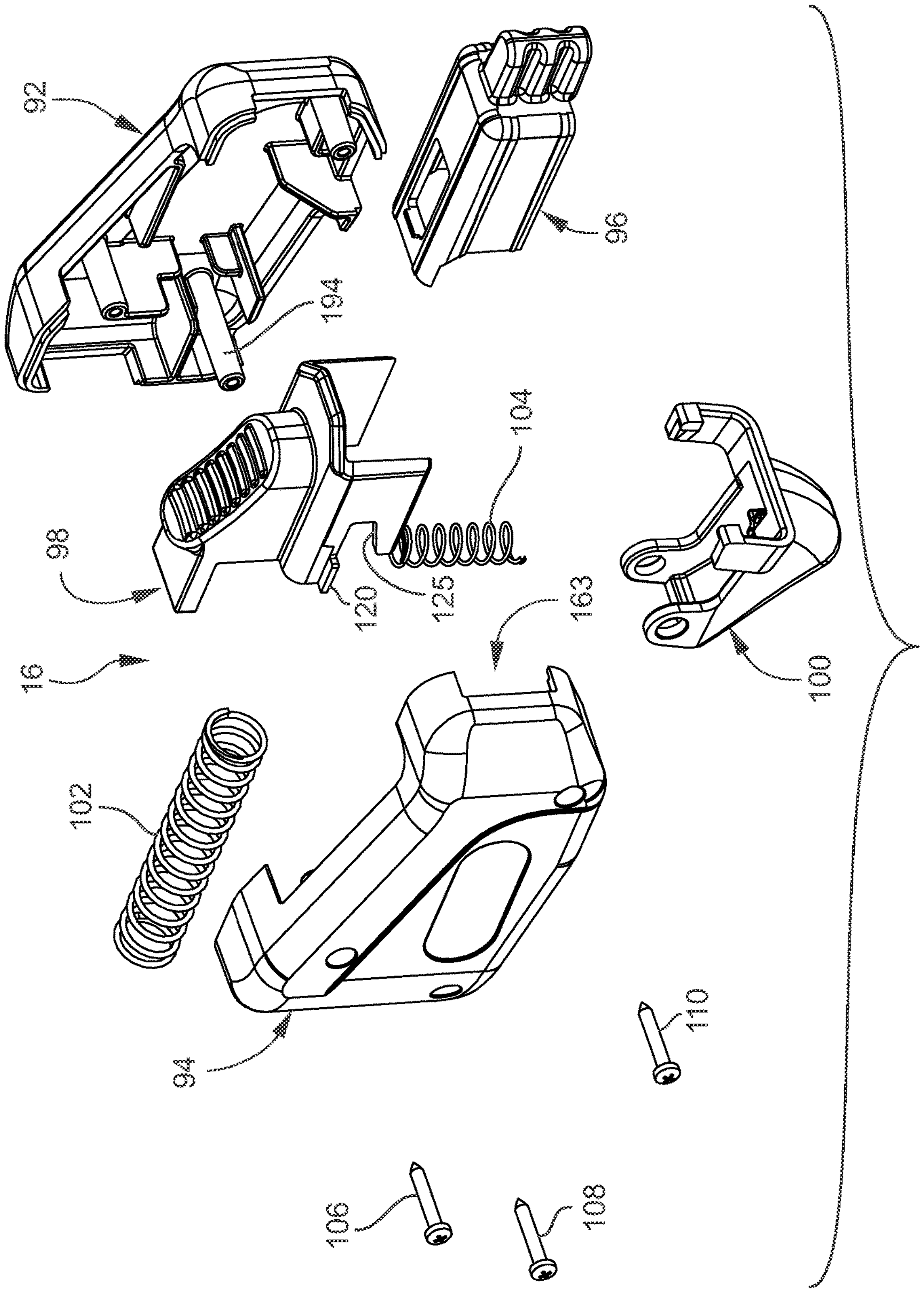
FIG. 3 is an exploded perspective view of the latch apparatus of FIG. 2B without the latch receiver.

A broken apart view of the latch apparatus 16 is shown in FIG. 3. Latch apparatus 16 includes a left housing portion 92, right housing portion 94, latch 96, latch puller 98, latch release 100, latch return coil spring 102, latch release return coil spring 104, and pin connectors 106, 108, and 110.

Figure 4A:
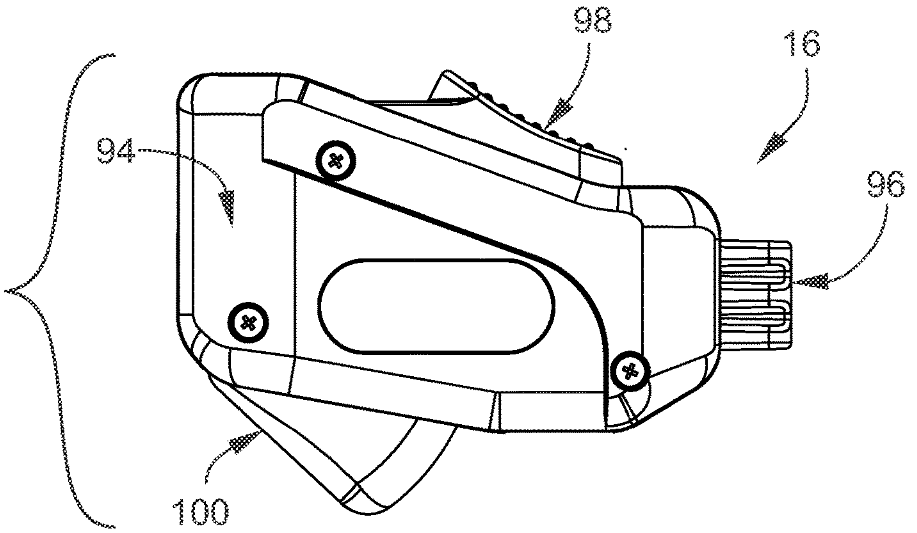
FIG. 4A is a side view of the latch apparatus of FIG. 3, showing the latch apparatus in a locked state.

FIG. 4A shows the latch apparatus 16 in a locked position. Coil spring 104 is in a fully extended state that keeps the latch release 100 in a position to prevent the latch 96 from being pulled back by the latch puller 98. Coil spring 102 in in a fully extended state to keep the latch 96 in a fully extended state and to keep the latch puller 98 in a fully extended state. In this locked position of FIG. 4A, the latch 96 is independently retractable of the latch puller 98 such as when the gate 14 is closed and the latch 96 hits the oblique face of the latch receiver 18, whereupon the latch 96 is pushed rearwardly until the gate 14 fully closes, whereupon the coil spring 102 fully extends and, in doing so, pushes the latch 96 out to a fully extended position.

Figure 4B:
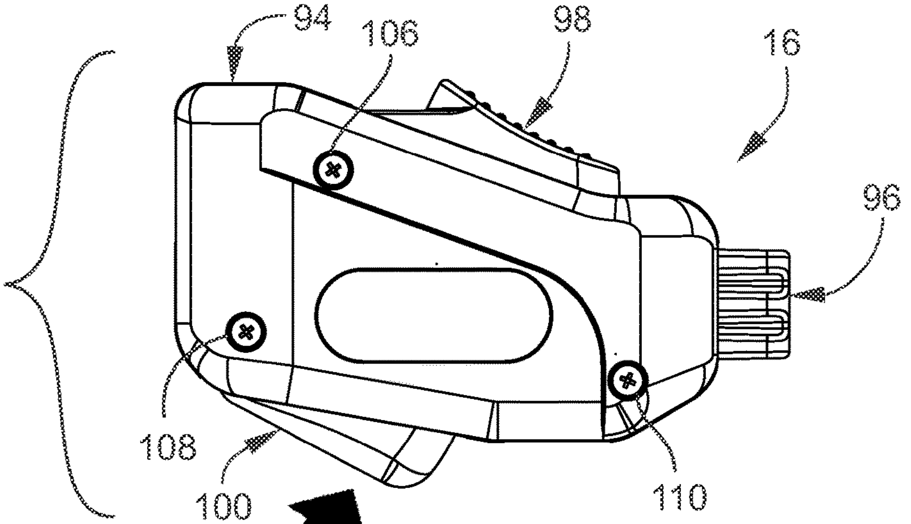
FIG. 4B is a side view of the latch apparatus of FIG. 4A, showing the depression of a latch release for the latch.

FIG. 4B shows the latch apparatus 16 with the latch release 100 having been fully depressed so as to permit the latch puller 98 to retract to retract the latch 96. In FIG. 4B, coil spring 104 is in a fully compressed state and coil spring 102 is in a fully extended state.

Figure 4C:
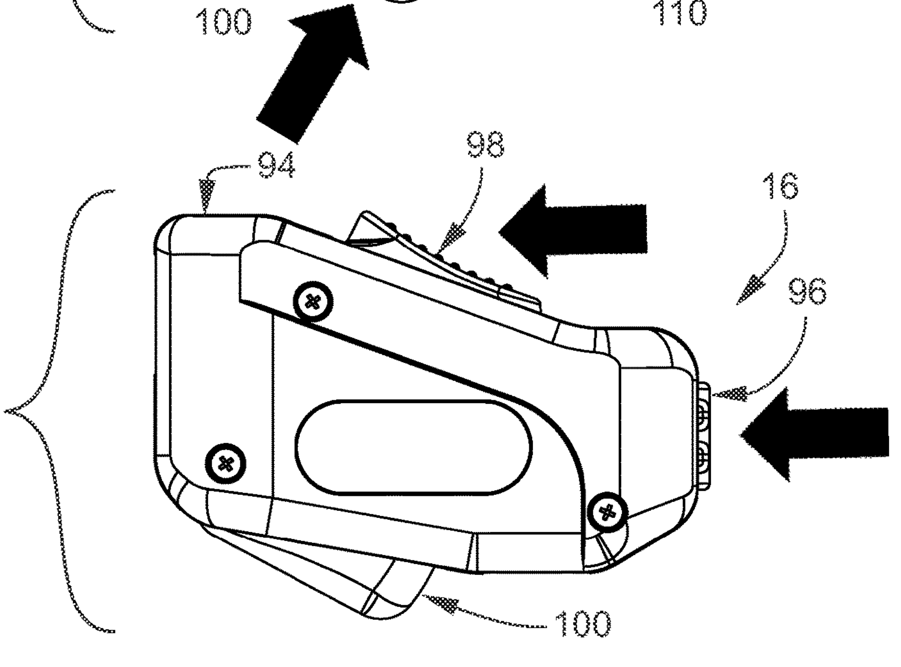
FIG. 4C is a side view of the latch apparatus of FIG. 4A, showing the continued depression of a latch release for the latch and a retraction of the latch puller and latch.

FIG. 4C shows the latch apparatus 16 with the latch release 100 having been fully depressed so as to permit the latch puller 98 to retract to pull back the latch 96. FIG. 4C further shows that the latch puller 98 has been retracted to as to retract the latch 96. FIG. 4C shows the latch puller 98 fully retracted and the latch 96 fully retracted. In FIG. 4C, coil spring 104 is in a fully compressed state and coil spring 102 is in a fully compressed state. FIG. 4C shows that the outer end of the latch 96 does not fully retract into the latch apparatus 16 when the coil spring 102 is fully compressed.

Figure 5A:
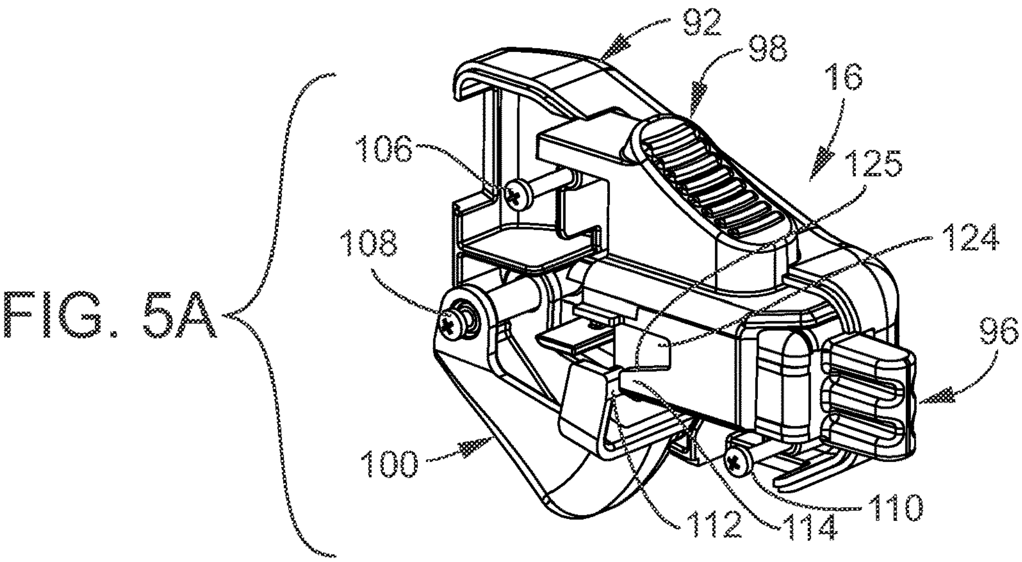
FIG. 5A is a side perspective partially broken away view of the latch apparatus of FIG. 4A, showing the latch apparatus in a locked state.

FIG. 5A corresponds to FIG. 4A that has been described above. FIG. 5A shows that the pivot release 100 includes a right hand stop 112 that confronts a right hand stop 114 of the latch puller 98. The latch release 100 and latch puller 98 also include left hand stops 116, 118, respectively. The latch puller 98 is not fixedly engaged to the latch 96. When the latch puller 98 is retracted, the latch 96 is retracted by the latch puller 98. When the coil spring 102 is extended to bring pressure on the latch 96, the latch puller 98 at the same time is also extended. When the latch 96 is pushed in by pressure being exerted on an outer end portion of the latch 96 such as when the gate 14 is closed, the latch 96 retracts but the latch puller 98 does not retract.

Figure 5B:
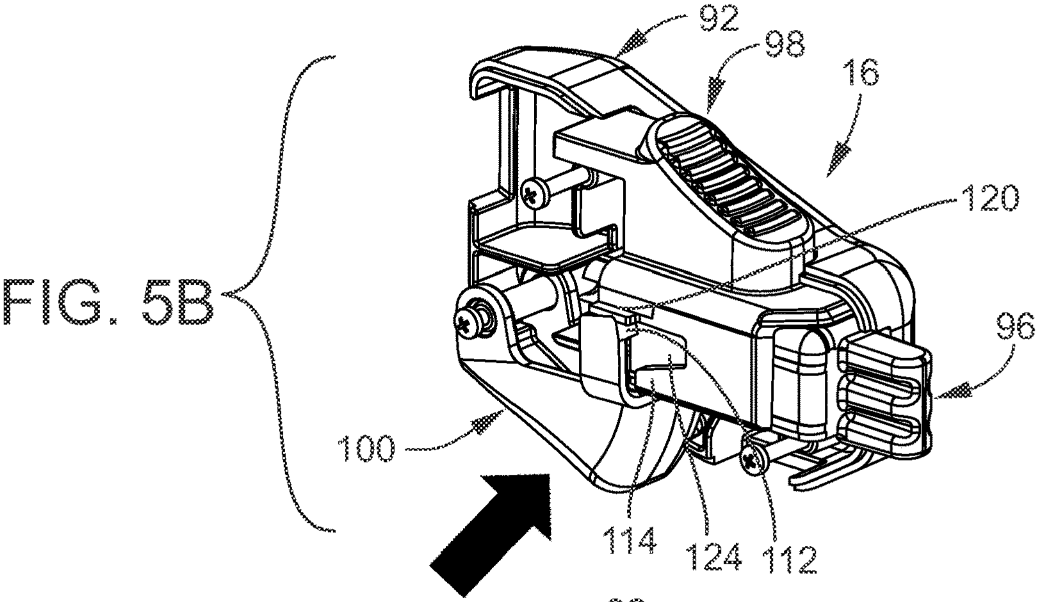
FIG. 5B is a side perspective partially broken away view of the latch apparatus of FIG. 5A, showing the depression of a latch release for the latch.

FIG. 5B corresponds to FIG. 4B that has been described above. FIG. 5B shows that the latch release stop 112 has been pivoted away from the latch puller lock stop 114 and pivoted against a right upper pivot stop 120 formed on the latch puller 98. Latch puller 98 also includes a left upper pivot stop 122.

Figure 5C:
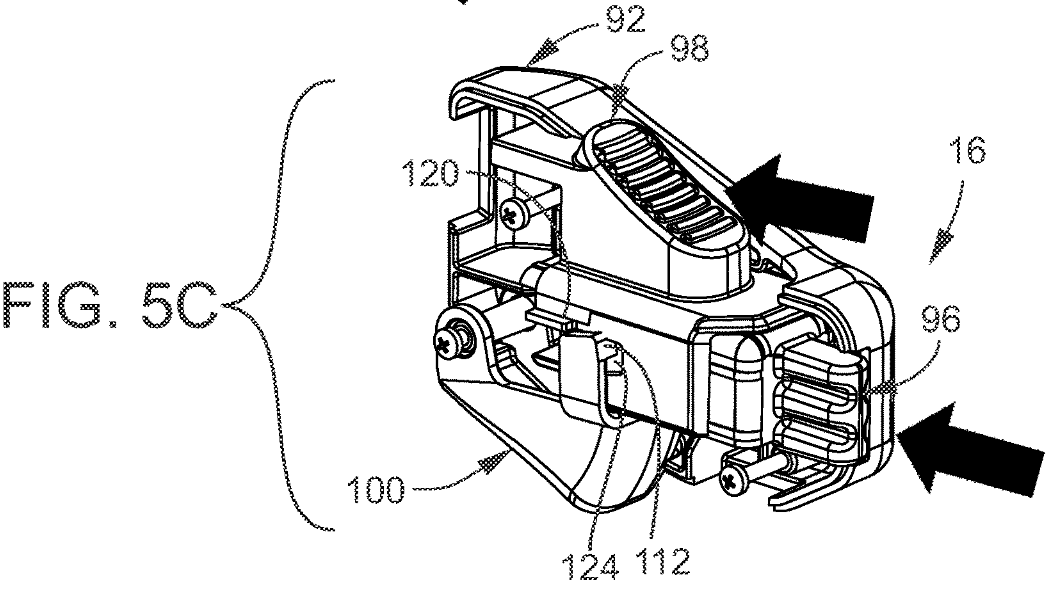
FIG. 5C is a side perspective partially broken away view of the latch apparatus of FIG. 5A, showing the continued depression of a latch release for the latch and a retraction of the latch puller and latch.

FIG. 5C corresponds to FIG. 4C that has been described above. FIG. 5C shows that the latch puller 98 has been retracted, that the latch 96 has been retracted, and that the latch puller lock stop 114 has been retracted away from the latch release stop 112, which has been received in a right hand space 124 formed by the latch puller 98. Latch puller 98 also includes a left hand space 126 that receives left hand stop 116 of the latch release 100. Each of the spaces 124, 126 is defined by an oblique edge 125 that slowly returns the latch release 100 from the closed position to the open position when the latch puller 98 is being returned to a home, relatively unbiased position by the latch coil spring 102.

Figure 6A:
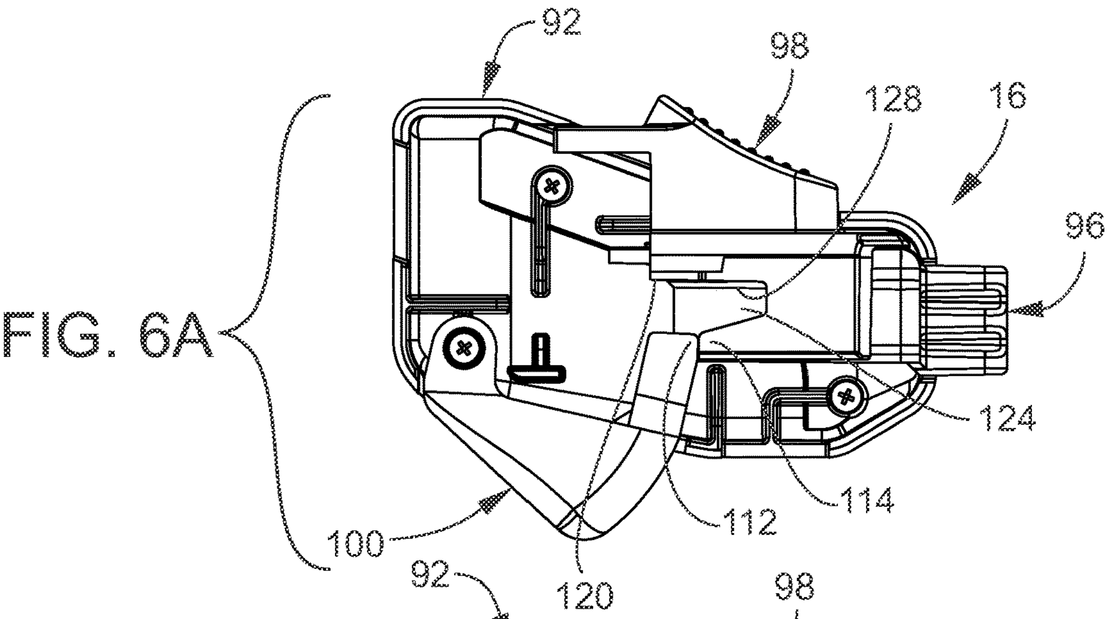
FIG. 6A is a side partially broken away view of the latch apparatus of FIG. 4A, showing the latch apparatus in a locked state.

FIG. 6A corresponds to FIGS. 4A and 5A. FIG. 6A shows that a front face of stop 112 of pivot release 100 abuts a rear face of stop 114 of latch puller 98.

Figure 6B:
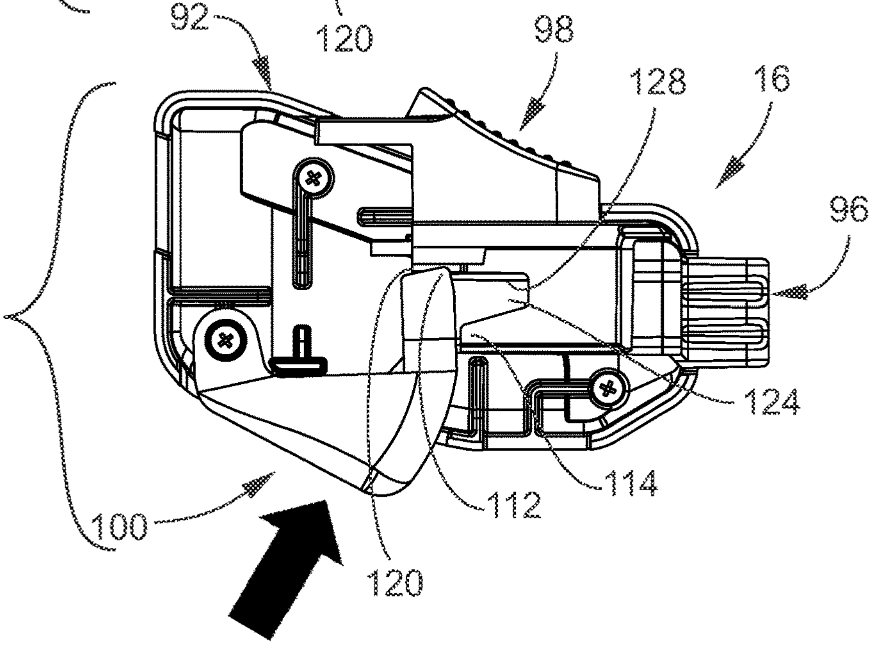
FIG. 6B is a side partially broken away view of the latch apparatus of FIG. 6A, showing the depression of a latch release for the latch.

FIG. 6B corresponds to FIGS. 4B and 5B. FIG. 6B shows that an inside portion of stop 112 of pivot release 100 confronts an underface of stop 120 of latch puller 98.

Figure 6C:
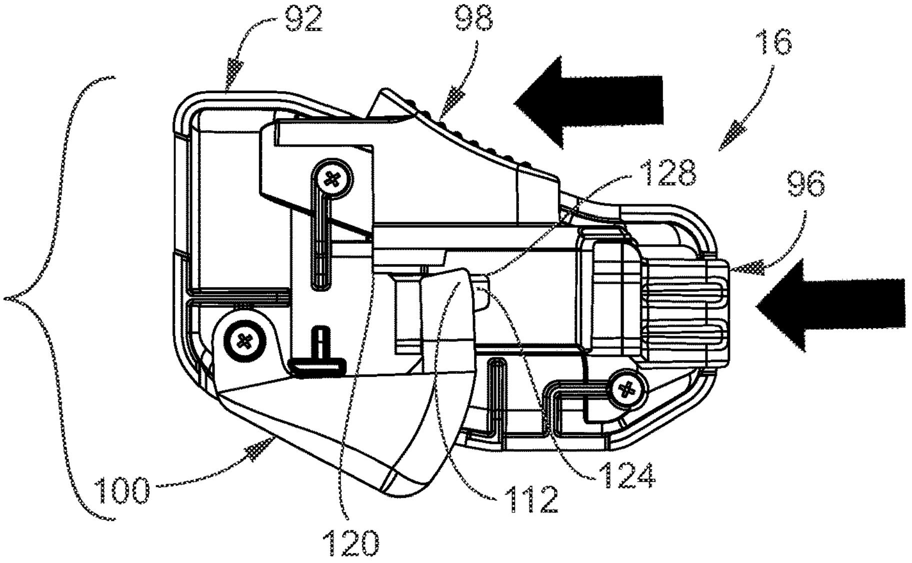
FIG. 6C is a side partially broken away view of the latch apparatus of FIG. 6A, showing the continued depression of a latch release for the latch and a retraction of the latch puller and latch.
Figure 7A:
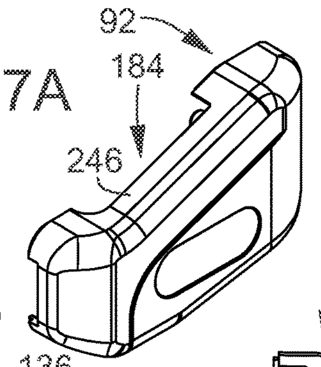
FIG. 7A is a perspective view of the outside of the left hand housing portion of the housing for the latch apparatus of FIG. 2B.
Figure 7B:
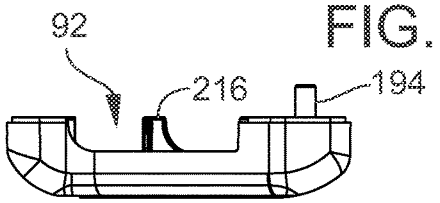
FIG. 7B is a top view of the left hand housing portion of FIG. 7A.
Figure 7C:
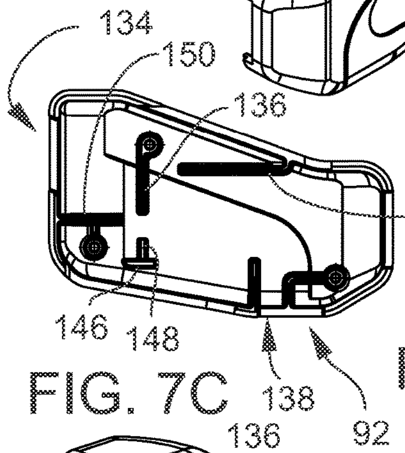
FIG. 7C is an inside elevation view of the left hand housing portion of FIG. 7A.
Figure 7D:
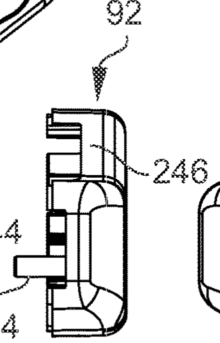
FIG. 7D is a front end elevation view of the left hand housing portion of FIG. 7A.
Figure 7E:
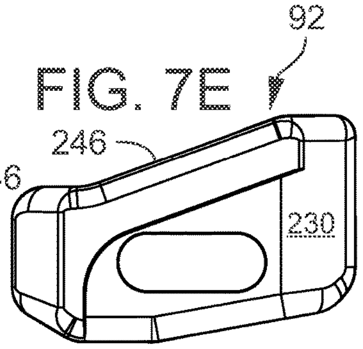
FIG. 7E is an outside elevation view of the left hand housing portion of FIG. 7A.
Figure 7F:
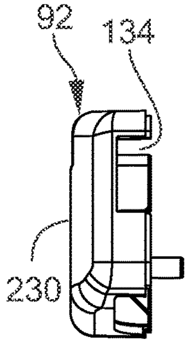
FIG. 7F is a rear end elevation view of the left hand housing portion of FIG. 7A.
Figure 7G:
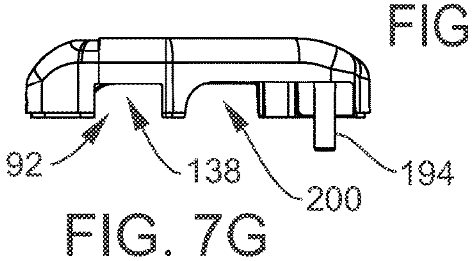
FIG. 7G is a bottom view of the left hand housing portion of FIG. 7A.
Figure 7H:
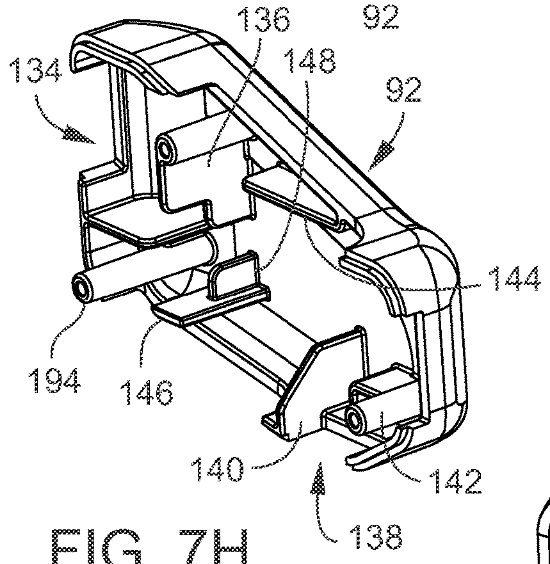
FIG. 7H is a perspective view of the inside of the left hand housing portion of FIG. 7A from a first angle.
Figure 7I:
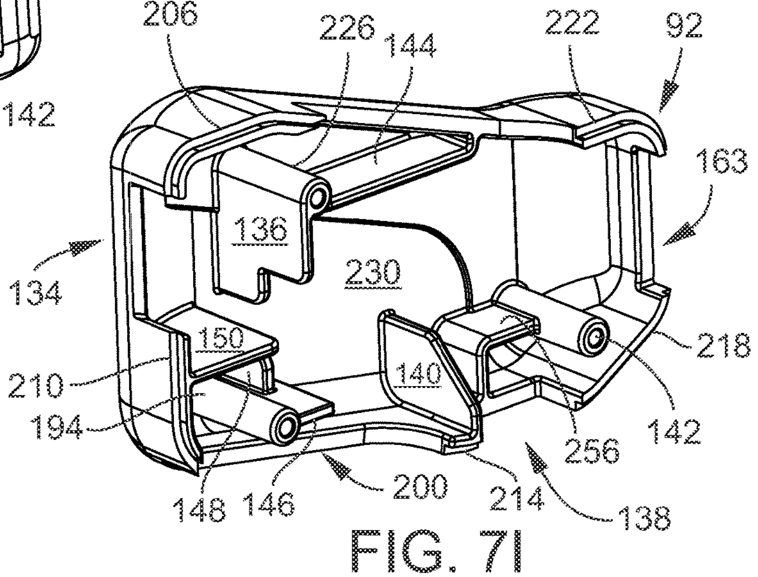
FIG. 7I is a perspective view of the inside of the left hand housing portion of FIG. 7A from a second angle.
Figure 9A:
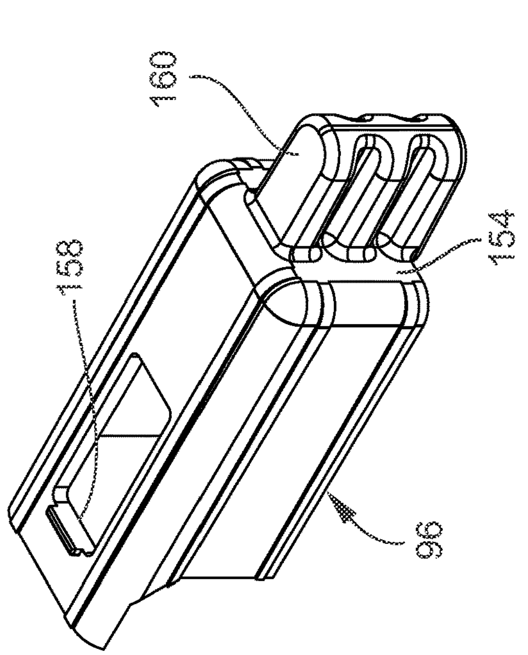
FIG. 9A is a perspective view of the latch of the latch apparatus of FIG. 2B.
Figure 9E:
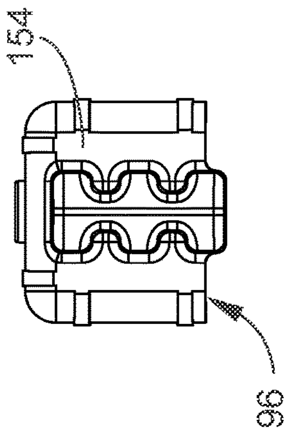
FIG. 9E is a front end elevation view of the latch of FIG. 9A.
Figure 9B:
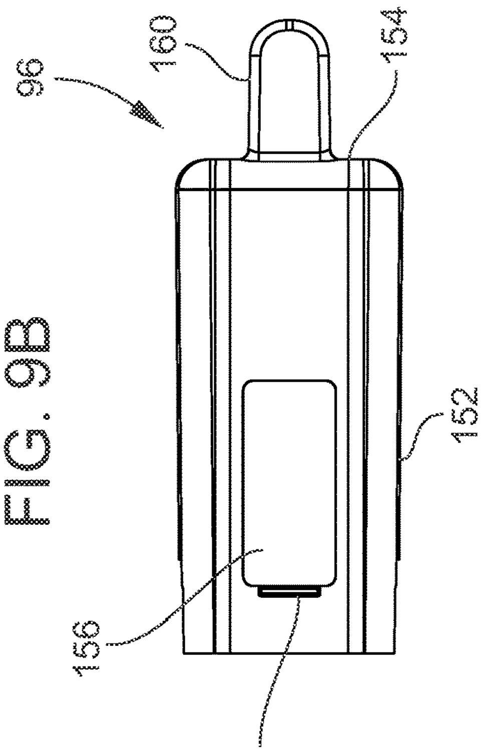
FIG. 9B is a top view of the latch of FIG. 9A.
Figure 9D:
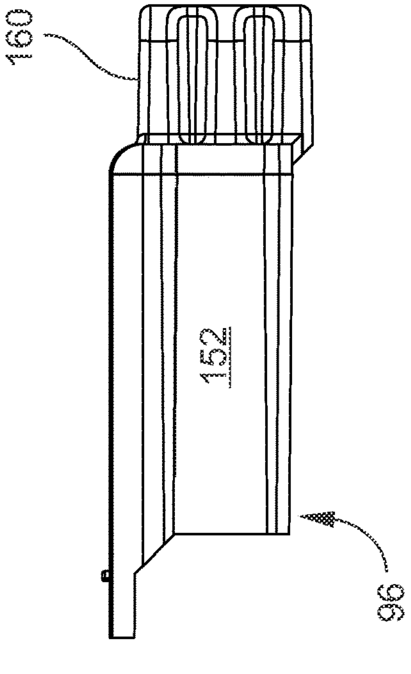
FIG. 9D is a side elevation view of the latch of FIG. 9A.
Figure 9C:
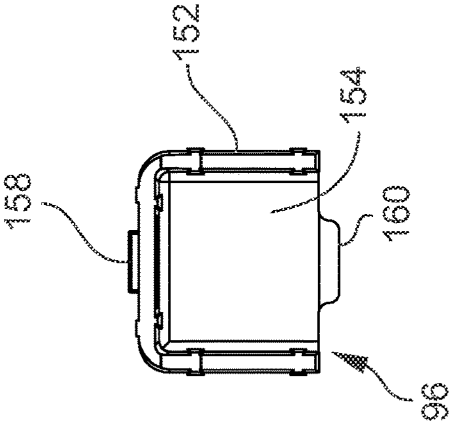
FIG. 9C is an rear elevation view of the latch of FIG. 9A.
Figure 12A:
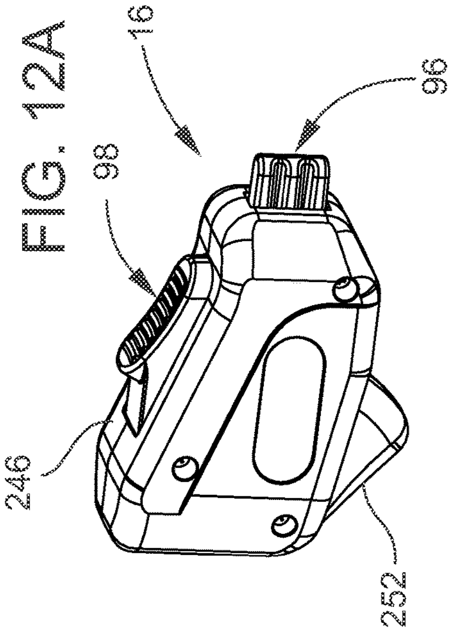
FIG. 12A is a perspective view of the latch apparatus of FIG. 2B.
Figure 12E:
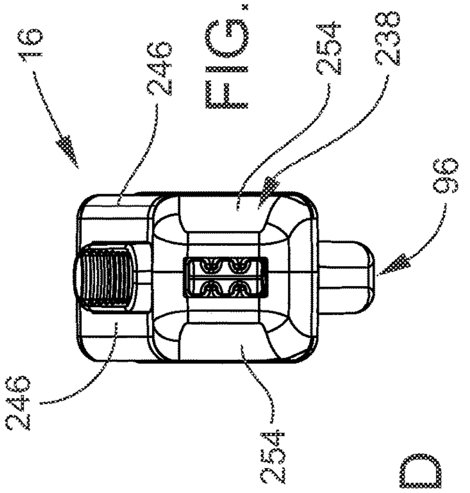
FIG. 12E is a front elevation view of the latch apparatus of FIG. 12A.
Figure 12B:
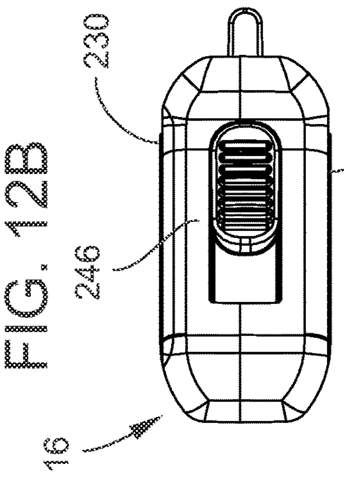
FIG. 12B is a top view of the latch apparatus of FIG. 12A.
Figure 12D:
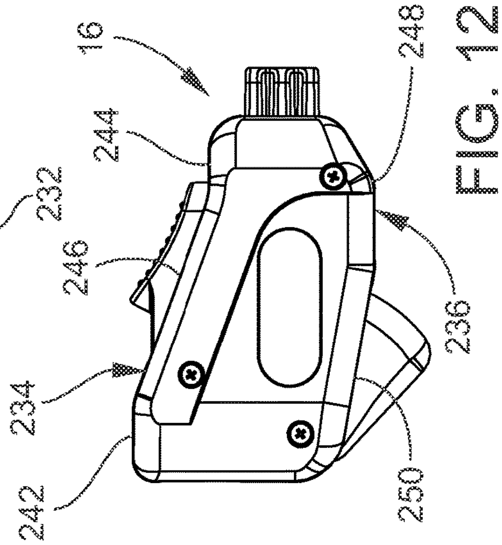
FIG. 12D is a side elevation view of the latch apparatus of FIG. 12A.
Figure 12F:
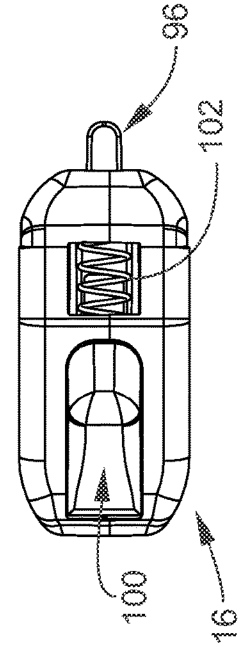
FIG. 12F is a bottom view of the latch apparatus of FIG. 12A.
Figure 12C:
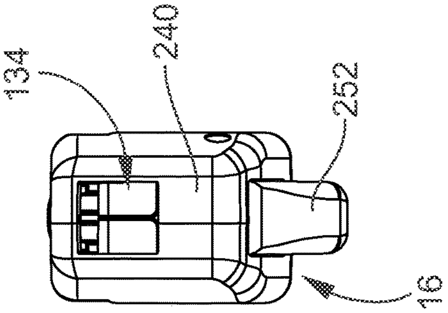
FIG. 12C is a rear end view of the latch apparatus of FIG. 12A.
Figure 13:
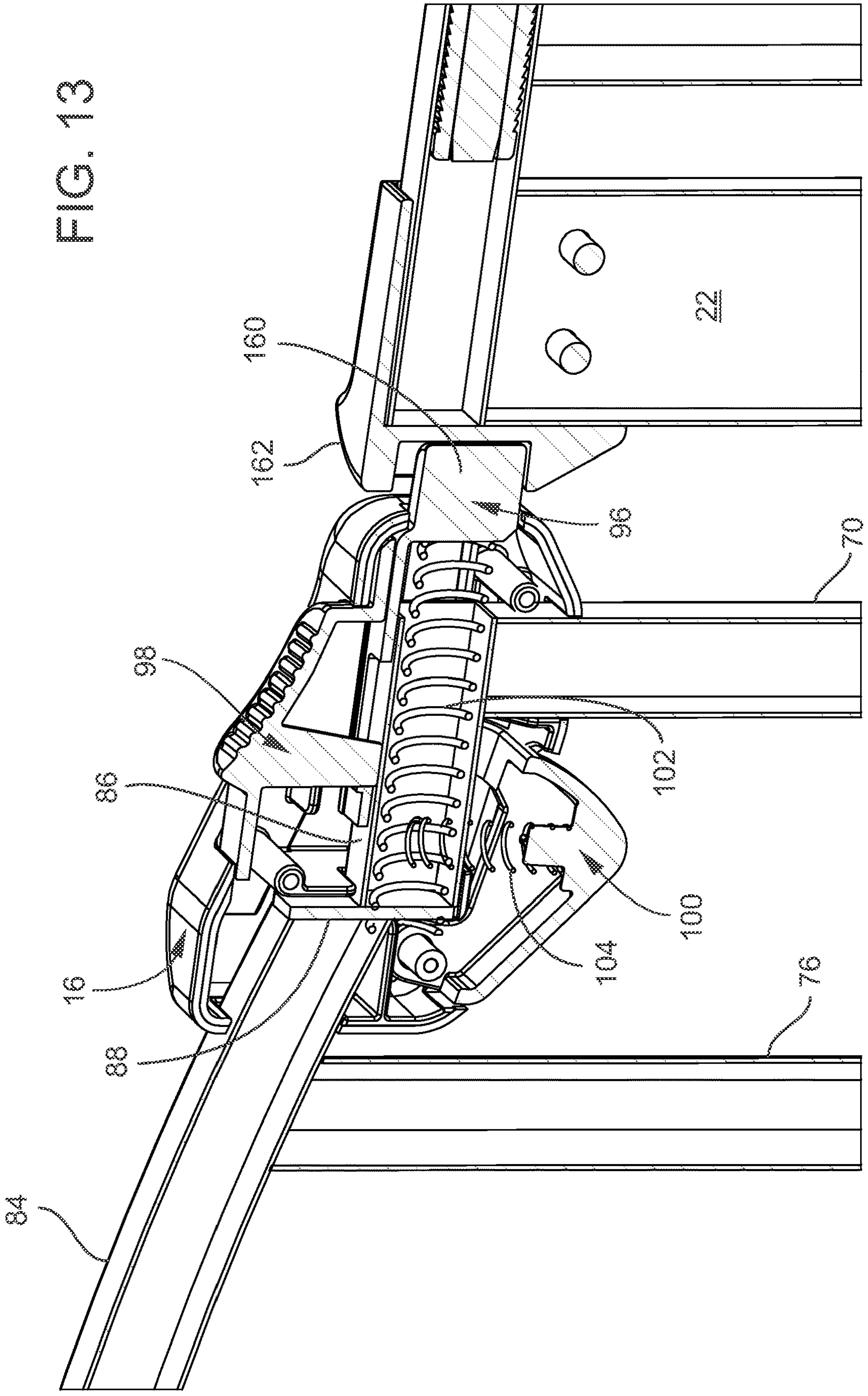
FIG. 13 is a perspective section view of the latch apparatus of FIG. 2B.

FIG. 6C corresponds to FIGS. 4C and 5C. FIG. 6C shows that stop 112 of latch release 100 slides off of the underface of stop 120 when the latch puller 98 is retracted and slides onto a right hand second undersurface 128 of the latch puller 98 that is flush with the undersurface of stop 120. Latch puller 98 also includes a left hand second undersurface 130 that is flush with the undersurface of stop 122.

FIGS. 7A-H show the left hand housing portion 92 and FIGS. 8A-8G show the right hand housing portion 94.

Left hand housing portion 92 and right hand housing portion 94, when engaged to each other, make up a housing 132. Housing 132 is fixed to gate 14 by employing the arched portion 84 and straight portion 86 of the uppermost frame member 72 of the gate 14. Housing 132 includes peripheral elements for engaging gate 14 and internal structure for engaging gate 14. Peripheral elements of the housing 132 include a rear square opening 134 and a bottom square opening 138. The rear square opening 134, for receiving arched frame portion 84, is formed by side edges and upper and lower edges of the periphery of housing 132 such that side-to-side and up and down movement of housing 132 is minimized. The bottom square opening 138, for receiving vertical frame member 70, is formed by front, rear and side edges to minimize side-to-side and front-to-back movement of the housing 132 relative to the gate frame 66. Internal elements of the housing 132 to engage the gate frame 66 include a) laterally extending vertical plates 136 having respective right angle cut-outs for capturing portions of the upper face and side faces of the straight frame portion 86 to minimize side-to-side and downward movement of the housing 132 relative to the gate frame 66, b) laterally extending vertical plates 140 for abutting a front face of the vertical frame member 70, c) laterally extending pin receivers 142 tangentially abutting front face portions of the vertical frame member 70 to minimize, in combination with the front faces of laterally extending vertical plates 140, front-to-back movement of the latch apparatus 16, d) the upper edges of lateral plates 140 that abut lower face portions of the straight frame portion 86, e) upper faces of horizontal plates 146 that abut lower face portions of the straight frame portion 86, f) vertical edges of lateral and vertical plates 148 that about side faces of straight frame portion 86, g) horizontal plates 150 that locate the lower face portions of an end section of arched portion 84 where such lower face portions forms a junction with the rear face of vertical plate 88, h) rear faces of lateral and vertical plate 136 that are adjacent to and may abut the front face of the vertical and lateral plate 88. In other words, the housing 132 captures each of the vertical frame member 70, straight frame portion 86, and arched frame portion 84 by engaging all four faces of the vertical frame member 70, all four faces of the straight frame portion 86, and all four faces of the arched frame portion 84 with a combination of peripheral and internal structure.

FIGS. 9A-E show the latch 96. Latch 96 includes an inverted U-shaped body 152 and further includes a front wall 154 closing off the U-shaped body 152. Horizontal coil spring or latch return spring 102 is set inside of open ended straight frame portion 86 with one end abutting the vertical plate 88 and with the other end abutting the rear face of the front wall 154. The inverted U-shaped body 152 rides on the upper and side faces of the straight frame portion 86. The ceiling of the inverted U-shaped body 152 includes an opening 156. Opening 156 is partially defined by a rear tab 158 projecting upwardly beyond the upper face of the ceiling of the U-shaped body 152. Latch 96 further includes, extending forwardly of the front face of the front wall 154, a ribbed latch projection 160. Each of the sides of the projection 160 includes three ribs and two grooves. A front portion of each of the three ribs is U-shaped so as to maximize an easy retraction of the latch 96 into the latch apparatus 16 when the U-shaped portion hits the oblique or angle face 162 of the latch receiver 18. Latch 96 extends through opening 163 in housing 132.

The inverted U-shaped body 152 of the latch 96 is received within the latch puller 98. Latch puller 98 includes lower sidewalls 164 depending from a platform 166. The body 152 slides against an inner face of the lower sidewalls 164 and against an underface of platform 166. Latch puller 98 includes a pulling tab 168 depending from a ribbed vertical wall 170. Pulling tab 168 and vertical wall 170 share a vertical rib 172. A rear face of the vertical rib 172 engages a front face of tab 158 on latch 96 when the latch 96 is retracted by the latch puller 98. Ribbed vertical wall 170, a pair of upper opposing sidewalls 174, and a front U-shaped wall 176 support a roughened thumb seat 178 for being engaged by the thumb of a hand of a user for pulling the latch puller 98 rearwardly for pulling the latch 96 rearwardly. Extending rearwardly from the thumb seat 178 is a slide plate section 180 having an inverted U-shaped floor 182. Housing 132 includes an upper opening 184 through which extends the thumb seat 178 and portions of upper sidewalls 174 and front wall 176. The upper face of slide plate section 180 abuts and slides against horizontal edges 186 of the housing portions 92, 94. A lower face of tab 168 and a lower face of rib 172 ride on the upper face of straight frame portion 86. An upper face of platform 166 rides on a lower face of horizontal and lateral plate section 140 and further rides on under and inner faces of front portions 188 of housing 132.

The pivoting latch release 100 is swingably mounted to housing 132 through pin openings 190 formed in ears 192. The pin openings 190 engage a cylindrical mount 194 that extends from an inside of right hand housing portion 92 to an inside of left hand housing portion 94. A latch release body 196 with generally triangular sides 198 extends through an opening 200 formed in the bottom of housing 132. A post 202 within and integral with the body 196 mounts one end of the vertical coil spring or latch release return spring 104. The other end of the latch release return spring 104 abuts the bottom face of straight frame portion 86. Stops 112, 116 on latch release 100 are mounted on a U-shaped wing 204 that spans a greater lateral distance than the body 196. Bottom opening 200 has a lateral width about the lateral width of the body 196 such that U-shaped wing 204 is stopped by internal housing portions of housing 132 about the opening 200 when pivoted in the downward and rearward direction by the latch release return spring 104.

Latch receiver 18 includes a central slot 206 for receiving latch projection 160. The oblique or angled faces 162 lead into the open end of the slot 206. The body of latch receiver

18 includes a cut-out in the shape of a corner and is fixedly engaged to the inner and upper corner of standard 22.

Left hand housing has an inner peripheral edge sections with underlapping and right hand housing has an inner peripheral edge sections with overlapping, and such edge sections engage each other to form housing 132. Left hand peripheral edge section 206 is stepped, includes an underlap, and engages right hand peripheral edge section 208 that is stepped and includes an overlap. Left hand peripheral edge section 210 is stepped, includes an underlap, and engages right hand peripheral edge section 212 that is stepped and includes an overlap. Left hand peripheral edge section 214 is stepped, includes an underlap, and engages right hand peripheral edge section 216 that is stepped and includes an overlap. Left hand peripheral edge section 218 is stepped, includes an underlap, and engages right hand peripheral edge section 220 that is stepped and includes an overlap. Left hand peripheral edge section 222 is stepped, includes an underlap, and engages right hand peripheral edge section 224 that is stepped and includes an overlap.

The left hand and right hand housing portions 92, 94 are secured together by pin connectors 106, 108, and 110. Pin connector 106 is engaged in cylindrical mounts 226 of housing portions 92, 96. Cylindrical mounts 226 are of the same length and have interior ends that abut each other when the housing portions 92, 94 are engaged to each other. Pin connector 108 is engaged in cylindrical pin mount 194 and its associated cylindrical pin mount 228. Cylindrical pin mount 194 is of greater length than cylindrical pin mount 228. Cylindrical pin mount 194 engages the pivot openings 190 of the latch release 100. Inner ends of cylindrical pin mounts 194, 228 abut each other when the housing portions 92, 94 are engaged to each other. Pin connector 110 is engaged in cylindrical pin mounts 142. Inner ends of cylindrical pin mounts 142 engage each other when the housing portions 92, 94 are engaged to each other.

When the left hand and right hand housing portions 92, 94 are engaged to each other, the following five openings are formed: a) opening 134 for the arched frame portion 84, b) opening 184 for the latch puller 98, c) opening 163 for the latch 96, d) opening 138 for the end vertical support member 70, and e) opening 200 for the latch release 100.

Prior to the left hand and right hand housing portions 92, 94 being joined to each other, coil spring 102 is placed in the open end of straight frame portion 86. Then the latch 96 is placed over the straight frame portion 86, with the front wall 154 of the latch 96 keeping the coil spring 102 in the straight frame portion 86. Then the latch puller 98 is located on top of the latch 96. Then the left hand housing portion 92 is slid sideways onto the arched frame portion 84, end vertical frame member 70, latch puller 98, latch 96, and straight frame portion 86. Then the latch release 100 is engaged to the cylindrical pin mount 194, which also serves as the pivot base for the latch release 100. Then the coil spring 104 is located on post 202 and between post 202 and the bottom face of the straight frame portion 86. Then the right hand housing portion 94 is slid sideways onto the arched frame portion 84, the end vertical frame member 70, latch puller 98, latch 96, straight frame portion 86, and latch release 100. Then the pin connectors 106, 108, 110 are engaged and tightened so as to engage the housing portions 92, 94 to each other and to engage therein the latch 96, the latch puller 98, the latch release 100, and the coil springs 102, 104.

As shown in FIGS. 12A-F, housing 132 includes six sides: a left hand side 230, a right hand side 232, a top 234, a bottom 236, a front 238, and a rear 240. The top 234 includes a rear horizontal portion 242, a front horizontal portion 244, and an oblique upper surface 246 between the rear and front portions 242, 244. The junction between the oblique upper surface 246 and the front horizontal portion 244 is in or adjacent to a plane defined by the outer face of the end vertical support member 70. Oblique upper surface 246 includes the opening 184 for the latch puller 98. Latch puller 98 includes the roughened thumb seat 178 that is oblique. Both the roughened thumb seat 178 and the oblique upper surface 246 angle downwardly and frontwardly in a direction from the rear 240 of the housing 132 to the front 238 of the housing 132 to aesthetically follow the track of the arched frame portion 84.

The bottom 236 of the housing 132 includes a front horizontal portion 248 and a rear oblique portion 250 that extends between the front horizontal portion 248 and the rear 240 of the housing 132. The rear oblique portion 250 angles downwardly and frontwardly in a direction from the rear 240 of the housing 132 to the front 238 of the housing 132.

The latch release 100 includes an oblique undersurface 252 upon which one or more fingers of the end user press when pushing in the latch release 100 to release the latch 96. This oblique undersurface 252 is oblique when the latch release 100 is in each of the pushed in state, where the latch puller 98 is released, and in the pushed out state, where the latch puller 98 is locked.

Oblique undersurface 252 of latch release 100, rear oblique surface portion 250 of housing bottom 236, oblique upper surface portion 246 of housing top 234, and the oblique thumb seat 178, are all oblique relative to a horizontal axis of straight frame portion 86. Such obliqueness makes it appear that the arched frame portion 84 extends without break to end vertical support member 70. Such obliqueness makes it appear that there is no straight frame portion 86.

The rear 240 of housing 132 is vertically oriented and runs at a right angle to the horizontal axis of straight frame portion 86.

The front 238 of housing 132 includes a pair of tapering surface portions 254 that taper from the sides 230, 232 inwardly toward opening 162 for the latch 96. The tapering surface portions 254 taper toward each other. One of the tapering surface portions 254 is on the left hand housing portion 92 and the other of the tapering surface portions 254 is on the right hand housing portion 94.

Plate sections 144 integrally engage and extend inwardly from their respective housing sides 230, 232. Plate sections 144 integrally engage and extend rearwardly from their respective housing top oblique upper surfaces 246. Plate sections 136 integrally engage and extend inwardly from their respective housing sides 230, 232. Plate sections 136 integrally engage and integrally connect and support pin connector mounts 226. Pin connector mounts 226 integrally engage and extend inwardly from their respective housing sides 230, 232. Plate sections 150 integrally engage and extend inwardly from their respective housing sides 230, 232. Plate sections 150 integrally engage and extend forwardly from housing rear 240. Pin connector mount 228 integrally engages and extends inwardly from housing side 232. Plate sections 146 integrally engage and extend inwardly from their respective housing sides 230, 232. Plate sections 148 integrally engage and extend inwardly from their respective housing sides 230, 232. Plate sections 148 integrally engage and extend upwardly from plate sections 146. Plate sections 140 integrally engage and extend inwardly from respective housing sides 230, 232. Plate sections 140 integrally engage and extend upwardly from housing bottom 236 and integrally support their respective peripheral edge sections 214, 216. Right angled plate sections 256 integrally extend inwardly from respective housing sides 230, 232 and further integrally engage pin connector mounts 142. Right angled inner edges of plate sections 256 abut side faces of end vertical support member 70 to minimize side to side movement of the latch apparatus 16 relative to the gate 14. Cylindrical pin connector mounts 142 engage and extend integrally from respective housing sides 230, 232. It is noted that the bosses are found at the outer ends of cylindrical pin connector mounts 142, 226 in right hand housing portion 94 and are not present at the outer ends of cylindrical pin connector mounts 142, 226 in left hand housing portion 92. Such bosses are part of their respective pin mounts 142, 226 and accept the heads of pins 106, 110.

As to the latch apparatus 16:

a) when the latch release 100 is in the closed position, the latch puller 98 is engaged by the latch release 100 thereby preventing the latch puller 98 from sliding and from pulling the latch 96 in the second direction;

b) when the latch release 100 is in the closed position, the latch 96 can slide in the first and second directions;

c) the latch puller 98 includes a fully engaged position where the latch puller 98 has engaged and fully pulled the latch 96 in the second direction;

d) the latch 96 includes a fully latched position in the latch receiver 18 and a fully unlatched position out of the latch receiver 18;

e) the latch 96 is in the fully unlatched position when the latch puller 98 is in the fully engaged position, with the latch 96 being restrained from sliding in the first direction toward the latch receiver 18 when the latch puller 98 is in the fully engaged position; and f) the latch release 100 is held against pivoting from the open position to the closed position by the latch puller 98 when the latch puller 98 is in the fully engaged position.

In operation, latch release 100 is squeezed, such as with a finger in the nature of a trigger, to pivot the latch release 100 from a closed position to an open position. In the closed position stops 112, 116 engage the stops 114, 118 of the latch puller 98. As the latch release 100 is squeezed, the latch release stops 112, 116 pivot upwardly and out-of-the-way of the latch puller stops 114, 118. As the latch release 100 is squeezed and begins to pivot, latch release coil spring 104 begins to be compressed. When the latch puller stops 114, 118 are free of the latch release stops 112, 116, the latch puller 98 may be slid rearwardly away from latch receiver 18. As the latch puller 98 is slid rearwardly, the pulling tab 168 of the latch puller 98 engages the latch tab 158 of the latch 96 thereby pulling the latch 96 out of the latch receiver 18. As the latch 96 is pulled to a fully open position, the latch coil spring 102 is compressed. As the latch puller 98 pulls the latch 96 to a fully open position, the latch puller 98 keeps the latch release 100 in an open position by trapping the latch release stops 112, 116 in respective spaces 124, 126 of the latch puller 98. Then the gate 14 may be swung open. After the gate 14 has been swung open, the thumb pulling back on the latch puller 98 may release the latch puller 98, whereupon the latch coil spring 102 extends to push the latch 96 forwardly. As the latch 96 is pushed forwardly, the latch tab 158 pushes the pulling tab 168 of the latch puller 98 so as to push the latch puller 98 back to a closed and home position. As the latch puller 98 is pushed back to its closed and home position, the latch release stops 112, 116 slide down oblique edges 125 of the latch puller 100 thereby relatively slowly returning the latch release 100 to a closed position where the latch release stops 112, 116 again engage the latch puller stops 114, 118.

Figure 15:
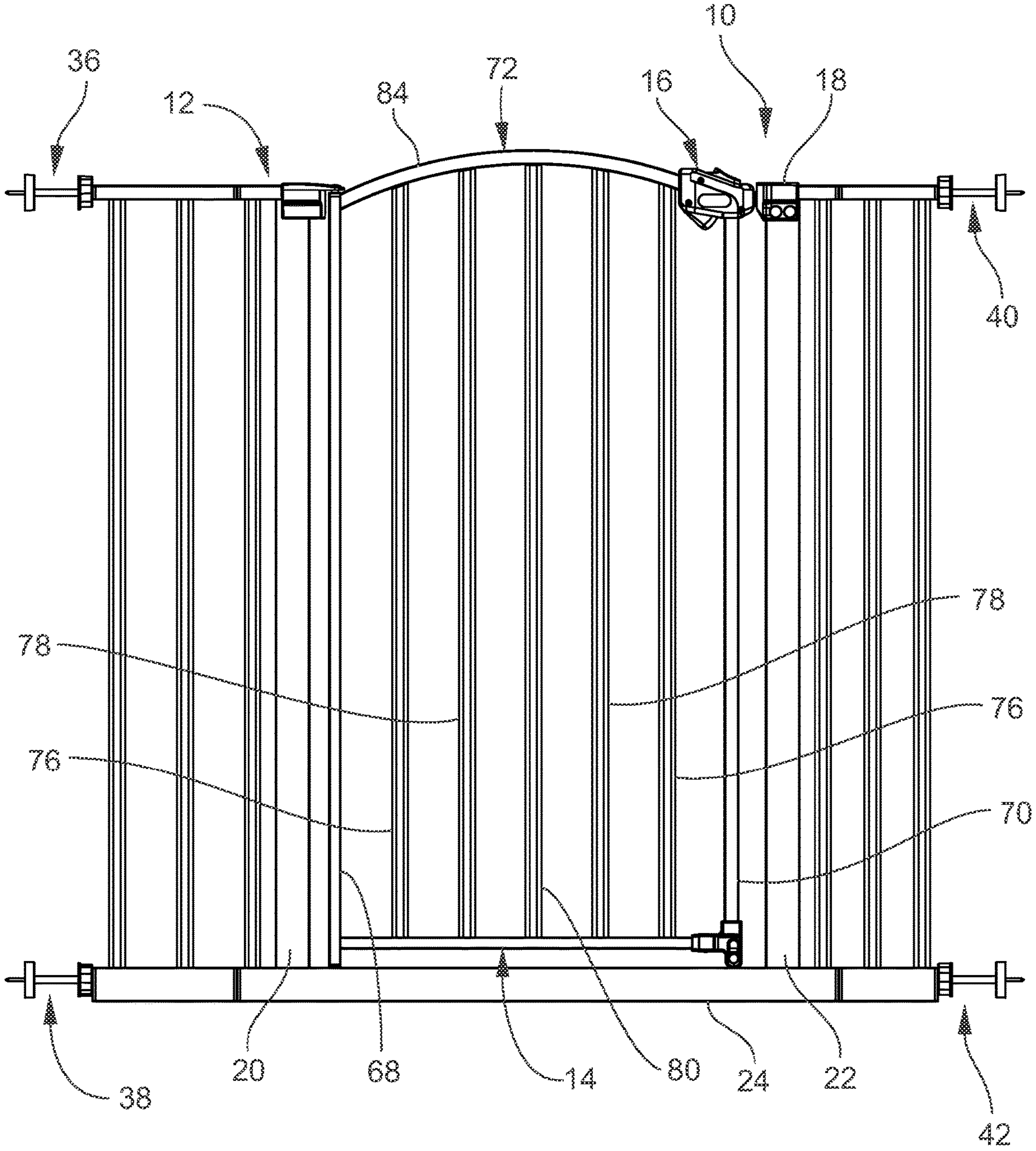
FIG. 15 is a front elevation view of the gated barrier of FIG. 1, with the view showing the latch apparatus and the latch receiver.

Whereas FIG. 1 shows the gated barrier 10 in a perspective view, FIG. 15 shows a front elevation view. FIG. 15 shows that the gated barrier 10 is in a pressurized state. In other words, standards 20 and 22 are parallel to each other and the horizontally extending lowermost threshold frame member 24 is at a right angle to each of the standards 20, 22 when the gated barrier 10 is in a pressurized state. Vertical frame member 68 of gate 14 is parallel to vertical frame member 70 of gate 14 when the gated barrier 10 is in the non-pressurized state and when the gated barrier 10 is in the pressurized state. When the gated barrier 10 is in the pressurized state, then vertical frame members 68, 70 are parallel to standards 20, 22 and are at a right angle to horizontally extending lowermost threshold frame member 24.

As can be seen in the front elevation view of FIG. 15, gate frame 66 includes a) a pair of internal vertical support members 76 that are equal in height, b) a pair of internal vertical support members 78 that are equal in height and have a longer length than internal vertical support members 76, and c) a single internal vertical support member 80 that is longer length than internal vertical support members 76 and 78. The members 76, 78, and 80 are parallel to each other when the gated barrier 10 is in each of the pressurized and non-pressurized state, are parallel to end vertical support members 68 and 70 when the gated barrier 10 is in each of the pressurized and non-pressurized state, and are parallel to standards 20, 22 when the gated barrier 10 is in the pressurized state. Arched frame portion 84 of uppermost frame member 72 defines an arch that is symmetrical with respect to a) standards 20, 22, b) end vertical support members 68, 70, c) interior vertical support members 76 and 76, and d) interior vertical support member 78 and 78. Arch frame portion 84 has an apex, or highest point, and it is at the apex that arch frame portion 84 intersects the middle single internal vertical support member 80. An arch defined by arch frame portion 84 intersects a) standards 20, 22 at the same height, b) end vertical support members 68, 70 at the same height, c) vertical support members 76 and 76 at the same height, and d) vertical support member 78 and 78 at the same height.

Figure 16:
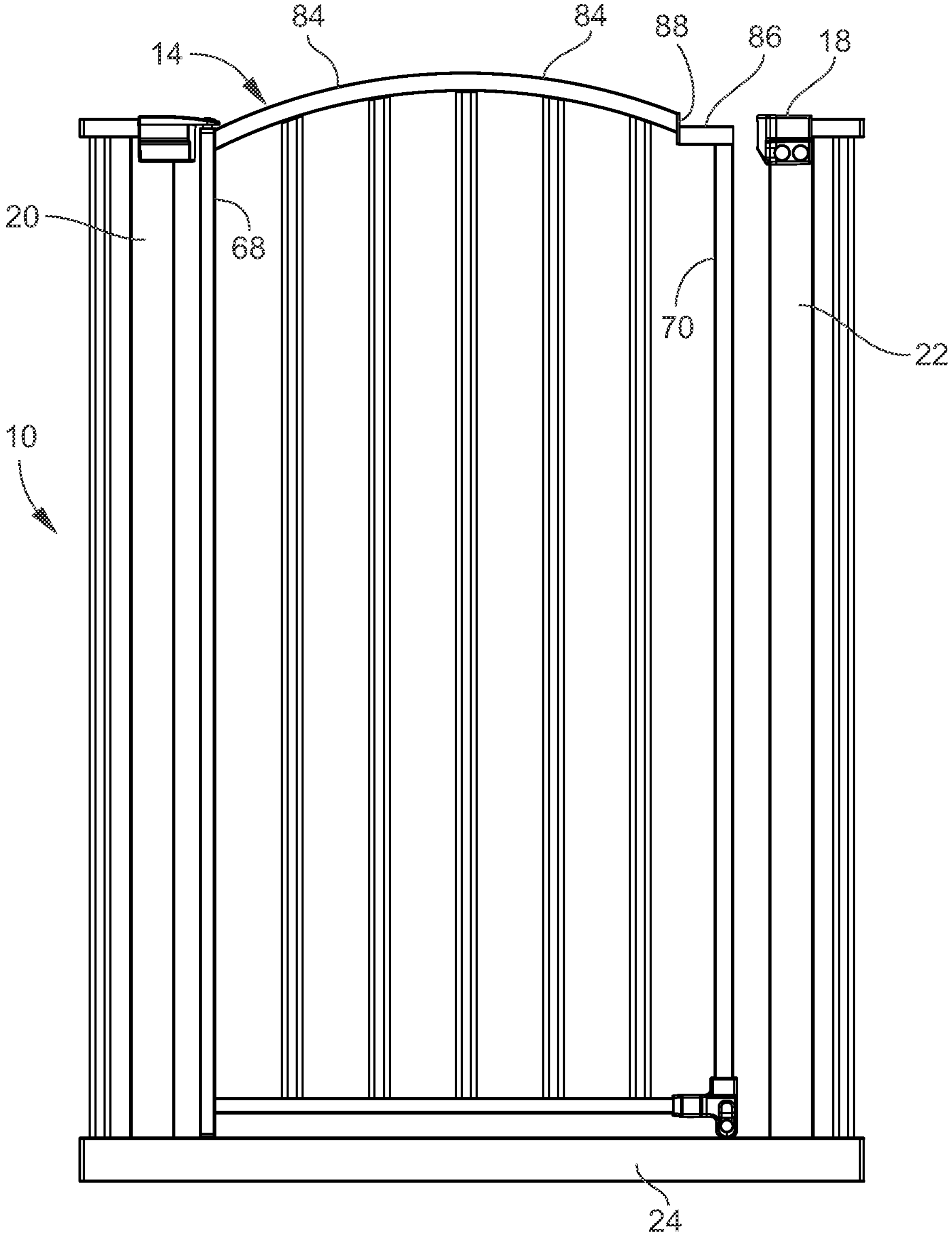
FIG. 16 is a front elevation view of the gate barrier of FIG. 15, with the latch apparatus removed, and with the latch receiver present.

FIG. 15 shows the gate 14 having the latch apparatus 16 and shows the latch apparatus 16 covering the junction between the arched frame portion 84 and the straight frame portion 86. FIG. 16 shows the gate 14 without the latch apparatus 16 such that the junction between the arched portion 84 and straight portion 86 is visible. The junction includes the vertical plate 88. Straight frame portion 86 is a tubular horizontal support having a front sidewall, a rear sidewall, a ceiling, and a floor, and an edge of each of such front sidewall, rear sidewall, ceiling and floor is engaged, such as by welding, to one face of the vertical plate 88. Three of such edges are shown in the section view of FIG. 2A. Arched frame portion 84 is a tubular traversing support having a front sidewall, a rear sidewall, a ceiling, and a floor, and an edge of each of such front sidewall, rear sidewall, ceiling, and floor is engaged, such as by welding, to the other face of the vertical plate 88. Three of such edges are shown in the section view of FIG. 2A. The ceiling of straight frame portion 86 is welded to the vertical plate 88 intermediate of the ceiling and floor of the arched frame portion 84. The floor of arched tube portion 84 is welded to vertical plate 88 intermediate of the ceiling and floor of the straight frame portion 86. Vertical plate 88 is disposed intermediate the end vertical support member 70 and the vertical support member 76 that is adjacent to end vertical support member 70. Vertical plate 88 is housed within latch apparatus 16 such that vertical plate 88 is not visible to the end user of the gated barrier 10. Straight frame portion 86 is housed within latch apparatus 16 such that straight frame portion 86 is not visible to the end user of the gated barrier 10. The latch apparatus 16 masks or covers completely each of the vertical plate 88 and straight tube portion 86. Latch apparatus 16 encapsulates or receives an end section of arched frame portion 84. Arched frame portion 84 extends obliquely, relative to the horizontal axis of the straight frame portion 86, into the latch apparatus 16 in a direction from the housing rear 240 to the housing front 238 and the latch apparatus 16 aesthetically follows such obliqueness through the oblique structures of: the oblique upper surface portion 246 of housing top 234, the oblique thumb seat 178, the oblique undersurface 252 of latch release 100, and the rear oblique surface portion 250 of housing bottom 236.

Figure 17A:
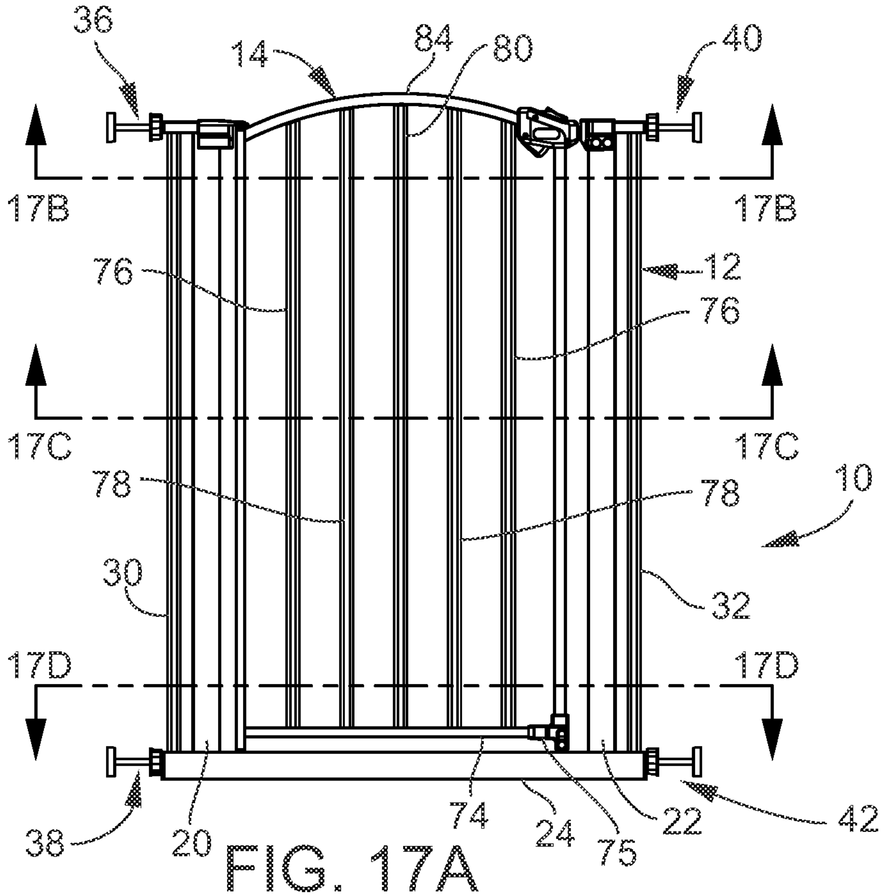
FIG. 17A is a front elevation view of the gate barrier of FIG. 15 and shows where the section views of 17B, 17C, and 17D are taken.
Figure 17B:
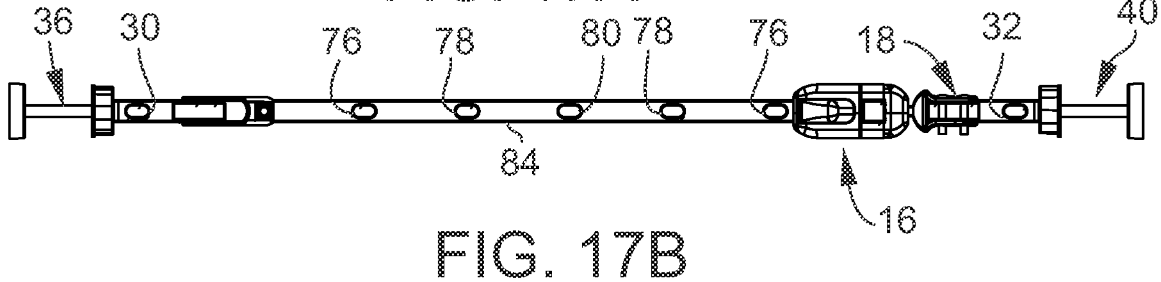
FIG. 17B is a section view at lines 17B-17B of FIG. 17A showing oblong sections of tubular vertical support members.
Figure 17C:
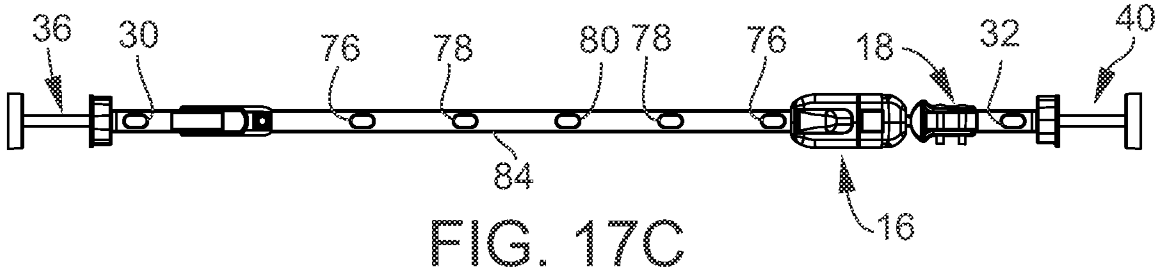
FIG. 17C is a section view at lines 17C-17C of FIG. 17A showing oblong sections of tubular vertical support members.
Figure 17D:
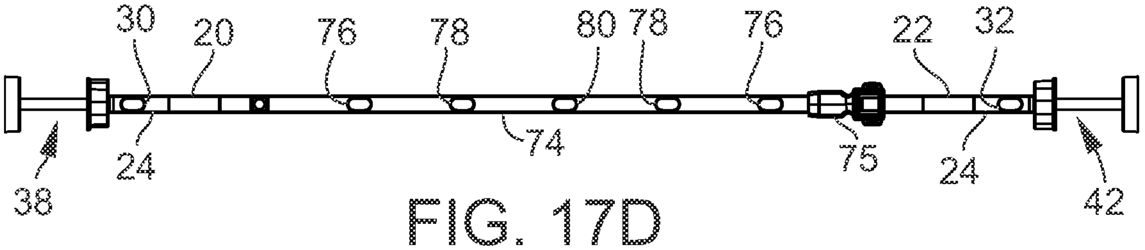
FIG. 17D is a section view at lines 17D-17D of FIG. 17A showing oblong sections of tubular vertical support members.
Figure 18A:
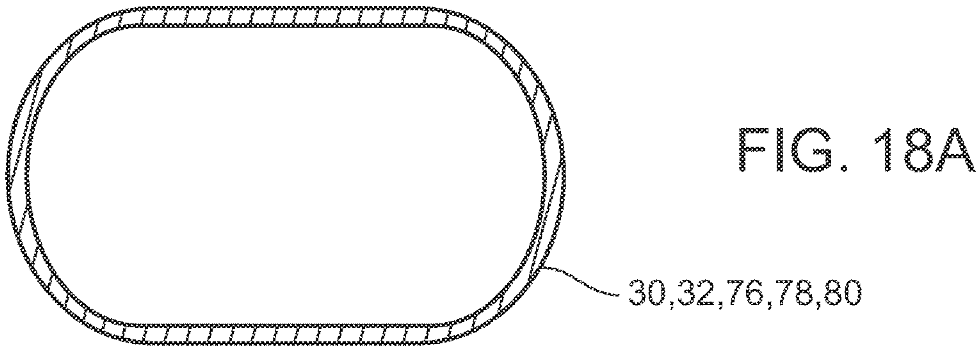
FIG. 18A is a detail section view of the oblong tubes of FIGS. 17A, 17B, 17C, and 17D.

FIG. 17A shows the gated barrier 10 of FIG. 1 with three section lines 17B, 17C, and 17D. These section lines and their respective FIGS. 17B, 17C, and 17D show that vertical support members 20, 32, 76, 78, and 80 are oblong in section, and are oblong for their entire lengths. In other words, end vertical support members 30, 32 of the U-shaped open top barrier frame 12 are oblong in section from their respective upper frame members 26, 28 to the threshold 24. "Oblong" means: a) deviating from a square, circular, or spherical form by elongation in one dimension, b) elongated, usually from the square or circular form, c) a shape that is longer than it is wide, d) longer than broad; elongated, e) deviating from a square or circle or sphere by being elongated in one direction, and f) deviating from a square, circular, or spherical form by being elongated in one direction. With the above definitions as a basis, a horizontal section anywhere on any of the vertical support members 30, 32, 76, 78, and 80 defines: a shape having opposing circular ends and opposing parallel sides, a shape that is longer than it is wide, a shape that deviates from a circular form by being elongate in one direction, a shape that is elongate from a circular form, a shape that is longer than broad, and an elongated shape, as shown in FIG. 18A. Vertical support members 52, 54 of frame extensions 44, 46 are also oblong for their entire lengths, as shown in FIG. 18A. For a given amount of material and for a given thickness, oblong tubing is stronger than tubing of a circular cross-section.

Each of vertical support members 30, 32, 52, 54, 76, 78, and 80 includes two opposing and spaced apart parallel sides and two opposing and spaced apart rounded, curved, or circular sides. If not circular, the rounded or curved sides may be elliptical or oval or some other noncircular shape.

Figure 18B:
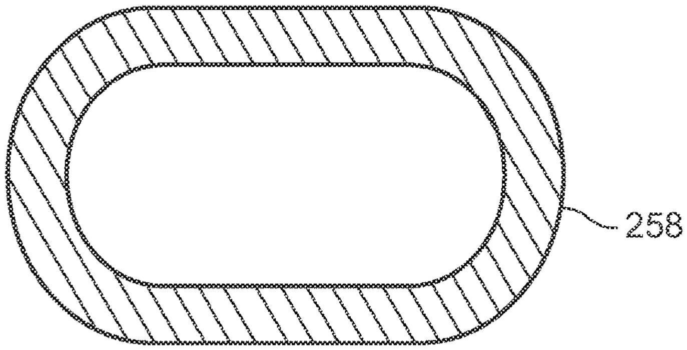
FIG. 18B is a detail section view of an alternate embodiment for the oblong tubes of FIGS. 17A, 17B, 17C, and 17D, and shows an oblong tube having a wall thickness greater than the thickness of the wall of FIG. 18A.

If desired, vertical support members 30, 32, 52, 54, 76, 78, and 80 may have a section as shown in FIG. 18B, where the wall of tubing 258 is of thickness greater, relative to its lateral or longitudinal width, than the wall of the tubing in FIG. 18A.

Figure 18C:
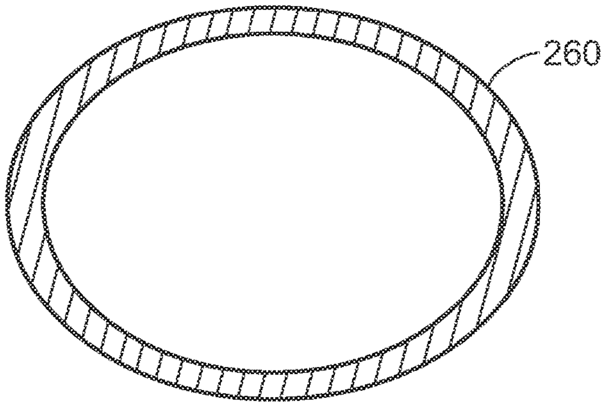
FIG. 18C is a detail section view of an alternate embodiment for the oblong tubes of FIGS. 17A, 17B, 17C, and 17D, and shows a tubular vertical support member having an oval section.

If desired, vertical support members 30, 32, 52, 54, 76, 78, and 80 may have a section as shown in FIG. 18C, where tubing 260 is oval in section.

Figure 18D:
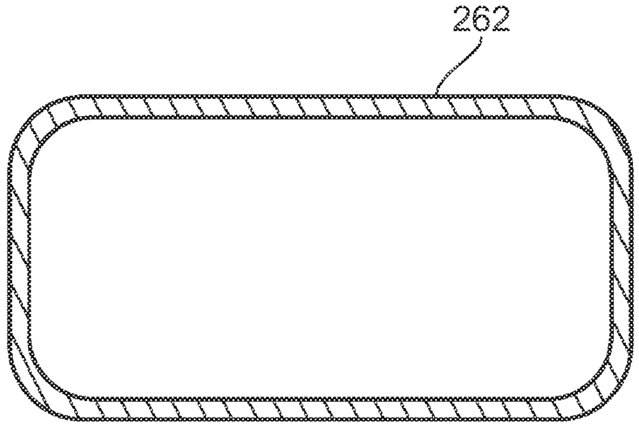
FIG. 18D is a detail section view of an alternate embodiment for the oblong tubes of FIGS. 17A, 17B, 17C, and 17D, and shows a tubular vertical support member having a section defining a rectangle with radius corners.

If desired, vertical support members 30, 32, 52, 54, 76, 78, and 80 may have a section as shown in FIG. 18D, where tubing 262 in section defines a rectangle with radius or rounded corners.

Figure 19A:
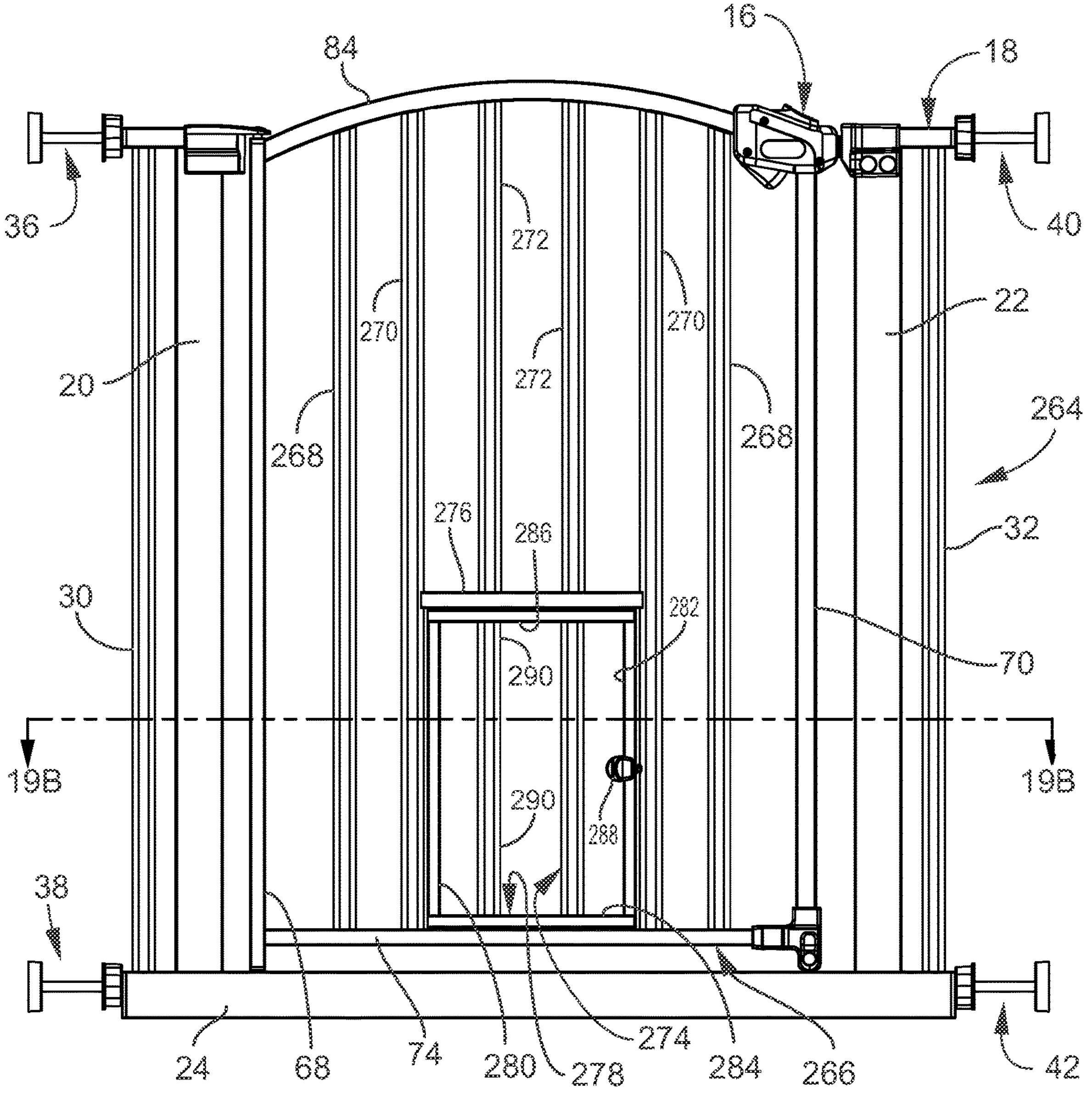
FIG. 19A is a front elevation view of the gated barrier of FIG. 1, where the gated barrier includes a second gate such that FIG. 19A shows a small gate within a big gate within a barrier.
Figure 19B:
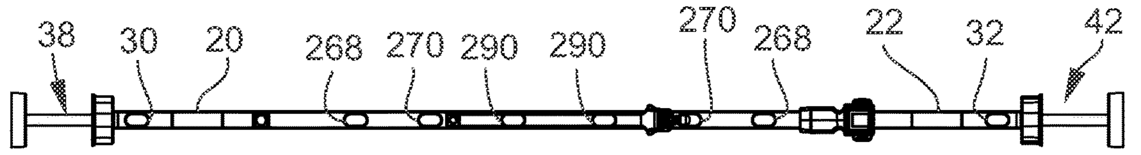
FIG. 19B is a section at lines 19B-19B of FIG. 19A and illustrates that each of the small gate, big gate, and barrier includes tubular vertical support members with oblong sections.
Figure 20C:
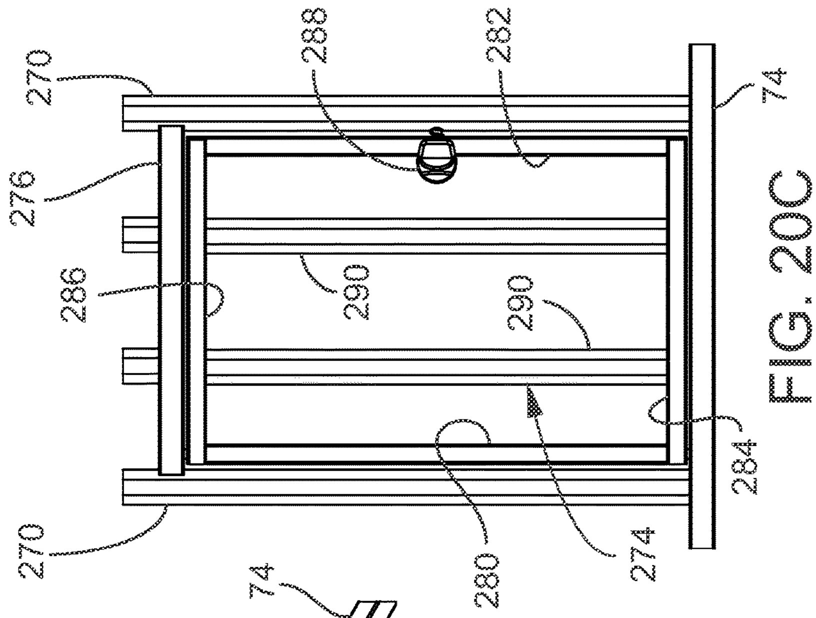
FIG. 20C is a partial view of the gated barrier of FIG. 20A and shows a detail elevation view of the small gate of FIG. 20A.
Figure 20B:
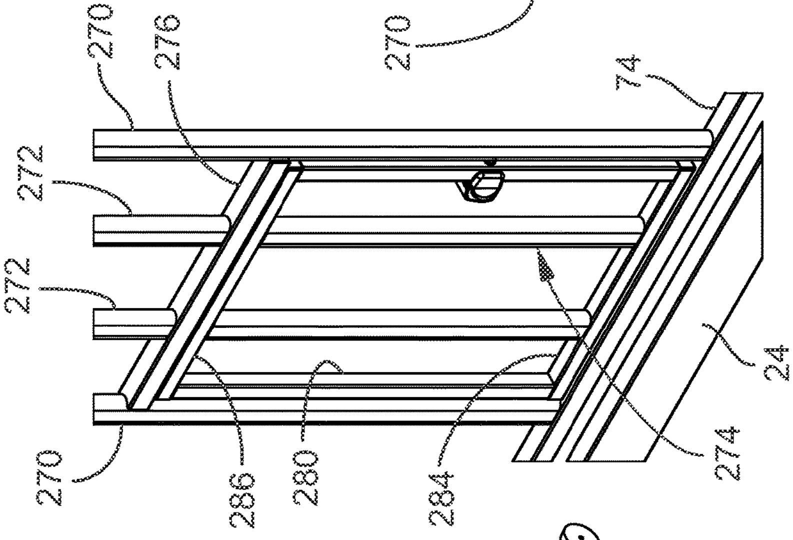
FIG. 20B is a partial view of the gated barrier of FIG. 20A and shows a detail perspective view of the small gate of FIG. 20A.
Figure 20A:
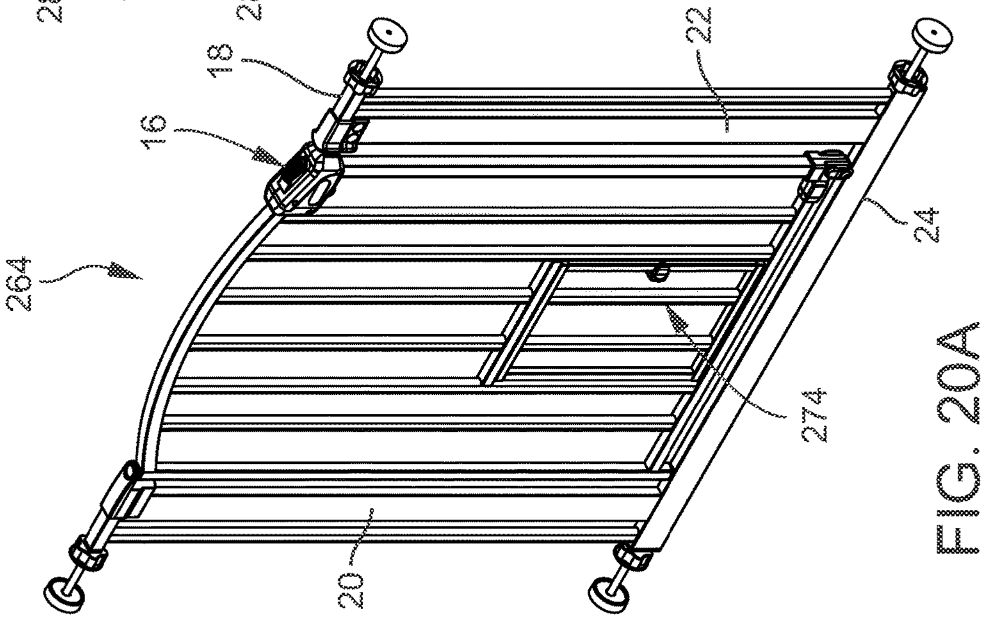
FIG. 20A is a perspective view of the gated barrier of FIG. 19A.

FIGS. 19A, 19B, 20A, 20B, and 20C show a gated barrier 264 that is identical to the gated barrier 10 of FIG. 1 except that gated barrier 264 has a gate 266 instead of the gate 14. Gate 266 is identical to gate 14 of gated barrier 10 except that gate 266 includes six vertical support members 268, 270, and 272, and a pet door 274. Vertical support members 268, 270, and 272 have an oblong section as shown in FIG. 18A. Vertical support members 268 have the same height, vertical support members 270 have the same height, and vertical support members 272 have the same height. Vertical support members 268 and 270 run from lowermost frame member 74 to arch support member portion 84. Vertical support members 272 run from a horizontal support member 276 to the arch support member portion 84. Vertical support members 268 have the same height. Vertical support members 270 have the same height. Vertical support members 272 have the same height. Horizontal support member 276 is engaged to and between vertical support members 270. Pet door 274 includes a rectangular frame 278 having a pair of vertical support members 280, 282 and a pair of lower and upper horizontal support members 284, 286. Vertical support member 280 defines a pivot axis for pet door 274. Ends of the lower and upper horizontal support members 284, 286 that engage vertical support member 280 are pivotally engaged to support members 74, and 276, respectively. Latch 288 is engaged to vertical support member 288 and slides into and out of engagement with vertical support member 270 that runs adjacent to vertical support member 282. Latch 288 includes a spring that biases a pin into an engaged position with such vertical support member 282. Latch 288 slides horizontally into and out of an engaged position with vertical support member 270. Pet door 272 includes a pair of vertical support members 290 that are oblong in section as shown in FIG. 18A and FIG. 19B. Vertical support members 290 are coaxial or in line with vertical support members 272 that are engaged between horizontal support member 276 and arched support member 84. Pet door 274 can swing open to either side of gated barrier 264, with vertical support member 280 defining a swing axis. Vertical support members 290 are engaged to and between the lower and upper horizontal support members 284, 286. Pet door 274 is defined by lower and upper horizontal support members 284, 286, vertical support members 280, 282, and internal vertical support members 290. Vertical support members 290 are vertically aligned and share a vertical axis with vertical support members 272. A pet door opening is defined by horizontal support member 276, a portion of horizontal support member 74, and a portion of each of vertical support members 270. In the gated barrier 264, the following vertical support members are oblong in section so as to have the shape shown in FIG. 18A: vertical support members 30, 32, 268, 270, 272, and 290.

Figure 21:
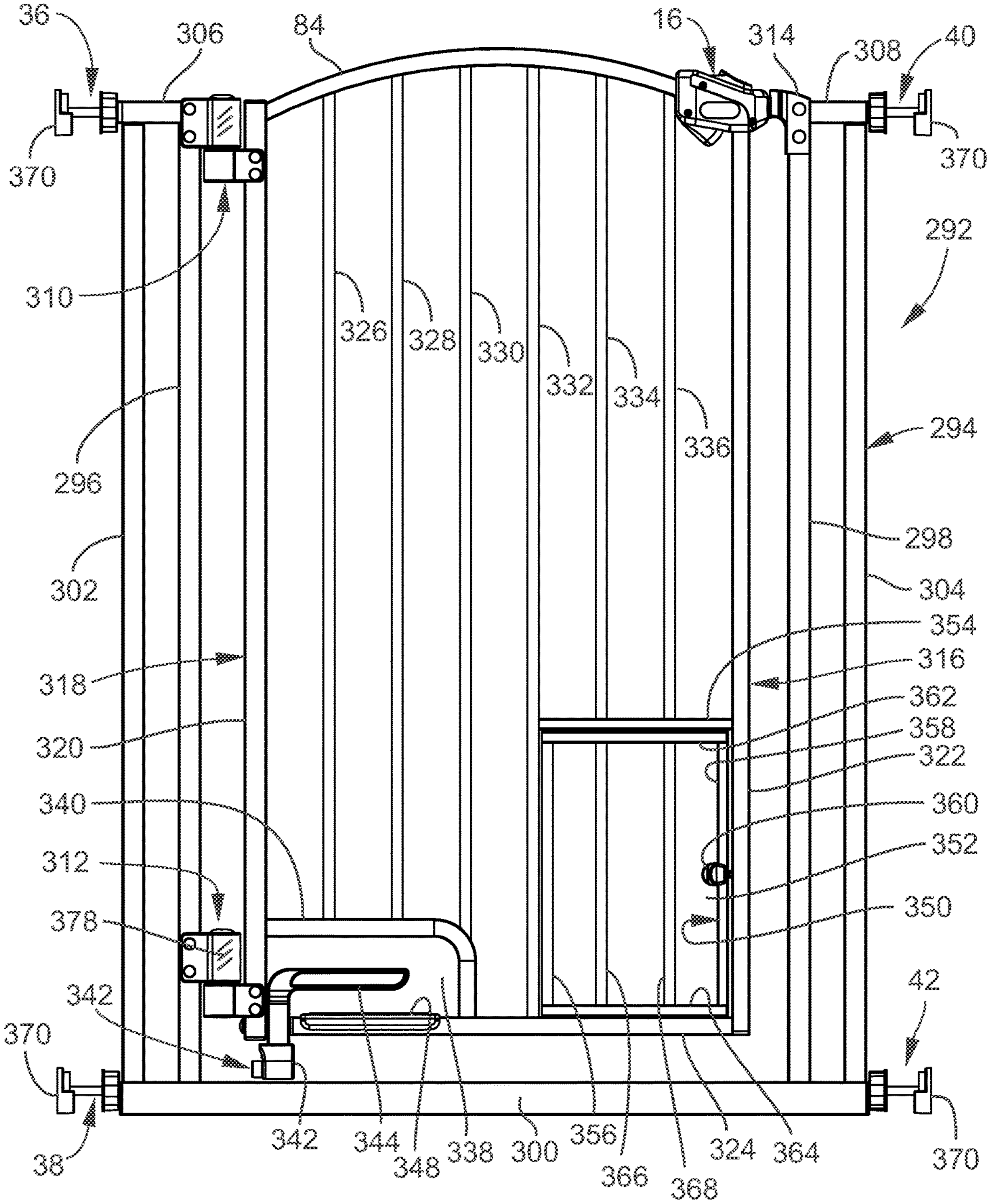
FIG. 21 is a front elevation view of a gated barrier having some of the features of the gated barrier of FIG. 1, including the latch apparatus, and arched upper traversing support member, and shows wall cups for the hand wheel apparatus.

FIG. 21 shows a gated barrier 292. As to the gate barrier 292, the following U.S. Patents are hereby incorporated by reference in their entireties: 1) the Flannery et al. U.S. Pat. No. 9,388,603 B2 issued Jul. 12, 2016 and entitled Hands Free Gate, and 2) the Flannery et al. U.S. Pat. No. 9,822,585 B2 issued Nov. 21, 2017 and entitled Hands Free Gate.

Gated barrier 292 is a gate where hands or feet may be employed to open the gate. Gated barrier 292 may be referred to as a combination hands free gate/feet free gate or a combination hands optional gate/feet optional gate.

Gated barrier 292 includes an open top U-shaped frame 294 having an inner standard 296 and an inner standard 298. A standard is a vertical support adjacent to a gate that provides good rigid support for an axis side of the gate and the latch side of the gate. Standards 296, 298 are engaged to threshold 300.

Gated barrier 292 further includes outer standards 302, 304. Standard 302 is adjacent to and spaced apart from standard 296 and is on the axis side of the gate. Outer standard 304 is adjacent to and spaced apart from standard 298 and is on the latch side of the gate. Standards 302, 304 are engaged to threshold 300.

Standards 296, 298, 302, 304 are equal in height, width and depth. Standards 296, 298, 302, 304 are square in section and tubular.

Standards 296, 302 are further engaged to an upper horizontally extending tubular frame member 306. Standards 298, 304 are further engaged to an upper horizontally extending tubular frame member 308.

Standard 296 mounts an upper compression spring mechanism 310 and a lower compression spring mechanism 312. Standard 298 mounts a bottomless latch receiver 314.

Gated barrier 292 includes a gate 316. The upper and lower compression spring mechanisms 310, 312 define an axis about which a gate 316 swings forwardly and rearwardly when disengaged from the latch receiver 314.

Gate 316 includes the arched frame portion 84 and the straight frame portion 86 within the latch apparatus 16. Gate 316 further includes a peripheral frame 318 that includes an end vertical frame member 320 adjacent to the swing axis of the gate 316, an end vertical frame member 322 in the nature of vertical frame member 70 of gated barrier 10, and a lowermost frame member 324. Peripheral frame 318 further includes the arched frame portion 84 and the straight frame portion 86 within the latch apparatus 16.

End vertical frame member 320 mounts a portion of each of the upper and lower compression spring mechanisms 310, 312. Vertical frame member 322, arched frame portion 84, and straight frame portion 86 mount the latch apparatus 16.

Gate 316 includes interior vertical support members 326, 328, 330, 332, 334, and 336. Vertical support members 326 and 336 terminate at the same altitude at the arched frame portion 84. Vertical support members 328, 334 terminate at the same altitude at the arched frame portion 84. Vertical support members 330, 332 terminate at the same altitude at the arched frame portion 84.

Gate 316 includes a rectangular foot opening 338 in a corner of the gate 316. Foot opening 338 is defined by lowermost horizontal frame member 324, end vertical frame member 320, and an L-shaped tubular frame member 340.

Gate 316 includes a two ended swinging stop apparatus 342. Swinging stop apparatus 342 is swingably fixed between an end of lowermost frame member 324 and a lower end of end vertical frame member 320. Lowermost frame member 324 includes a pin that extends from the tubular end of lowermost frame member 324 to the lower end of end vertical frame member 320, and swinging stop apparatus 342 is engaged by such pin. At one end, usually an upper end, swinging stop apparatus 342 includes a foot pedal 344. At the other end, usually a lower end, swinging stop apparatus 342 includes a weighted stop 346. Weighted stop 346 prevents an an unintended lowering of gate 316 by hitting the upper face of the threshold 300 when an end user presses down on the gate 316 without pushing against foot pedal 344 to swing the weighted stop 342 out of the way. Weighted stop 346 is normally disposed at a lower altitude than the swinging pedal 344 by the relative weights of the swinging stop 342 and pedal 344. The swinging stop 342 has a greater mass or weight than the pedal 344.

Gate 316 includes a non-slip foot receiver 348 that is engaged to the side faces and upper face of lowermost frame member 324. Receiver 348 visibly communicates with the end user as to where the end user places his or her foot to push against the pedal 344 and, generally at the same time, push downwardly upon the non-slip foot receiver 348, to draw down the gate 316 downwardly with the swinging stop 342 out of the way.

Gate 316 includes a pet door 350. Pet door 350 is swingable on an axis to a front of the gate 316 and to a back of the gate 316. Pet door 350 is swingable in a pet door opening 352 defined by the lowermost frame member 324, end vertical frame member 322, interior vertical frame member 332, and a horizontal interior frame member 354. Horizontal interior frame member 354 is engaged to and between interior vertical frame member 332 and end vertical frame member 322. Pet door 350 is rectangular. Pet door opening 352 is rectangular. Pet door 350 includes an end vertical frame member 356 on or adjacent to the swing axis of the pet door 350, an opposite end vertical frame member 358 that mounts a latch apparatus 360, a top horizontal frame member 362, and a bottom horizontal frame member 364 such that members 356, 358, 362, and 364 make up a peripheral frame for the pet door 350. Pet door 350 swings on vertical pins where an upper vertical pin is disposed between horizontal frame member 362 and horizontal frame member 354 at a location adjacent to the upper end of vertical frame member 356 and where a lower vertical pin is disposed between horizontal frame member 364 and lowermost frame member 324 at a location adjacent to the lower end of vertical frame member 356. Latch apparatus 360 includes a spring biased latch pin that communicates with a hole in the inner face of end vertical frame member 322. Pet door 350 further includes interior vertical frame members 366, 368. Pet door 350 and pet door opening 352, along with gate 316 as a whole, moves vertically down and up when foot receiver 348 is stepped upon and released.

Interior vertical frame members 326, 328 and 330 extend to and between the L-shaped member 340 and the arched frame portion 84. Interior vertical frame member 332 extends to and between the lowermost frame member 324 and the arched frame portion 84. Interior vertical frame members 334, 336 extend to and between the interior vertical frame member 354 and the arched frame portion 84.

Gated barrier 292 includes hand wheel apparatus 36, 38, 40, and 42. Each of the hand wheel apparatus 36, 38, 40, 42 engages a wall cup 370.

Figure 22:
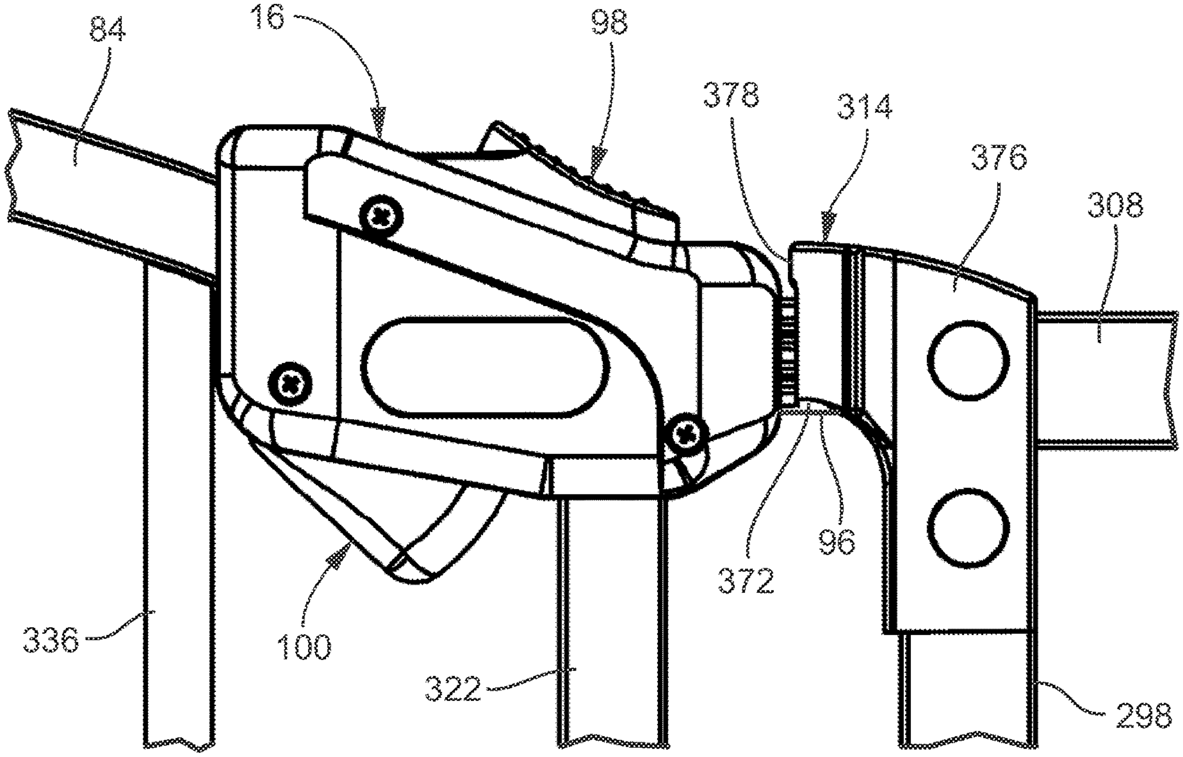
FIG. 22 shows a portion of the gated barrier of FIG. 21, including the bottomless latch receiver for the latch apparatus of FIG. 21.

FIG. 22 shows the bottomless latch receiver 314. Bottomless latch receiver 314 includes a slot 372 in the nature of slot 206 of latch receiver 18 except that slot 206 includes a bottom 374 (shown in FIG. 2A) and slot 372 does not include a bottom such that latch 96 and gate 316 as a whole can be disengaged from latch receiver 314 by being drawn vertically downwardly. Slot 372 is defined by a closed upper side, an open bottom side opposite to the closed upper side, a closed front side, a closed rear side opposite to the closed front side, a closed end side, and an open end side opposite to the closed end side. The closed upper side of the slot 372 is opposite of the open bottom where latch 96 slides downwardly out of the bottomless latch receiver 314. The closed end side is opposite of the open end side where the latch 96 slides laterally in and out. Latch receiver 314 has a body 376 fixed to the upper end of vertical support member 298. Body 376 includes a pair of front and rear oblique faces 378 tapering inwardly toward each other and toward latch 96. Oblique faces 378 are in the nature of faces 162 that urge the latch 96 inwardly into the latch apparatus 16 when the gate 316 is being closed from either the front of the gated barrier 292 or the rear of the gated barrier 292. When the gate 316 comes into a substantially co-planar arrangement with U-shaped frame 294 from an open position, spring biased latch 96 pops into the slot 372 to lock the gate 316 to the U-shaped frame 294.

Each of the compression mechanisms 310, 312 includes an internal compression or coil spring 378 shown schematically in FIG. 21. When gate 316 is drawn downwardly such as by an end user pressing down on foot receiver 348 with his or her foot, compression springs 378 are compressed and latch 96 is drawn downwardly out of the bottomless latch receiver 314. When the end user lifts his or her foot off foot receiver 348, the gate 316 is drawn upwardly by the natural extension of the compression springs 378. This drawing downwardly of gate 316 places a first force upon wall cups 370. A swinging of gate 316 to the front and rear of the U-shaped frame 294 places a second force upon wall cups 370. The first and second forces are different.

FIGS. 23A, 23B, 23C, and 23D show, respectively, perspective, top, front, and side views of the wall cup 370 shown in FIG. 21 with the hands free/feet free gated barrier 292. Wall cup 370 is integral and one-piece.

Wall cup 370 includes a base 380 that is solid except for opening 382 and a pair of openings 384. Opening 382 is for a pin connector to engage the wall cup 370 to a structure such as a wall. Opening 382 is defined by a frustoconical portion 388 leading into a cylindrical portion 390. Frustoconical portion 388 provides a seat for a head of the pin connector and cylindrical portion 390 provides a snug guide for the shaft of the pin connector. Openings 384 are generally triangular shaped.

Base 380 includes a semi-circular upper portion 392 and a Y-shaped lower post 394. The Y-shaped post 394 leads integrally into the semi-circular portion 392 about the frustoconical portion 388. Base 380 includes a semi-circular lip 396 projecting forwardly of the semi-circular portion 392. Lip 396 seats or retains the top half of the disk 60 of the hand wheel apparatus 36, 38, 40, 42.

Wall cup 370 further includes a socket 398 defined by a semi-circular U-shaped floor 400 and two triangular shaped retaining walls 402. The socket 398 is further defined by the Y-shaped post 394. The retaining walls 402 extend at a ninety degree angle relative to the U-shaped circular floor 400. The distance between semi-circular portion or face 392 and the rear or inner faces of retaining walls 402 is slightly greater than the thickness of disk 60.

Each of the retaining walls 402 includes an upper and inner rounded corner 404. Corners 404 provide space for the threaded shaft 57 of the hand wheel apparatus 36, 38, 40, 42. The corners 404 are adjacent to and spaced from the threaded shaft 57 when the disk 60 is seated in the wall cup 370. Corners 404 lead into vertical edges 405 that form a slot 406. Slot 406 is further defined by the upper surface of floor 400. Slot 406, rounded corners 404, and opening 382 (where a pin connector would be located) provides a visual clue or visual guide for the end user looking to locate the disk 60 of one of the hand wheel apparatus 36, 38, 40, 42. Slot 406 provides a visual clue or visual guide as to whether the disk 60 has been seated upon the floor 400. Each of the retaining walls 402 is further defined by an upper horizontal edge 408 and a circular edge portion 410. Openings 384 are the same shape as their respective retaining walls 402. Openings 384 may provide the end user with a visual clue or visual guide as to features of the exact location on the structure upon which the wall cup 370 is being mounted, as to whether the wall cup 370 is lying flat upon such structure, and may also provide the end user with edges to make markings so that the socket 398 invites a straight vertical drop-in of the disk 60, where edge portions 408 run horizontal, instead of a skewed drop in off to one side, where edge portions 408 would run obliquely.

Circular edge portion 410 and semi-circular lip 396 are co-axial and have as an axis the axis that extends from center opening 382. Horizontal straight edge portions 408 extend laterally, are aligned with each other, and intersect the axis extending from center opening 382. Floor 400 includes upper horizontal and longitudinally extending edges 412 that are parallel to each other and that run at right angles to horizontal straight edge portions 408.

Disk 60 confronts a number of structures in the wall cup 370. First, disk 60 is seated within, confronts, and is adjacent to semi-circular lip 396. Semi-circular lip 396 limits upper and sideways movement of the disk 60 relative to the wall cup 370. Second, disk 60 confronts and is adjacent to the semi-circular portion or face 392, which limits longitudinal or axial movement of the disk 60 in a direction away from the gated barrier 292. Third, the disk 60 is seated on the U-shaped floor 400, which limits downward and sideways movement of the disk relative to the wall cup 370. Fourth, the disk 60 confronts and is adjacent to the inner faces of retaining walls 402, which limit axial or longitudinal movement in a direction toward the gated barrier 292.

The retaining walls 402 extend upwardly to a plane defined the edge portions 408, 412 so as to maximize the seating of the disk 60. Disk 60 is circular or disk shaped and has a circular periphery that extends for 360 degrees. One-half of the disk 60 is semi-circular and has a periphery that extends for 180 degrees. The other half of the disk 60 is semi-circular and has a periphery that extends for 180 degrees. About one-half of the disk 60 extends below the plane defined by edge portions 408, 412, and about one-half of the disk 60 extends above the plane defined by edge portions 408, 412. The entire disk 60 is seated between the peripheral lip 396 and the floor 400.

The retaining walls 402 retain the disk 60 in the socket 398 when the gate 316 of the gated barrier 292 is opened with a foot. When a foot presses down upon nonslip receiver 348, an inward longitudinal force tends to draw the disks 60 inwardly. This inward longitudinal force is countered by the retaining walls 402.

Figure 24:
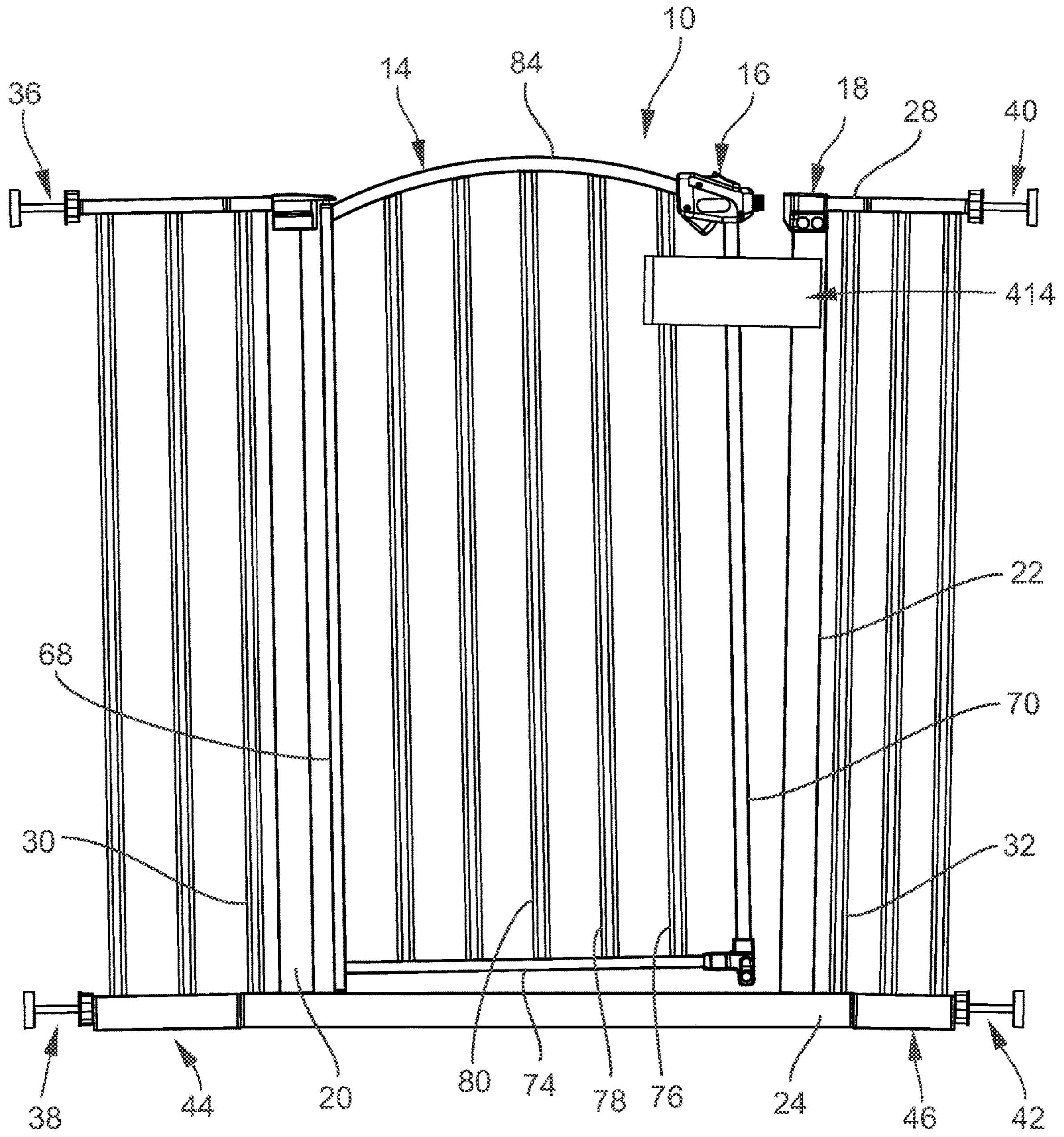
FIG. 24 is a front elevation view of the gated barrier of FIG. 1 in a non-pressurized state and shows a flexible warning tag advising the end user that the gated barrier is in the non-pressurized state.
Figure 25:
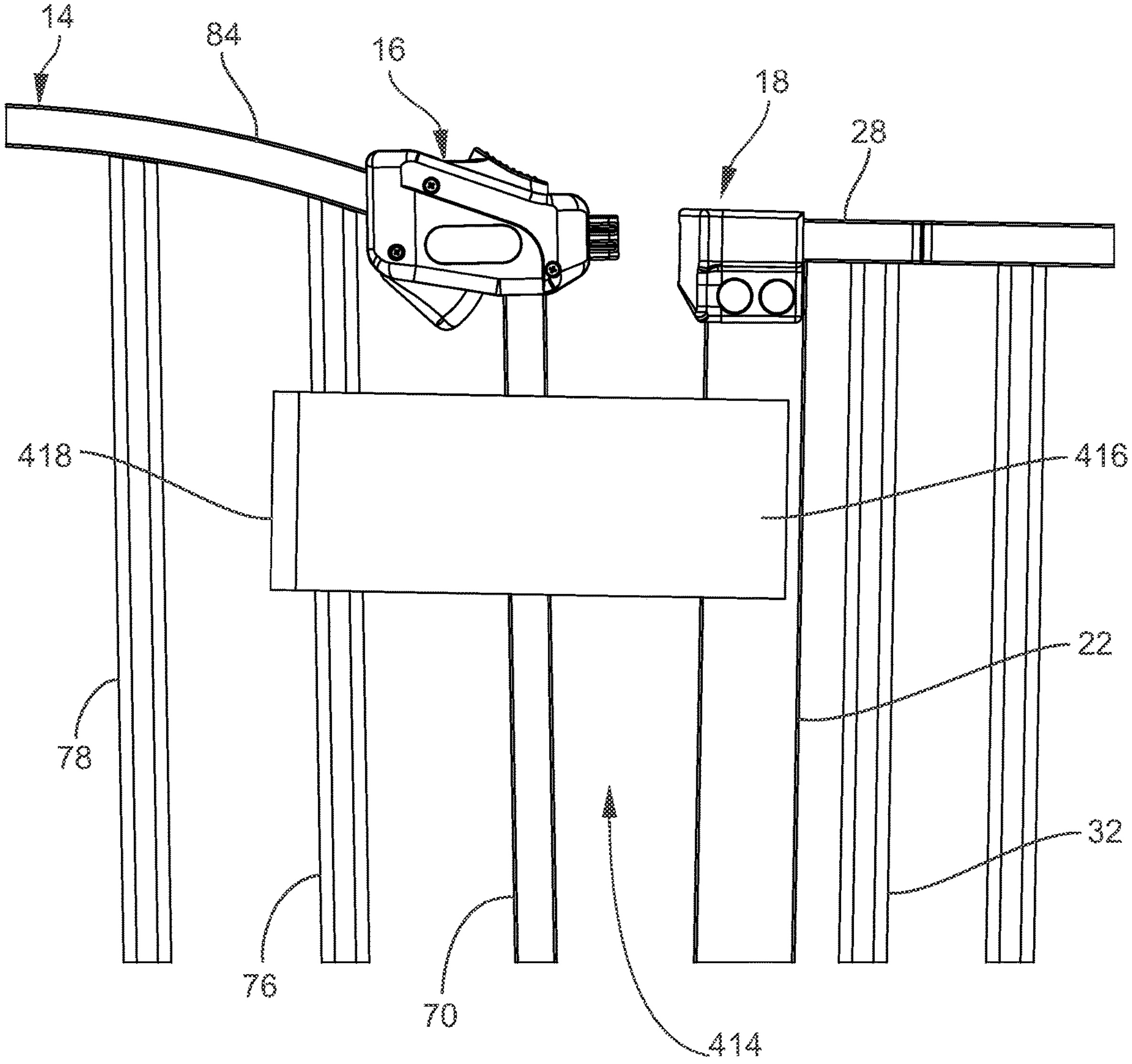
FIG. 25 is a front detail elevation view of the flexible warning tag of FIG. 24.
Figure 26:
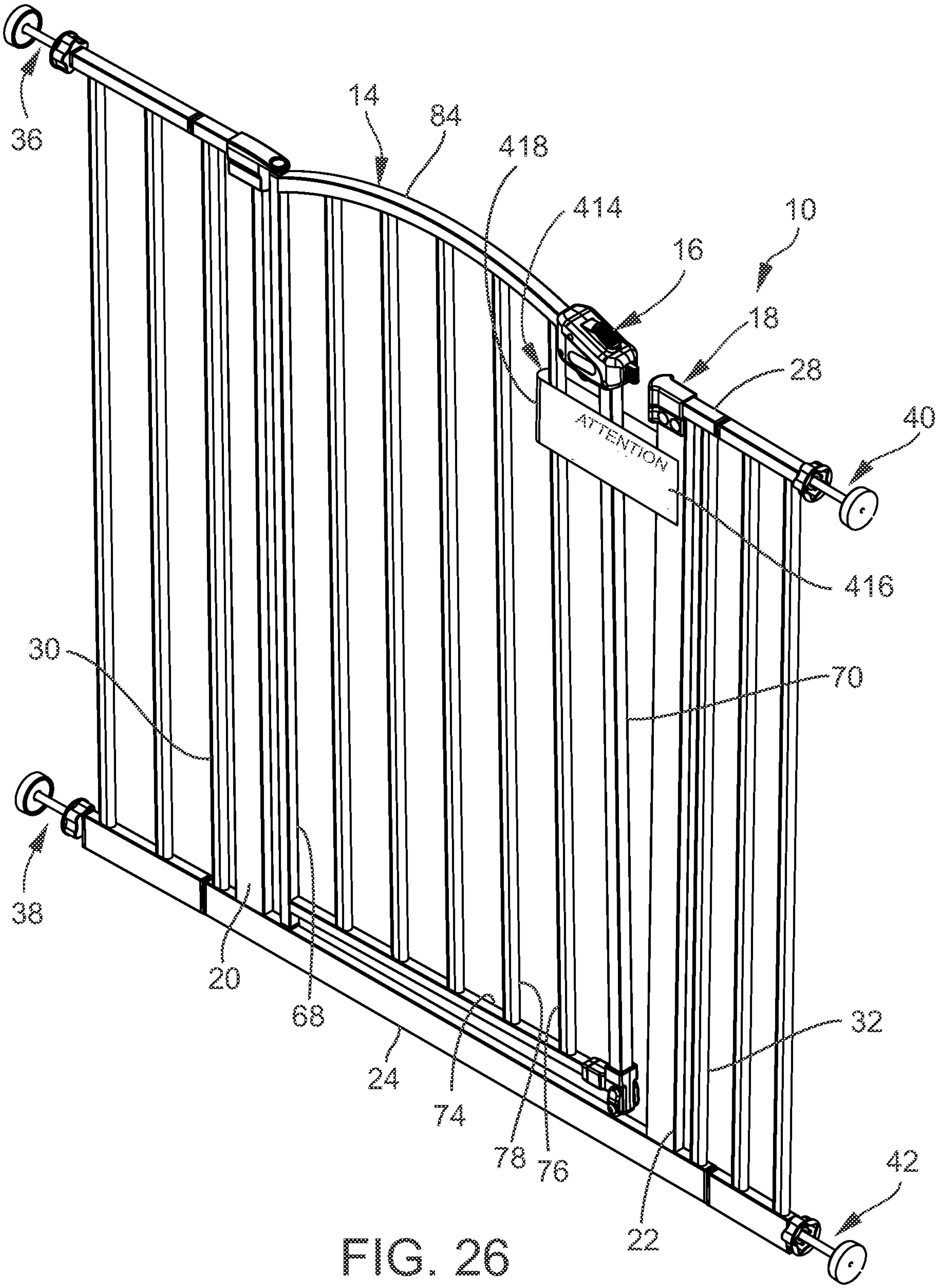
FIG. 26 is a perspective view of the gated barrier of FIG. 24 and shows the flexible warning tag of FIG. 24.
Figure 27:
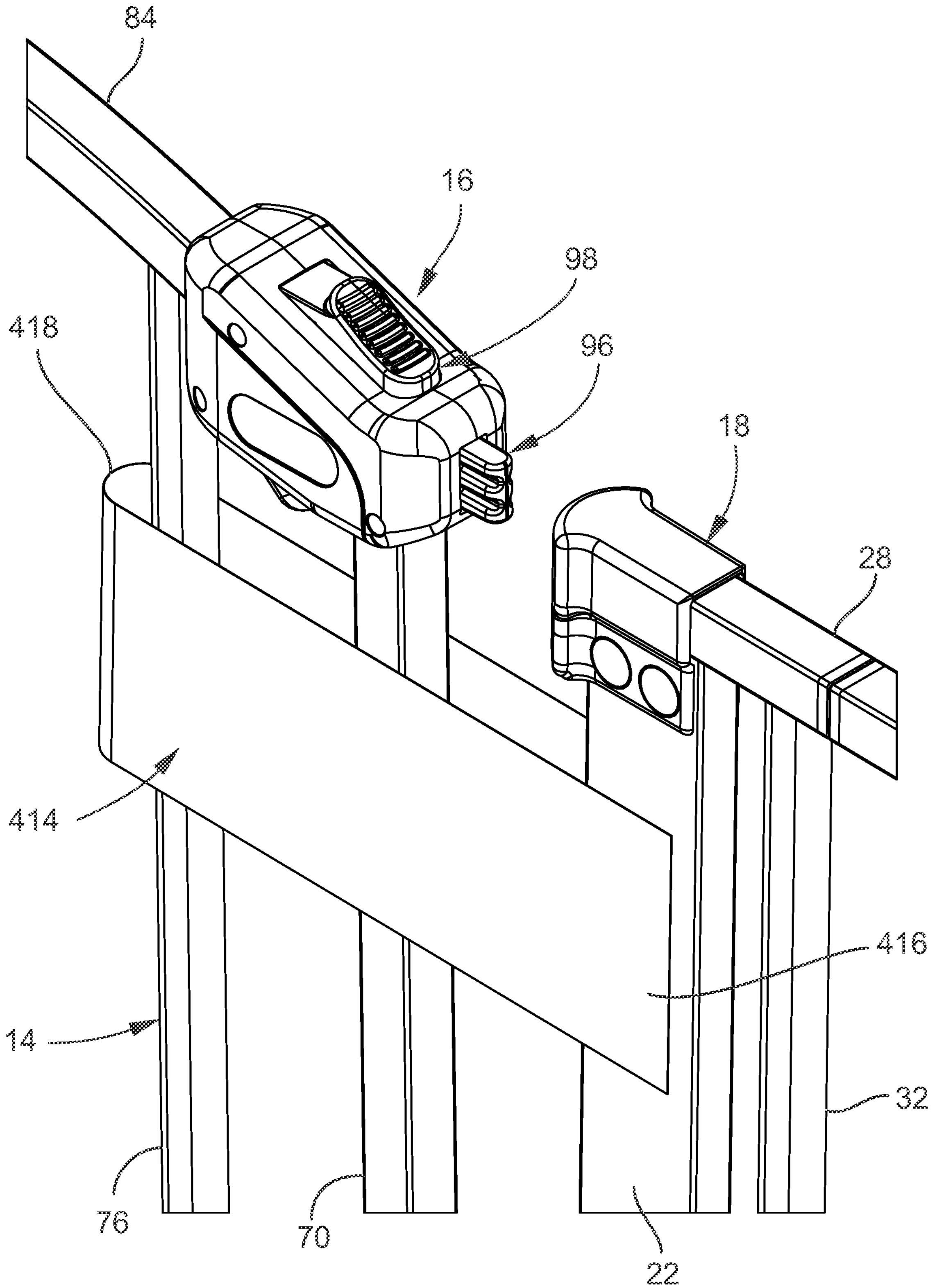
FIG. 27 is a detail perspective view of the flexible warning tag of FIG. 26.

FIG. 24 shows an elevation front view of the gated barrier 10 of FIG. 1 having a flexible warning tag 414. On each of its sides, tag 414 has the following printed message: "ATTENTION! You will notice a slight gap between the gate door latch and the frame tube. THIS IS NOT A DEFECT! Your gate is a pressure mounted gate and this gap will disappear once you tighten your gate in the doorway opening. Note: For ease of installation leave on until properly installed."

Tag 414 is preferably a one piece strip of flexible yet rigid paper. Paper herein is defined as "material manufactured in thin sheets from the pulp of wood or other fibrous substances, used for writing, drawing, or printing on, or as wrapping material." Tag 414 can be any flexible structure on which or from which a message may be engaged. A tag is defined as "a label attached to someone or something for the purpose of identification or to give other information."

Tag 414 includes two end portions 416. One end portion 416 is engaged by adhesive to the front face of standard 22. The other end portion 416 is engaged by adhesive to the rear face of standard 22. The tag 414 includes an innermost end portion 418 that loops about the inner vertical support member 76 of gate 14 such that tag 414 loops about end vertical support member 70 and inner vertical support member 76. Tag 414 may loop about one or more of the end vertical support member 70, the inner vertical support member 76 adjacent to end vertical support member 70, the inner vertical support member 78 closest to the latch side of the gate 14, and inner vertical support member 80. Tag 414 engages standard 22 on the front face of the standard 22, then extends by the front face of end vertical support member 70 without engaging the end vertical support member 70, then loops about without engaging inner vertical support member 76 such that tag 414 extends by first the front face of inner vertical support member 76 and then the rear face of inner vertical support member 76, then extends by the rear face of end vertical support member 70 without engaging the end vertical support member 70, and then engages standard 22 on the rear face of standard 22. Tag 414 extends through gate 14.

Tag 414 is spaced from and adjacent to each of the latch apparatus 16 and the latch receiver 18. Tag 414 is spaced from the latch apparatus 16 and latch receiver 18 so as to keep the latch apparatus 16 and latch receiver 18 visible. Tag 414 is adjacent to the latch apparatus 16 and latch receiver 18 because the gap or distance between standard 22 and end vertical member 70 is greater toward the top ends of the gate 14 and standard 22. Tag 414 extends inwardly further than the latch apparatus 16 extends inwardly. Tag 414 extends horizontally. Tag 414, if laid out flat, is rectangular. In its laid out flat form, tag 414 is longer than it is tall. In its looped form, engaged on the gated barrier 10, one-half portion of the tag 414 is longer than it is tall such that its length is greater than its height.

When tag 414 is engaged on the gated barrier 10, the paper of tag 414 is of sufficient strength and the adhesive bond between the tag 414 and the standard 22 is of sufficient strength to prevent the gate 14 from swinging to a completely open position under its own weight, such as when the gated barrier 10 is held in a horizontal position and the gate 14 is permitted to swing down under the influence of gravity when the gated barrier 10 is in a nonpressurized form. The tag 414 restricts the swinging of the gate 14, when the gated barrier 10 is in a nonpressurized form, to preferably not more than 45 degrees to one side, more preferably not more than 40 degrees to one side, still more preferably not more than 35 degrees to one side, and even more preferably not more than 30 degrees to one side.

The tag 414 is employed to warn end users that the gated barrier 10 is not faulty and that the spacing between the latch receiver 18 and latch apparatus 16 will disappear when the gated barrier 10 is set up into its operating position by using the hand wheel apparatus 36, 38, 40, 42.

Tag 414 may be a flexible paper tag, a tag made of a flexible textile or flexible fabric, and/or a tag that is made of a plastic material that is flexible or rigid. Tag 414 may be a tag formed of metal links, such as a metal chain, to make the tag flexible. Tag 414 may be formed of a combination or one or more of paper, textile, fabric, wood, plastic, and metal. Tag 414 is preferably flexible, but may be rigid if desired. Tag 414 is a three dimensional warning or a three dimensional piece of information.

Tag 414 is preferably disengaged from the gated barrier 10 after the gated barrier 10 has obtained its operating position. Tag 414 does not interfere in the process of setting up the gate barrier 10, i.e., taking the gated barrier 10 out of the shipping box and installing the gated barrier 10 in a doorway. When the gated barrier 10 is pressurized, the end portion 418 moves further inwardly toward the inner vertical support member 78 that is adjacent to inner vertical support member 76. Tag 414 may be torn at any location so as to achieve an operational gate 14, i.e., a gate that may be opened to permit passage. Tag 414 may be removed from either the front face and the rear face of standard 22 to completely remove the tag 414 from the gated barrier 10. If desired, the outermost vertical edges of the tag 414 may extend a short distance beyond the outermost vertical edge of standard 22 such that the outermost vertical edges of tag 414 may be easily gripped to tear the tag 414 from the front and rear faces of the standard 22.

Further inventions are as follows:

Invention 1: A gated barrier that includes: a) an open top U-shaped frame having first and second end frame portions and a threshold frame portion between the first and second end frame portions; b) a gate swingably engaged to the first end frame portion, the gate having first and second ends, the first end being adjacent to an axis on which the gate swings, the second end being opposite of the first end; c) a latch receiver engaged to the second end frame portion; d) a latch apparatus engaged to the second end of the gate; e) the latch apparatus having a latch apparatus housing; f) the latch apparatus having a latch that engages the latch receiver; and g) wherein the gate includes first and second frame portions, the first and second frame portions being engaged to each other at a junction, the latch apparatus housing engaged to the gate at the junction and hiding from visible sight said junction.

Invention 2: The gated barrier of invention 1, wherein the first and second frame portions are offset from each other at the junction.

Invention 3: The gated barrier of invention 1, wherein the first frame portion is straight and the second frame portion is curved.

Invention 4: The gated barrier of invention 3, wherein the latch apparatus housing is further engaged over the first frame portion and hides from sight said first frame portion.

Invention 5: The gated barrier of invention 1, wherein the second end of the gate includes an end vertical support member, and wherein the latch apparatus housing engages each of the first frame portion, the second frame portion, and the end vertical support member.

Invention 6: The gated barrier of invention 3, wherein the latch apparatus housing includes a rear end portion and a front end portion and an upper surface running from the rear end portion to the front end portion, the upper surface having a rear horizontal section at the rear end portion, the upper surface having a front horizontal section at the front end portion, and the upper surface being oblique from the rear horizontal section to the front horizontal section to track a curve of the second frame portion.

Invention 7: A gated barrier for being engaged between first and second opposing structures, that includes: a) an open top U-shaped frame having first and second end frame portions and a threshold frame portion between the first and second end frame portions; b) a gate swingably engaged to the first end frame portion, the first gate having first and second ends, the first end being adjacent to an axis on which the gate swings, the second end being opposite of the first end; c) a latch receiver engaged to the second end frame portion; d) a latch apparatus engaged to the second end of the gate; e) the latch apparatus having a latch that engages the latch receiver; f) a set of first, second, third, and fourth hand wheel apparatus, the first hand wheel apparatus engaging the first end frame portion, the second hand wheel apparatus engaging the second end frame portion, the third hand wheel apparatus engaging one of the first end frame portion and threshold frame portion, the fourth hand wheel apparatus engaging one of the second end frame portion and threshold frame portion; g) each of the first, second, third, and fourth hand wheel apparatus comprising a threaded shaft, a hand wheel turnable on and threadingly engaged to the threaded shaft, and a disk engaged to an end of the threaded shaft; and h) a set of first, second, third, and fourth wall cups for engaging said disks of the first, second, third, and fourth hand wheel apparatus; i) the first and third wall cups engaging the first structure, the second and fourth wall cups engaging the second structure; and j) each of the first, second, third, and fourth wall cups comprising a back wall portion, a front wall portion, and a sidewall portion between the back and front wall portions, the sidewall portion and front wall portion defining socket for seating said disk, said disk being between said back and front wall portions when seated in said socket to minimize chances that the disk is disengaged in an axial direction from the wall cup.

Invention 8: The gated barrier of invention 7, wherein the front wall portion includes an upper edge, the upper edge defining a straight line that traverses a diameter of the wall cup and intersects a center of the wall cup such that substantially one-half of said disk is seated in said socket to maximize surface area of said disk that can be entrapped by said socket.

Invention 9: The gated barrier of invention 7, wherein the front wall portion includes a slot such that an end user can see the disk in the socket.

Invention 10: The gated barrier of invention 7, wherein the sidewall portion is circular.

Invention 11: The gated barrier of invention 7, wherein the gate includes a foot opening defined in part by a horizontal frame portion, wherein the gate is vertically slideable downwardly when a foot is placed in the foot opening and the horizontal frame portion is pressed down by the foot, and wherein the latch receiver is bottomless such that the latch disengages from the latch receiver in a downward direction.

Invention 12: A gated barrier for being engaged between first and second opposing structures, that includes: a) an open top U-shaped frame having first and second end frame portions and a threshold frame portion between the first and second end frame portions; b) a gate swingably engaged to the first end frame portion, the first gate having first and second ends, the first end being adjacent to an axis on which the gate swings, the second end being opposite of the first end; c) a latch receiver engaged to the second end frame portion; d) a latch apparatus engaged to the second end of the gate; e) the latch apparatus having a latch that engages the latch receiver; f) a set of first, second, third, and fourth hand wheel apparatus, the first hand wheel apparatus engaging the first end frame portion, the second hand wheel apparatus engaging the second end frame portion, the third hand wheel apparatus engaging one of the first end frame portion and threshold frame portion, the fourth hand wheel apparatus engaging one of the second end frame portion and threshold frame portion; g) each of the first, second, third, and fourth hand wheel apparatus comprising a threaded shaft, a hand wheel turnable on and threadingly engaged to the threaded shaft, and a disk engaged to an end of the threaded shaft; h) the gated barrier being a pressure gated barrier where the first and second end frame portions are brought into a parallel relationship by operation of one or more of the first, second, third, and fourth hand wheel apparatus, the pressure gated barrier having a state prior to set up where the first and second end frame portions are in a nonparallel relationship; and i) a tag extending from the second end frame portion, to the gate, through the gate, and back to the second end frame portion when the pressure gate barrier is in the state prior to set up where the first and second end frame portions are in a nonparallel relationship, the tag having a printed warning thereon.

Invention 13: A gated barrier that includes: a) an open top U-shaped frame having first and second end frame portions and a threshold frame portion between the first and second end frame portions; b) a gate swingably engaged to the first end frame portion, the gate having first and second ends, the first end being adjacent to an axis on which the gate swings, the second end being opposite of the first end; c) a latch receiver engaged to the second end frame portion; d) a latch apparatus engaged to the second end of the gate; e) the latch apparatus having a latch apparatus housing; f) the latch apparatus having a latch that engages the latch receiver; g) wherein the gate includes an uppermost frame portion, wherein the uppermost frame portion includes an arch section, and wherein the gate includes a lowermost frame member; h) wherein the gate includes a first end vertical member at the first end of the gate, wherein the gate includes a second end vertical member at the second end of the gate; and i) wherein the gate includes a set of interior vertical support members, wherein the interior vertical support members extend from the lowermost frame portion to the arch section of the uppermost frame portion, wherein two of said interior vertical support members have the same height.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A gated barrier comprising:

a) a frame comprising first and second end frame portions;

b) a gate swingably engaged to the first end frame portion, the gate having first and second ends, the first end being adjacent to an axis on which the gate swings, the second end being opposite of the first end;

c) a latch receiver engaged to the second end frame portion;

d) a latch apparatus engaged to the second end of the gate;

e) the latch apparatus having a latch apparatus housing;

f) the latch apparatus having a latch that slides at least partially into the latch receiver in a first direction, that slides at least partially out of the latch receiver in a second direction, that slides at least partially out of the latch apparatus housing in the first direction, and that slides at least partially into the latch apparatus housing in the second direction;

g) the latch apparatus having a latch pusher engaged to the latch apparatus housing, the latch pusher engagable to the latch such that the pushing the latch pusher slides the latch in the second direction;

h) the latch apparatus having a latch release that is pivotally engaged to the latch apparatus housing, the latch release being pivotable between open and closed positions, the latch release being biased to the closed position, the latch release having a stop that engages the latch pusher when the latch release is in the closed position, the latch release being pivotable away from the closed position such that the stop pivots away from an engagement with the latch pusher to permit the latch pusher to slide the latch in the second direction;

i) such that pivoting the latch release permits the latch pusher to slide the latch in the second direction to disengage the latch from the latch receiver such that the gate may be swung open.

2. The gated barrier of claim 1, wherein:

a) when the latch release is in the closed position, the latch pusher is engaged by the latch release thereby preventing the latch pusher from pushing the latch in the second direction;

b) when the latch release is in the closed position, the latch can slide in the first and second directions;

c) the latch pusher includes a fully engaged position where the latch pusher has engaged the latch and has fully pushed the latch in the second direction;

d) the latch includes a fully latched position in the latch receiver and a fully unlatched position out of the latch receiver;

e) the latch is in the fully unlatched position when the latch pusher is in the fully engaged position, with the latch being restrained from sliding in the first direction toward the latch receiver when the latch pusher is in the fully engaged position; and f) the latch release is held against pivoting from the open position to the closed position by the latch pusher when the latch pusher is in the fully engaged position.

3. The gated barrier of claim 1, wherein the latch is independent of the latch release such that the latch may be pushed in the second direction when the latch release is in the closed position and such that the latch may be pushed in the second direction when the latch release is in the open position.

4. A gated barrier comprising:

a) a frame comprising first and second end frame portions;

b) a gate swingably engaged to the first end frame portion, the gate having first and second ends, the first end being adjacent to an axis on which the gate swings, the second end being opposite of the first end;

c) a latch receiver engaged to the second end frame portion;

d) a latch apparatus engaged to the second end of the gate;

e) the latch apparatus having a latch apparatus housing;

f) the latch apparatus having a latch that slides at least partially into the latch receiver in a first direction, that slides at least partially out of the latch receiver in a second direction, that slides at least partially out of the latch apparatus housing in the first direction, and that slides at least partially into the latch apparatus housing in the second direction;

g) the latch apparatus having a latch operator engagable to the latch apparatus housing, the latch operator engaged to the latch such that the operating the latch operator slides the latch in the second direction;

h) the latch apparatus having a latch release that is pivotally engaged to the latch apparatus housing, the latch release being pivotable between open and closed positions, the latch release being biased to the closed position, the latch release having a stop that engages the latch operator when the latch release is in the closed position, the latch release being pivotable away from the closed position such that the stop pivots away from an engagement with the latch operator to permit the latch operator to slide the latch in the second direction;

i) such that pivoting the latch release permits the latch operator to slide the latch in the second direction to disengage the latch from the latch receiver such that the gate may be swung open.

5. The gated barrier of claim 4, wherein:

a) when the latch release is in the closed position, the latch operator is engaged by the latch release thereby preventing the latch operator from pushing the latch in the second direction;

b) when the latch release is in the closed position, the latch can slide in the first and second directions;

c) the latch operator includes a fully engaged position where the latch operator has engaged the latch and has fully pushed the latch in the second direction;

d) the latch includes a fully latched position in the latch receiver and a fully unlatched position out of the latch receiver;

e) the latch is in the fully unlatched position when the latch operator is in the fully engaged position, with the latch being restrained from sliding in the first direction toward the latch receiver when the latch operator is in the fully engaged position; and f) the latch release is held against pivoting from the open position to the closed position by the latch operator when the latch operator is in the fully engaged position.

6. The gated barrier of claim 4, wherein the latch is independent of the latch release such that the latch may be pushed in the second direction when the latch release is in the closed position and such that the latch may be pushed in the second direction when the latch release is in the open position.

* * * * *